(12) United States Patent
Reifenhäuser

(10) Patent No.: US 12,074,439 B2
(45) Date of Patent: Aug. 27, 2024

(54) METHOD FOR DIRECTIONAL TRANSMISSION OF ENERGY IN THE FORM OF AT LEAST ONE ENERGY PACKET

(71) Applicant: GIP AG, Mainz (DE)

(72) Inventor: Bernd Reifenhäuser, Mainz (DE)

(73) Assignee: GIP AG, Mainz (DE)

( * ) Notice: Subject to any disclaimer, the term of this patent is extended or adjusted under 35 U.S.C. 154(b) by 429 days.

(21) Appl. No.: 17/539,961

(22) Filed: Dec. 1, 2021

(65) Prior Publication Data

US 2022/0286162 A1  Sep. 8, 2022

(30) Foreign Application Priority Data

Dec. 8, 2020 (EP) ..................... 20212537

(51) Int. Cl.
*H02J 3/00* (2006.01)

(52) U.S. Cl.
CPC ............. *H02J 3/004* (2020.01); *H02J 3/003* (2020.01); *G05B 2219/2639* (2013.01); *H02J 2203/20* (2020.01)

(58) Field of Classification Search
CPC ............. G05B 19/042; G05B 2219/2639; H04B 3/54; Y02D 30/70; Y02E 40/70;
(Continued)

(56) References Cited

U.S. PATENT DOCUMENTS 9,013,902 B2 * 4/2015 Abe .............. H02J 3/00
  363/69
9,337,655 B2  5/2016 Reifenhäuser et al.
(Continued)

FOREIGN PATENT DOCUMENTS

DE 102014214863 A1 2/2016
DE 102014119431 A1 6/2016
(Continued)

OTHER PUBLICATIONS

Adaptive Management of Energy Packets, E. Gelenbe, 2014 IEEE (6 pages).
International Search Report (3 pages).

*Primary Examiner* — Chun Cao
(74) *Attorney, Agent, or Firm* — Jaquez Land Greenhaus & McFarland; Bruce W. Greenhaus

(57) ABSTRACT

The present invention relates to a method for directional transmission of power in the form of energy packets via a transmission network. The power to be transmitted is adjustable at least one location x of each edge by a data and computer network. A data packet is biuniquely assigned to each energy packet, which data packet is formed in a control instance of the data and computer network by means of predictions. This data packet describes an optimized transport path via which optimized transport path a source transmits the physical power in a fixed transmission period T to a load for partial demand coverage. Furthermore, the data packet describes the power class of the energy packet, wherein this power class is defined by the temporal course of a nominal power $P_{nom}(t)$ determined by predictions and by a remainder $R(t)$ in the transmission period determined by a function of an uncertainty of the predictions. For the transmission of the energy packet, the transmitted power equal to $P_{nom}(t)$ plus a fraction of $R(t)$ is set for each point in time t within T at at least one location x of each edge of the transport path.

14 Claims, 5 Drawing Sheets

(58) Field of Classification Search
CPC ........ Y02E 60/00; Y04S 10/12; Y04S 40/121; H02J 13/00007; H02J 2203/10; H02J 2203/20; H02J 3/003; H02J 3/004; H02J 3/0075; H02J 3/02; H02J 3/381
USPC ........................................................ 700/295
See application file for complete search history.

(56) References Cited

U.S. PATENT DOCUMENTS

| | | | |
|---|---|---|---|
| 2008/0031283 A1* | 2/2008 | Curran-Gray | H04J 3/0667 370/503 |
| 2012/0059532 A1* | 3/2012 | Reifenhauser | H02J 3/0075 700/297 |
| 2014/0013146 A1* | 1/2014 | Kreiner | H04L 12/40045 713/340 |
| 2015/0142198 A1* | 5/2015 | Grebel | H02J 3/008 700/295 |
| 2016/0025922 A1 | 9/2016 | Reifenhäuser et al. | |
| 2016/0366649 A1* | 12/2016 | Bernhard | H04W 52/0277 |
| 2017/0353032 A1* | 12/2017 | Ebbes | H02J 3/06 |
| 2019/0379210 A1* | 12/2019 | Ebbes | H02J 3/28 |
| 2022/0286162 A1 | 9/2022 | Reifenhäuser | |

FOREIGN PATENT DOCUMENTS

| | | |
|---|---|---|
| DE | 102015109967 A1 | 12/2016 |
| WO | 2010130615 A3 | 11/2010 |

* cited by examiner

METHOD FOR DIRECTIONAL TRANSMISSION OF ENERGY IN THE FORM OF AT LEAST ONE ENERGY PACKET

FIELD OF THE INVENTION

The invention relates to the transmission of power for energy supply in a power grid with a particular consideration of renewable power or energy generation and handling of the associated volatility.

PRIOR ART

In the prior art, there are some concepts for a packet-based power grid, as for example in European patent EP 2 430 723 B1, U.S. Pat. No. 9,013,902 B2, R. Abe et al, A. Sumper et al, Alex Q. Huang et al. etc.

In European patent EP 2 430 723 B1 it is assumed that a source node of the "quantum grid" described therein has the capacity to transmit an energy packet to a load node for a booking period in the future, which has exactly one demand for this energy packet for this booking period.

For the booking period, the loads request these energy packets from the sources to cover their demand. The energy packets that can be made available by the sources for transmission are denoted offers. In a multi-stage method, supply and demand are balanced and, by means of a suitable auction and routing procedure, packets are determined for transmission along an optimal path. In this method, packets to optimally meet the demand of each load are determined from the offers of the sources. For each load, the optimal graph between the sources determined to meet the demand of the load and the load is then determined. This method continues until the optimal combination of sources and graphs connecting the sources to the load and optimally meeting its demand is determined for a load, according to pre-determined criteria. This result is then firmly booked, i.e. a corresponding contract is concluded between the load and these sources and with the operator of the electricity grid for transmission on the transport graph.

The central element of the concept of EP 2 430 723 B1 is that the energy packet is defined by its data packet coherently coupled to the energy packet and the temporal course of the power, the so-called power profile $p_{Profil}(t)$, which then forms the energy packet during transmission, is set according to the information in the data packet. An essential part of the data packet is the information stored there about the transmission period T and the power profile $p_{Profil}(t)$ for all point sin points in time t in the transmission period T.

These data packets are transmitted to all nodes of the transport graph via a routing plane and a data network that connects all nodes of the transmission network with each other and with the routing plane. At the transmission time, i.e. from the beginning of the transmission period T, the physical power is set by power controllers on the edges of the transport graph for each point in time t within the transmission period T by a power plane in such a way that it is equal to the value of the power profile at the respective point in time transmitted to the nodes prior to the transmission time and stored in the data packet. The routing and power planes together form the so-called quantum grid router. These quantum grid routers are connected to each other via edges of the electrical transmission network so that at least one source can be connected to a load.

Despite all the advantages offered by prior art packet-based power transmission, the known methods do not offer any concepts for dealing with the non-deterministic property of regenerative generation of energy. For example, EP 2 430 723 B1 conceptually assumes that there is a fixed defined demand from the loads and a fixed defined supply of energy packets from the sources for the booking period. However, this assumes that the sources guarantee that the power they supply into the grid exactly covers the power demand of the loads.

OBJECT WITH RESPECT TO THE PRIOR ART

In contrast, it is the task of the present invention,
to handle the volatility of both the regenerative generation and the demand of the loads,
to take into account transmission losses,
to form a uniform, self-contained, self-organised, decentralised and automatic system for the energy supply of various forms of energy, and
to provide an approach for the sector coupling of transmission networks with different forms of energy, especially of an electricity grid with regenerative generation and a gas supply grid, among others for long-term energy storage.

At least one of the aforementioned objects is solved by a method for directional transmission of energy in the form of at least one energy packet from a plurality of sources Q via at least two nodes, one of which is a supply node $K_Q$ connected via a supply edge to one of the plurality of sources Q and one of which is a demand node $K_S$ connected via a demand edge to a load S, and via a plurality of edges to a plurality of loads S in a transmission network, the transmission network being controllable by means of a data and computer network in such a way that for at least one location x on each of the plurality of edges an actually flowing physical power $p_\varphi(x,t)$ is controllable by a control instance of the data and computer network, which method comprises the steps of:

A) forming a data packet for each energy packet, wherein the data packet is biuniquely assigned to exactly one energy packet, wherein the data packet defines the respective energy packet, and wherein the data packet describes
  i. a transmission period T of the energy packet with a duration DT and an execution time $t_0$, which execution time $t_0$ identifies the start of the transmission period T,
  ii. a predetermined transport path of a transport graph of the transmission network for the directed transmission of the energy packet, which transport path connects at least one of the plurality of sources Q with exactly one of the plurality of loads, wherein the exactly one of the plurality of sources Q is connected to a supply node $K_Q$ of the predetermined transport path via exactly one supply edge and the exactly one load S is connected to the demand node $K_S$ via a demand edge of the predetermined transport path, and
  iii. an equivalence class $\{p_{nom}(t), R(t), T\}$ of the energy packet, wherein the equivalence class is given by a nominal power $p_{nom}(t)$ of the energy packet as a function of time, wherein the nominal power $p_{nom}(t)$ is determined beforehand by at least one prediction, and a remainder R(t) as a function of time and as a function of a prediction uncertainty of the at least one prediction,
  wherein for each point in time t within the transmission period T of the energy packet there is a $\mu(t)$, with $-1 \leq \mu(t) < 1$ or with $-1 < \mu(t) \leq 1$ or with $-1 \leq \mu$ (t)≤1, such that the physical power $p_\varphi(x,t)$ during the transmission of the energy packet at each point in time t and at at least one location x on each edge of the transport path is fixed as the sum of the nominal power $p_{nom}(t)$ and the product of $\mu(t)$ and the remainder R(t), wherein the equivalence class is defined by an equivalence relation, according to which equivalence relation, for any point in time t of the transmission period T, a first physical power $p'_\varphi(\hat{x}, t)$ at any location $\hat{x}$ of an edge of the transport path and a second physical power $p_\varphi(x,t)$ at any location x of an edge of the transport path are equivalent only if there is a predetermined remainder R(t) greater than or equal to zero and less than or equal to a limit value $R_{max}$ and a $\mu(t)$, with $-1 \leq \mu(t) < 1$ or with $-1 < \mu(t) \leq 1$ or with $-1 \leq \mu(t) \leq 1$, such that the first physical power $p'_\varphi(\hat{x},t)$ is equal to the sum of the second physical power $p_\varphi(x,t)$ and the product of $\mu(t)$ and the remainder R(t), B) prior to the execution time $t_0$ transmitting the data packet to all control instances of at least all nodes or all edges on the transport path, C) beginning with the execution time $t_0$ transmitting the energy packet biuniquely assigned to the data packet, wherein for all points in time t within the transmission period T of the energy packet, the physical power $p_\varphi(x,t)$ flowing on the transport path between the supply node $K_Q$ and the demand node $K_S$ is set at at least one location x of each edge of the transport path in such a way that the physical power fed into the demand node $K_S$ is an element of the equivalence class $\{p_{nom}(t),R(t),T\}$ described by the data packet.

The solution according to the invention is based on the idea of taking into account the volatility of sources and loads by defining a new packet term which links predictions to the setting of the power flow. In the present application, we understand a power flow to be the temporal course of a power p(x,t) for all points in points in time t in a given time period T at a location x of an edge of the graph of the transmission network.

In contrast, the prior art tries to meet the object with the following measures

1. The portfolio of renewable sources is differentiated and oversized and only the "safe" part is made available as supply. In addition, the supply is secured with deterministic sources in order to compensate for volatility in the form of balancing energy.
2. The sources are provided with oversized analogue storages in order to compensate for the additional volatility of renewable generation and the associated shortfall or surplus in addition to the demand fluctuations, which cannot be precisely determined.
3. The loads are also provided with analogue storages to compensate for the under- or excess.
4. Storage units are connected to the nodes through which the power is set for packet-based power transmission, in order to compensate for the excess or shortage caused by volatility through these storage units. In particular, this compensates for the transmission losses that occur.
5. The nodes that are used to set the power for packet-based power transmission are connected to a classic on-demand network via a so-called slack line, which is used to compensate for a shortage and an excess with the control approach $\Sigma p_i(t)=0$.

Approaches no. 1 to 3 are engineering solutions accessible to a person skilled in the art. Solution no. 4 is the Digital Grid approach of Abbe et al. for packet-based power transmission. Solution no. 5 is a way to compensate for losses in A. Sumper's Power Router approach. Solution no. 1 leads to unnecessarily large generation capacities and the continued need for deterministic sources based on fossil fuels or nuclear energy for balancing power are required. In solutions no. 2, 3 and 4, the storage facilities are discharged to compensate for the shortage and charged to compensate for the excess, in accordance with "classic" grid physics. They are therefore not part of the packet-based grid and are not controlled and managed by the packet-based methods. This means that in addition to the management of the supply and demand of packets, an "analogue" management procedure is needed for the storage facilities. These always need enough capacity to compensate for shortages. This seemingly simple approach increases the complexity and the risk of instability considerably. The last solution solves the problem by balancing the shortfalls by the power on demand principle of the connected classical grid. Besides this fact, the solution is also disadvantageous because it requires an additional connection to a classical power grid and thus no pure packet-based transmission is realized with this solution.

The present invention solves the object by introducing a new packet term. This new packet term is formed by means of predictions, in particular the supply prediction for a source, the demand prediction for a load whose demand is to be covered by this source and the transmission loss predictions that occur.

The invention enables a packet-based energy system which is
- is self-organized and autonomous, and/or
- provides an optimized coverage of demand for energy or power and/or
- provides optimized handling of renewable and demand volatility and/or
- provides optimized routing for transmission in the power transmission network and/or
- enables the transmission of electromagnetic energy, thermal and chemical energy as well as the formation of sector-coupled hybrid grids.

The reference signs given in the following text only enable identification of the individual, abstractly described elements in the attached figures, the following general description is nevertheless not to be understood as a description of concrete examples of implementation, such a description follows at the end of the text after the brief description of the figures.

In one embodiment of the invention, the transmission network 100.000 is formed by nodes connected by edges. An actual flowing physical power $p_\varphi(x,t)$ is controllably adjustable by a control entity 220.000 executing on a data and computer network 200.000. In one embodiment, the adjustment of the actual flowing physical power $p_\varphi(x,t)$ for at least one location x on each of said edges is performed by adjusting it at location x of each of said edges. The nodes and edges can be implemented in numerous embodiments. For example, there are nodes exclusively as sources, such as a wind generator, supplying power into the transmission network and nodes exclusively as loads, such as a private household with no generation of its own, drawing power from the transmission network. There are nodes that are both sources and loads, such as energy storage facilities. Sources and loads can be connected to the transmission network with several edges. Furthermore, there are the so-called ohm nodes. An ohm node connects several edges with each other.

In relation to the transmission direction, there are incoming and outgoing edges. The Quantum Flow Control (QFC) node 2.000, as shown in FIG. 5, is used to set the physical power at a location x of an edge. A QFC node consists of a QFC and two connection points, called ports, for the flexible connection of two edges or physical transmission lines as a basis for the edge connected to the QFC. In terms of transmission direction, there is an incoming edge connected to the QFC node via the corresponding port and an outgoing edge with the corresponding connection. The QFC node is designed such that the physical power at the connection point, the outer outgoing edge is controllably adjustable via the data and computer network using the power flow transmitted into the QFC node via the outer incoming edge. The connection points of the edges to the ports of a QFC node each form the locations x of the corresponding edges at which the physical power is set. In addition to the bidirectional design of the QFC node, which can set the physical power according to the transmission direction at the respective connection point, there are QFC nodes that are provided exclusively for one transmission direction. The inner structure of the QFC node consists of two ports, which are the connection points for flexible connection of outer edges that are connected to a QFC via inner edges. The QFC sets the power according to the flow direction via the respective inner edge to which the QFC is connected. The power set by the QFC is controllably adjustable by the data and computer network. The Quantum Flow Controllers are available in mono- and bidirectional design.

The edges of the transmission network are formed by the following embodiments. One embodiment is that an edge of the transmission network is formed by a transmission line with a maximum transmission capacity having two connection points for connection to nodes. Such an edge may connect ohm nodes to ohm nodes and ohm nodes to QFC nodes and two QFC nodes to each other via their connection points. The physical power can be set at the connection point, which is the location x of the edge.

In another embodiment, called active edge, this active edge consists of two partial edges each standing from a transmission line of the same maximum transmission capacity per unit length, each of which is an edge in the sense of the preceding embodiment of an edge, which are firmly connected to each other via a QFC, which in this embodiment is a component of the active edge. The choice of the lengths of the two lines determines the location of the QFC and thus the arbitrary location x of the active edge for which the physical power can be set. In a further embodiment, the edge is formed by a transmission line which is configured such that at least at one location x of the edge, without galvanic isolation of the line, the physical power can be controllably adjusted.

In principle, the present invention is suitable for implementation with all possible types of transmission networks of the most diverse forms of energy. In particular, in one embodiment of the invention, the transmission network is an electrical transmission network or a gas network or a hybrid transmission network comprising a coupled electrical transmission network and a gas network for sector coupling.

In one embodiment of an ohm node 1.000 for an electrical transmission network, as shown schematically in FIG. 4, a plurality of edges comprising electrical transmission lines are connected to an ohm node. Generally, the edges connected to the ohm node are connected at their other end to a QFC node that can supply power into or out of the ohm node. These power flows, controlled by the respective QFC node, are then distributed in the ohm node according to Kirchhoff's rules via a bus, as shown in FIG. 4, to which the edges are connected. Furthermore, in one embodiment, the connected edges can be additionally switched on and off in an ohm node. During the transmission of physical power, the edges as well as the ohm nodes act on the power by reducing it by the loss occurring at or in them.

In one embodiment of a QFC node for an electrical transmission network, according to the FIG. 5, the physical power is adjusted by the power controller 2.300 at the corresponding connection points of the edges. FIG. 5 shows that the power controller 2.300 adjusts the power in a controllable manner via a setting unit 2.400. The setting unit 2.400 is connected to a CPS node 2.500 of the data and computer network, which can exchange data for controlling the setting with a control instance 220.000, which is executed on 200.000. The power controllers used in one embodiment for an electrical transmission network are state of the art, such as modern inverter technologies or bidirectional step-up step-down controllers or the controllable bidirectional so-called double-active bridges with or without voltage transformation known from DE 10 2012 204 035 A1, U.S. Pat. No. 5,027,264. FIG. 5 shows that a QFC node has a port a for connecting an edge $e_a$ and a port b for connecting an edge $e_b$. The respective connection points x and x' of the edges are the locations at which the power controller 2.300 sets the power via the inner edges of the QFC. Let us now consider the case of a transmission from edge $e_a$ to edge $e_b$. Then the power controller 2.300 takes the power from the edge $e_a$ via the connection point x' in order to set the electromagnetic field at the connection point x of $e_b$, so that the physical power $p_\varphi(x,t)$ is set for each time t of T, at location x according to the specifications transmitted by the data and computer network.

Due to Kirchhoff's laws, the physical power drawn at x' and thus $p_\varphi(x',t)$ is set accordingly. In summary, $p_\varphi(x,t)$ is set at x, from which $p_\varphi(x,t)$ is automatically set at x' according to Kirchhoff. The same applies to the opposite transmission direction.

In one embodiment of the invention, an energy packet according to the invention is defined according to the information of its data packet, which data packet is biuniquely coherently coupled with the energy packet, and is transmitted via the transmission network according to the information stored in the data packet. In this case, the energy packet according to the invention is transmitted from a node of the transmission network as the source for the energy packet, called source Q, via a previously determined directed path, the transport path, stored in the data packet, to a node of the transmission network as the load for the energy packet, called load S. Whereby the source Q is uniquely connected via the first edge $e_1$ of the transport path, called supply edge 5.800, to an ohm node of the transport path, called supply node $K_Q$. The load is in turn uniquely connected via the last edge $e_p$ of the transport path, called demand edge 5.900, to an ohm node of the transport path, called demand node $K_S$. The supply node and the demand node are connected to each other via the remaining partial path of the transport path. The energy packet E is transmitted according to the information stored in the data packet for the transmission period T with the execution time $t_0$ for its duration DT in that for each point in time t of the transmission period the physical power $p_\varphi(x,t)$ corresponding to the transmission direction at at least one location x of at least one edge $e_t$ of the transport path is set in accordance with the equivalence class stored in the data packet, which equivalence class is denoted a power class $\{p_{nom}(t),R(t),T\}$, in such a way that the energy packet is an element of this power class.

In one embodiment, the supply edge 5.800 is an active edge. Here, 5.800 is composed of a transmission line, called supply edge 5.810, connecting load 6.000 to supply QFC 2.800, supply QFC 2.800 for setting the physical power at the connection point, and a second transmission line, called supply edge 5.820, connecting supply QFC 2.800 to supply node 1.800. Similarly, demand edge 5.900 consists of a demand QFC 2.900 and demand edges 5.910 via which demand node 1.900 is connected to demand QFC 2.900 and demand edge 5.920 via which 2.900 is connected to load 7.000. Demand QFC 2.900 sets the physical power at the connection point of demand edge 5.920 connecting it to 2.900. For nodes that are only source or only load, it is sufficient that the supply QFC can only set the power on the connection point of 5.820 and the demand QFC can only set the power on the connection point of 5.920.

In case that a node can be both source and load, the edge by which it is connected to the transport path must consist of a bidirectional QFC and two transmission lines by which transmission lines this bidirectional QFC is connected to this node and the transport path. In case that this node as a source transmits a packet via the transport path to a load, the two transmission lines and the bidirectional QFC assume the roles of the supply edges 5.810 and 5.820 as well as the role of the supply QFC 2.800 according to the transmission direction. In the event that such a node is the load for the transmission of an energy packet, the transmission lines assume the corresponding roles for 5.910 and 5.920 and the bidirectional QFC assumes the role of the demand QFC in accordance with the opposite transmission direction.

In the following, we summarise more precisely the definitions of a transport path and a transport graph for the purposes of the present application using graph theory (see Wikipedia, Krumke et al.) Since there are nodes in the transmission network, such as energy storage devices, which can be both source and load, power can be transmitted in both directions via one edge of the network and there is therefore no distinguished direction for the entire transmission network. For this reason, it is obvious to describe the transmission network by an undirected graph. According to Krumke et al., an undirected graph is the triple $$\hat{G}=(\hat{V},\hat{E},\gamma)$$

with the non-empty sets $\hat{V}$ and $\hat{E}$ with $\hat{V}\cap\hat{E}=0$ and a mapping $\gamma:\hat{E}\rightarrow$quantity of subsets Y of $\hat{V}$ with $Y\subseteq\hat{V}$ and for the amount $|Y|$ it holds $1\leq|Y|\leq 2$, which assigns to each undirected edge $\hat{e}\in\hat{E}$ its vertex set $\gamma(\hat{e})\in Y\subseteq\hat{V}$. Here, $\hat{V}$ is the set of edges and $\tilde{E}$ is the set of undirected edges for which the physical power $p_\varphi(x,t)$ can be set for a point in time t at least at one location x of each edge. An important factor is the transmission capacity of the individual edges.

This can be described as follows using graph theory. Accordingly, each edge $\hat{e}_i\in\hat{E}$ can be assigned a maximum transmission capacity $c_i^{max}$. On basis of this maximum transmission capacity $c_i^{max}$ of the edge $\hat{e}_i$, the free transmission capacity $c_i(t)$ of the edge $\hat{e}_i$ at a point in time t can then be assigned, depending on the transmission capacity already booked or used.

In one embodiment, the undirected graph $\hat{G}=(\hat{V},\hat{R},)$ of the transmission network is assigned the remainder graph $\hat{G}_{Residual}=(\hat{V},\hat{R},c,T)$ of the transmission network, wherein each edge $\hat{e}_i\in\hat{R}$ is assigned the free transmission capacity $c_i(t)$ for each pint in time t of a time period T. Here, $c_i(t)$ is determined by the mapping $c:(e_i, t)\rightarrow c_i(t)\leq c_i^{max}$, which assigns the free transmission capacity to each edge $\hat{e}_i\in\hat{R}$ and to each point in time $t\in T$.

The undirected graph $\hat{G}$ thus describes the transmission network and the properties defined by the network physics as hardware for executing the method according to the invention as "software for the directed transmission of the energy packets according to the invention".

In one embodiment of the invention, a previously determined transport path of a transport graph of the transmission network for the directed transmission of the energy packet is described in the data packet. Since the directed transmission specifies a direction, it is obvious to use a directed graph to describe the transport path and its transport graph.

Let us now consider a directed graph. A directed graph is, according to Krumke et al, the quadruple G=(V; R; a, w) with the following properties:
i. V is a non-empty set, the node or vertice set of the graph
ii. R is the one set, the set of directed edges or also called the subset
iii. It holds that R∩V=Ø
iv. α: R→V and ω: R→V are mappings,
where α(r) is the initial node and ω(r) is the terminal node of a directed edge or arrow.

A directed graph is a path if and only if it consists of a sequence of nodes in which two nodes following each other are connected by a directed edge.

A directed graph G'=(V', R', α', ω') is called a subgraph of a directed graph
G=(V, R, α, ω) i.e., G'⊆G if
i. V'⊆V and R'⊆R as well as
ii. the constraints α and ω on V' and R' coincide with α' and ω', respectively,
i.e. $\alpha|_R'=\alpha'$ and $\omega|_R=\omega'$.

The graph G is then called a top graph of G' if V'⊂V or R'⊂R holds, then G' is a real subgraph of G, i.e. G'⊂G and G is a real top graph of G'.

The considerations regarding the maximum transmission capacity and the available transmission capacity apply equally to the directed edges.

In one embodiment of the present invention, a transport path TP (E,Q,S,T,P) of the transmission network is a directed path P=(V, R, α, ω) for which the conditions for transmitting the energy packet E in the transmission period T are satisfied. For the directed path P, since it is a directed graph, the edge set R consists of the directed edges $(e_1, \ldots, e_p)$, where each of these directed edges is formed by assigning the transmission direction from the, in each case at at least one location $x_i$, adjustable edges of the transmission network. It holds for the node set V that the node set V is formed by the corresponding nodes of the transmission network, such that Q∈V is the initial node and S∈V is the final node of the path P. Furthermore, for the first edge $e_1$ of the path P, it holds that $\alpha(e_1)=Q$, and $\omega(e_1)=K_Q$. For the last edge $e_p$ of the path then $\alpha(e_p)=K_S$ and $\omega(e_p)=S$ and for the remaining edges $e_i$ with $2\leq i\leq p$ $\omega(e_{i-1})=\alpha(e_i)$ holds.

In order for such a path P, which connects a source Q∈V via a sequence of directed edges $e_i\in R$, with i=1 to p, with a load S E V to be a transport path TP (E, Q, S, T) for the directed transmission of an energy packet E, the necessary conditions must also be fulfilled.
1. The source Q must be able to supply a power into the path via the supply edge $e_1$ at each point in time t of the transmission period T, so that at at least one location $x_i$ of each of these edges $e_i$, the physical power $p_\varphi(x_i, t)$ is set by a control, as part of a control instance executed on the data and computer network, in such a way that the physical power fed into the demand accounts $K_S$ must at the location $x_p \in e_p$ be an element of the equivalence class or power class $\{p_{nom}(t), R(t), T\}1$ described by the data packet of the energy packet E.

2. Each edge $e_i$ of the path P has a readily available transmission capacity $c_i(t)$ at any point in time t of the transmission period T, so that the corresponding physical powers can be transmitted.

In this sense, a transport path is a directed path, i.e. a graph TP (E, Q, S, T), via which directed path an energy packet, according to its power class stored in the data packet, is available for transmission from a source 6.000 via a supply edge 5.800 and a further sequence of nodes and edges, via the demand edge 5.900 to a load 7.000 in the transmission time period T.

A transport graph $TG(TP_1(E_1,Q_1,S,T_1), \ldots TP_n(E_n,Q_n,S,T_n))$ is a top graph of the transport paths $TP_i(E_i,Q_i,S,T_i)$, such that $T=UT_i$ and $E=\oplus E_i$. The condition $E=ED\ E_i$ means that the energy packets $E_i$ together form an energy packet E that covers the demand of the load S for the transmission period T as determined by a prediction. More detailed explanations follow later.

If several energy packets are needed to cover the maximum demand of a load, which are transmitted via several transport paths from the corresponding sources to this one load, then the transport graph is formed as a union of these transport paths. To simplify matters, we also use the abbreviation TG for a transport graph in the following, if it is clear from the context which transport graph is meant.

At this point we want to show the relationship between the undirected graph representing the transmission network and a directed transport graph of the transmission network. For a directed transport graph of a transmission network holds:

1. The node set V of the transport graph TG is a subset of the node set $\hat{V}$ of the undirected graph $\hat{G}$ of the transmission network,
2. Each directed edge $e_i$ of TG can be uniquely assigned an undirected edge $\hat{e}_1$ of $\hat{G}$ by the fact that $\alpha(e_i) \in \gamma(\hat{e}_i)$ and $\omega(e_i) \in \gamma(\hat{e}_1)$ holds.

Note that an undirected edge a of the transmission network connecting e.g. nodes $K_A$ and $K_B$ becomes a directed edge e by assigning a transmission direction by setting $\alpha(e)=\alpha(e)=K_A$ for the transmission direction from node $K_A$ to node $K_B$ or $\alpha(\hat{e})=\alpha(e)=K_B$ for the opposite transmission direction. Accordingly, the end nodes of the directed edges are set.

We choose the following convention to indicate the transmission direction for a directed edge. With respect to this arbitrarily chosen convention, we denote a directed edge for transmission from $K_A$ to $K_B$ by $e^+$ and the edge with the opposite transmission direction we denote by $e^-$. Let us now consider the case where node $K_A$ is a node $K_{Q\&S}$ which is both source and load, e.g. an energy storage device, and $K_B$ is an ohm node. We choose the convention that a power fed into an ohm node is counted positively and one provided by an ohm node is counted negatively. In our chosen convention, $K_A=K_{Q\&S}$ as the source then transfers power via the directed edge $e^+$ to $K_B$. In a case, wherein $K_A=K_{Q\&S}$ as the load is transmitting, power is transferred via $e^-$ from $K_B$ to $K_A$. Physically, however, the considered undirected and directed edges always have in common the one and the same transmission line connecting $K_A$ and $K_B$.

We now take the edges $e^+$ and $e^-$ with their corresponding initial and final nodes, and correspondingly the undirected edge $\hat{e}$, each as a graph with two nodes and one edge and denote these graphs in exactly the same way as their edges. In this case, $e^-$ is the inverse graph to the graph $e^+$, and the symmetric closure $e^+ \cup e^-$, which is the union of the two graphs, is isomorphic to the undirected graph $\hat{e}$. This means that in our example we can simply use the undirected graph $\hat{e}$ as a subgraph of the directed graph instead of the two directed subgraphs $e^+$ and $e^-$. This isomorphism applies not only to such single-edge graphs but also to paths. We will further use this isomorphism for simplification, for example, in the description of compensation and equalisation.

In case of a storage unit, only one power transfer can take place in one direction at a time. In general, however, it can happen that two power packets with opposite transmission directions are transmitted simultaneously via an edge or via a subgraph of the transmission network. In this case, the physical power flows superpose so that a resulting directed edge results. From this results a need for the method according to the invention to describe how energy packets transmitted simultaneously via an edge superpose. We will explain this later.

After we have dealt with the transport path and the transport graph, we turn to the data packet of an energy packet. An energy packet is always biuniquely defined by the data packet assigned to it. The data packet is formed by a control instance that is executed on the data and computer network and contains the information about the previously determined transport path, about the conditions according to which the physical power must be set on the transport graph in the transmission period T, as well as about the transmission period T. In the process, the transmission period T is defined by an execution time $t_0$, which determines the start of the transmission, and a duration DT.

The transmission of an energy packet from a source to exactly one load serves to cover at least part of the power demand of this load by the supply power of the source for the transmission period T. For this purpose, at least one source 6.000 must be determined for the transmission period T whose supply power in the transmission period T matches the demand of a load 7.000. It follows that the power to be transmitted by the energy packet must be determined by predictions. Thus, the core of the invention is the idea of determining the condition how the power is to be transmitted described in the data packet by these predictions. In general, we understand predictions at a prediction time $t^0$ to mean the determination of future power curves in a prediction period $T_{Prog}$ for generation, supply, demand and transmission losses on the basis of mathematical models using time series of various measured values and the variation of various parameters. We distinguish between exact and volatile models. An exact model describes, for example, the electrical supply power of a gas-fired power plant depending on the gas quantity, which has negligible uncertainty, i.e. variance. The situation is different for the supply power of a wind generator, because since the weather model is non-linear, it shows a large variance with respect to the variance of the initial conditions. With this model, the predictions are subject to a relevant uncertainty, i.e. variance.

Possible mathematical models as a basis for the respective prediction are, in addition to the weather models, the derivation of a local wind or sunshine prediction from more global weather predictions, the derivation of the supply power of individual plants depending on their state functions, up to the models of synthetic biology that describe the production of gases that can be converted into electricity.

According to the various embodiments of sources 6.000 such as e.g.
- wind generators 6.100,
- solar generators 6.200,
- SynBio gas plants 6.300,
  - which are plants that produce e.g. hydrogen, methane or other gases for gas-to-power generators by means of future synthetic biology technologies,
- hydropower plants, e.g. storage hydropower plants,
- biogas plants,
- deterministic generators, e.g. gas-fired power plants, and other forms the corresponding predictions then also differ.

Since one object of the present invention is dealing with the occurrence of pronounced volatility in power generation by regenerative sources, in particular wind and solar generators, we consider these embodiments of the sources and thus the weather or wind and sunshine predictions in more detail below by way of example.

The weather predictions are relevant for renewable generation. These are produced by simulations on the basis of measured values and weather models. In the process, different calculation runs for probable scenarios are carried out by varying the parameters and initial conditions for the simulation calculations. These results of the different calculations can also be assigned to a distribution function of the population, so that one can then determine the expected value for one of the observables of the calculation runs, for example as a Monte Carlo simulation.

In one embodiment, the different calculation runs then result in an expected value $\vec{w}(x_0, t)$ e.g. of the active wind vector $<\vec{w}(x_0, t)>$ for a wind generator at location $x_0$ of an electrical transmission network with an associated variance $\vartheta_{Wind}(t)$ for each point in time t from the prediction period $T_{Prog}$. Based on a calculation model for the wind generator, the expected value of the electrical power $<p(x_0, t)>$ generated at point in time t can then be calculated from $<\vec{w}(x_0, t)>$ with a correspondingly derived variance $\vartheta(t)$. In the following, we denote by $x_0$ the location of a source and by $x_{p+1}$ the location of a load of the transmission network.

In one embodiment, for each point in time t of the prediction period, the distribution of the prediction values for each of these points in time corresponds to a Gaussian distribution, as an example. The expected value we consider is the mean value of the results of the calculation runs, e.g. of the radiation intensity at a location $x_0$ at a point in time t. In addition to the mean value, the standard deviation $\sigma(t) = +\sqrt{\vartheta(t)}$ is an important parameter that gives an indication of the prediction variation.

The essence of the definition of energy packets in terms of one embodiment of the present invention is that the transmitted physical power is allowed to fluctuate within a range of fluctuation around the expected value of the prediction during transmission. The allowable range of variation is a function of the variance of the prediction. Thus, the physical power is always given as the expected value and a variable remainder.

In one embodiment, not only a prediction of the generation of the source, but also a prediction for the demand of the load is considered in the definition of the energy packet. In one embodiment, a prediction of the demand includes not only the demand of the load, but also a prediction of the transmission losses that occur during the transmission of an energy packet over the transport graph.

With this definition of the energy packet, the source is obliged to supply a power in a defined power range and the load must then be able to cover its demand with the variance of the transmitted power and is also obliged to take the power in this range. In one embodiment, the load and the source have a storage in their analogue electrical parts. The storage of the load compensates to a certain extent for the variance between the actual demand and the transmitted physical power. The storage at the source compensates, to a certain extent, for the deviations of the actually generated power from the predicted demand of the load.

The conditions for the physical power of an energy packet to be transmitted are determined and described in the data packet by an equivalence class $\{p_{nom}(t), R(t), T\}$ of the energy packet, also referred to in this application as power class. Thereby, the equivalence class is given by a temporal course of a nominal power $p_{nom}(t)$ of the energy packet previously determined by at least one prediction and a temporal course of a remainder $R(t)$ as a function of a prediction uncertainty of the at least one prediction, wherein for each point in time t within the transmission period T of the energy packet there is a $\mu(t)$, wherein $-1 \leq \mu(t) < 1$ or wherein $-1 < \mu(t) \leq 1$ or wherein $-1 \leq \mu(t) \leq 1$, so that a physical power $p_\varphi(x, t)$ in the transmission of the energy packet at each point in time t and at at least one location x on each edge $e_i$ of the transport path TP(E; Q; S; T), is fixed as the sum of the nominal power $p_{nom}(t)$ and the product of $\mu(t)$ and the remainder $R(t)$, wherein the equivalence class is defined by an equivalence relation according to which a first physical power $p'_\varphi(\hat{x}_i, t)$, $\hat{x}_i$ arbitrary and $\hat{x}_i \in e_i \in TP(E; Q; S; T)$ and a second physical power $p_\varphi(x_j, t)$, $x_j$ arbitrary and $x_j \in e_j \in TP(E; Q; S; T)$ are equivalent if and only if there is a given remainder $R(t)$ greater than or equal to zero and less than or equal to a limit $R_{max}$ and a $\mu(t)$, wherein $-1 \leq \mu(t) < 1$ or wherein $-1 < \mu(t) \leq 1$ or wherein $-1 \leq \mu(t) \leq 1$, so that the first physical power $p'_\varphi(\hat{x}_i, t)$ is equal to the sum of the second physical power $p_\varphi(x_j, t)$ and the product of $\mu(t)$ and the remainder $R(t)$.

Thus, two physical powers that belong to the same equivalence class are equivalent to each other. Energy packets that are equivalent to each other can be handled like identical energy packets in the method according to the invention. For simplification, we will carry out our considerations in the following for sources that are always located at the one and same location $x_0$ and for loads that are always located at the one and same location $x_{p+1}$. For this reason, we omit the location reference for the sources and loads for the time being. We will return to the location reference in the further course.

In one embodiment, the nominal power $p_{nom}(t)$ is exactly equal to the expected value $<p(t)>$ for a power at a point in time t with a variance $\vartheta(t)$. Here, the prediction time $t^0$ and the prediction period $T_{Prog}$ for the corresponding prediction are chosen such that for the transmission period T, $T \subseteq T_{Prog}$ applies. In this embodiment, this can be the supply power of a source 6.000 or the demand power of a load 7.000 or the transmission loss of a transport path.

We recall, the physical power transmitted at point in time t in the transmission period T, is thus the sum of the nominal power $p_{nom}(t)$ and a remainder, or the product $\mu(t) \cdot R(t)$, wherein $R(t)$ is a function $f'_{forecast}$ of the prediction uncertainty, so that $$R(t) = f'_{forecast}(\vartheta(t))$$

applies. In one embodiment, for example, the $p_{Model1}(t)=p(t)$ calculated for each $t \in T$ by the prediction calculation runs corresponds to a Gaussian distribution. Thus, for each point in time t, the expected value <p(t)> is the mean value and the prediction uncertainty is described by the standard deviation $\sigma(t)$.

Thus, in this exemplary embodiment, the nominal power can be expressed as $p_{nom}(t):=<p(t)>=<p(t)>_{Mittelwert}=\overline{p(t)}$ and the remainder to $R(t)=f(\sigma(t))$. Thus, for each point in time t of the transmission period T, the interval+/—$\sigma(t)$ will lie around the mean value <p(t)>68.3% of all values of the predicted generation output p(t). In our representation, $\sigma(t)$ is given as a percentage value. In one embodiment, for example $R(t)=f_{Prognose}(\sigma(t))=2\sigma(t) \cdot <p(t)>=2\sigma(t) \cdot p_{nom}(t)$ can be chosen.

Thus, for point in time t in T, approx. 95.4% of the probable values are in the interval $p_{nom}(t)+/-2\sigma(t) \cdot p_{nom}(t)$. If, in another embodiment, one chooses for $t \in T$, $R(t)=3\sigma(t) \cdot p_{nom}(t)$, then approx. 99.7% of the probable fluctuations at point in time t are thus encompassed. As a representative for the power class we then take the nominal power $p_{nom}(t)$ of this power class. It follows that at a location $\hat{x}$ of an edge of the transport path, all physical flows $p_\varphi(\hat{x}, t)$ for which, for all points in time t within the transmission period T, there is a corresponding $\mu(t)$, so that $p_\varphi(\hat{x}, t)=p_{nom}(t)+\mu(t) \cdot R(t)$ are equivalent. According to this definition, equivalent physical power flows produce the same energy packet during transmission. In one embodiment, for at least one location $x_i \in e_i$ of each edge $e_i$ of a transport path, the physical power in the transmission of an energy packet can be represented by $p_\varphi(x_i, t)=p_{nom}(t)\mu_{x_i}(t) \cdot R(t)$. Here $\mu_{x_i}(t)$ denotes the p(t) associated with the location $x_i$. For the sake of simplicity, we will only use $\mu(t)$ in the following, but we always mean exactly the temporal course of values for the corresponding location.

In another embodiment, the prediction can have an expected value $<_p(t)>$ with a non-symmetrical uncertainty. By means of a suitable shift function, $p_{nom}(t)$ can then be determined starting from <p(t)> in such a way that this lies in the middle of the uncertainty interval.

In one embodiment, the data packet formed by the control instance 220.000 is then transmitted to all control instances 220.000 relevant for the transmission, which is executed on the data and computer network 200.000. At execution time $t_0$, the physical power is then set by 220.000 via the QFC nodes 2.000, and the QFCs 2001 of the active edges at the corresponding connection points of the edges 5.000.

In one embodiment, the transmission is carried out by setting the physical power at the location $x_1$ of the supply edge for all points in time t within the transmission period T when supplying from the source via the supply edge, so that $$p_\varphi(x_1,t) \in \{p_{nom}(t)R,T\}$$

holds. In an embodiment wherein only one energy packet is served by the source, standard control engineering procedures may be used to set the power such that the supplier QFC 2.800 takes the maximum possible power from the source 6.000 and sets it as the physical power on edge 5.820 such that it is an element of the power class of the energy packet to be transmitted. It should be noted that for each point in time of the transmission period, the physical power is set so that it does not exceed the upper limit of $p_{nom}(t)+R(t)$ specified by the power class or defining equivalence class of the energy packet.

In the case that only a physical power can be fed into the transport path that is smaller than $p_{nom}(t)-R(t)$, the energy packet cannot be transmitted in the intended form. We will return to this case later.

In this embodiment, each following QFC node then adjusts the power at the respective connection point of the following edge on the basis of the input power measured in relation to the transmission direction using standard methods of control engineering in such a way that this physical power is an element of the power class. Thus, an energy packet is uniquely defined by the coherently coupled data packet, with the information on the power class, the interval T and the transport graph, and is formed at transmission time by setting the power flow according to the information of the data packet on the transmission network.

In one embodiment, the transmission network is a gas network or a hybrid network comprising a gas network and an electrical transmission network, the gas network being coupled to the electrical transmission network. In this embodiment, the packets transmitted from a deterministic gas source, preferably a gas storage, have a remainder constantly equal to zero. In one embodiment, wherein the source for the gas energy packets is a power-to-gas plant, the nominal power and the remainder of the gas energy packet is determined according to the transmission ratio for the electric power to the gas power, that is, the chemical energy per unit time, of the power-to-gas plant. In one embodiment, the physical power flow associated with a gas packet is defined by the mass flow and the specific energy content kW/kg of the gas. The mass flow can be determined e.g. by Coriolis mass flow meters. The power flow along a previously determined path can then be implemented with controllable pumps. The loads available to the gas grid are, for example, gas-fired power plants, industrial plants or private households. In addition to power-to-gas sources, sources in the gas grid are primarily biogas plants and perhaps in the future gas production plants with technologies based on synthetic biology.

In a hybrid grid, the nodes at which the electricity and gas grids are coupled are central. We refer to these nodes as gateways. They usually consist of bidirectional power-to-gas plants. Very large losses occur during the transition from the electricity to the gas grid. These are considered transmission losses for the purposes of the present application.

For a transmission of an energy packet E, via a transport path from a source Q to a load S, which is determined by its data packet, the source and the load have committed themselves prior to the transmission in the context of routing and one of the known pricing procedures, such as an auction, that the source will supply a physical power into the load which is an element of the power class of the energy packet and the load has committed itself to purchase this power.

This may result in the actual power required by the load differing from the power injected by an amount $\delta(t)$. This means that the demand of the load may be exceeded if the source supplies more power than required. In this case, $\delta(t)$ is positive. Likewise, the source can supply too little power and there is a shortage with a negative value of $\delta(t)$. Due to the condition that the physical power to be injected and purchased must be elements of the power class of the energy packet, the amount $|\delta(t)|$ is limited to a maximum value C(t). The determination of C(t) is dealt with in a subsequent section. The task thus arises as to how the resulting shortage or excess is compensated.

In one embodiment, this task is solved for loads that have an analogue energy storage in their analogue part, which does not belong to the transmission network, in that this energy storage can deliver or absorb a power up to a maximum of C(t) in order to compensate δ(t).

In the event that a load does not have such an analogue storage with a sufficiently large C(t), the compensation task is solved by the following embodiment.

In one embodiment of the invention, the data packet further describes iv) a previously determined compensation path of the transport graph of the electrical transmission network connecting a previously determined compensation node $K_{SAS}$ to the demand node $K_S$ via a plurality of edges, wherein the compensation node $K_{SAS}$ at any point in time t of the transmission period T of the energy packet can absorb a physical power up to a previously determined maximum compensation power C(t), where the previously determined maximum compensation power C(t) is determined as a function of the remainder R(t), or can deliver a physical power up to the maximum compensation power C(t), optionally increased by a loss drop determined by a prediction, via the compensation path, and wherein in step C) the physical power flowing between the compensation node $K_{SAS}$ and at least the demand node $K_S$ is adjusted for at least one location x on the plurality of edges of the compensation path such that the physical power at this at least one location x at any point in time t within the transmission period T is an element of an equivalence class $\{p_{nom}(t)=0, R(t)=C(t), T\}$ with a nominal power $p_{nom}(t)$ of zero and a remainder with the value of the previously determined maximum compensation power C(t), and that at at least one location x of the demand edge, the physical power $p_\varphi(x,t)$ flowing over the demand edge between the demand node $K_S$ and the load S connected to this demand node is equal to the nominal power $p_{nom}(t)$ of the energy packet plus a compensation power δ'(t) as a function of the prediction, and/or the data packet describes v) a predetermined compensation path of the transport graph of the transmission network connecting via a plurality of edges a predetermined compensation node $K_{Aus}$ and the supply node $K_Q$, wherein the compensation node $K_{Aus}$ at any point in time t of the transmission period T of the energy packet has a physical power up to a predetermined maximum compensation power D(t), the previously determined maximum balancing power D(t) being determined as a function of the remainder R(t), or can deliver a physical power up to the maximum balancing power D(t), optionally increased by the loss drop determined by a prediction, via the balancing path, and wherein in step C) the physical power flowing between the balancing node $K_{Aus}$ and the supply node $K_Q$ is set for at least one location x on the plurality of edges of the balancing path such that at this at least one location x this physical power at any point in time t within the transmission period T is an element of an equivalence class $\{p_{nom}(t)=0, R(t)=D(t),T\}$ with a nominal power $p_{nom}(t)$ of zero and a remainder with the value of the previously determined maximum balancing power D(t), and in that the physical power $p_\varphi(x,t)$ flowing between the supply node $K_Q$ and the demand node K_S for at least one location x on the plurality of edges of the transport path is an element of the equivalence class $\{p_{nom}(t) R(t),T\}$ of the energy packet.

This embodiment is also referred to as compensation within the meaning of the present application and makes it possible to compensate for a deviation δ(t) between the power fed into the demand edge $e_p$, or into the demand edge 5.920 as a partial edge of $e_p$, via the transport path TP(E, Q, S, T) during the transmission of the energy packet and the power actually required by the load connected to the demand edge.

For exemplary explanation, we now consider a case wherein the data packet describes a transport graph formed from a previously determined transport path TP(E, Q, S, T) and a previously determined compensation path KP($K_S$, $K_{SAS}$). In the following, we refer to a transport graph with one or more compensation paths forming a compensation graph as an extended directed transport graph or a compensation extended directed transport graph. Since transport paths and transport graphs are always directed, we occasionally omit this addition. The compensation path connects a compensation node via an undirected path with the supply node $K_S$ of the transport path TP(E,Q,ST). For simplicity, we denote the transport path with TP and the compensation path with KP. The compensation path as an undirected path is to be understood as a subgraph of the directed transport graph in the sense of the isomorphism between an undirected graph and the symmetric hull of a graph and its inverse graph described above. Since the compensation node $K_{SAS}$ can be both a source and a load, $K_{SAS}=K_{Q\&S}$ holds. Thus, $KP=KP^+ \cup KP^-$, where $KP^-$ is the directed path connecting $K_S$ to $K_{SAS}$. The directed path $KP^+$ is the inverse path to $KP^-$ and connects $K_{SAS}$ to $K_S$. Since the demand node $K_S$ is an Ohm node, we have used the corresponding preceding convention for the sign of it.

The compensation path and the compensation node $K_{SAS}$ have been determined beforehand in such a way that $K_{SAS}$ can absorb a physical power up to a previously determined maximum compensation power C(t) at any point in time t in the transmission period T of the energy packet, the previously determined maximum compensation power C(t) being determined as a function of the remainder R(t), or a physical power up to the maximum compensation power C'(t), wherein C'(t) is determined by optionally increasing C(t) by a loss drop determined by a prediction, via the compensation path.

In a preferred embodiment, C'(t) is always equal to C(t) increased by the loss drop that occurs when C(t) is transferred via the corresponding compensation path. In the following, we only consider this embodiment. In one embodiment, $K_{SAS}$ can absorb a maximum of physical power up to $C(t)=f_C(R(t))$ via KP or, more precisely, via the directed path $KP^-$ and deliver the physical power $C'(t)=C(t)+v_{KP}(t)$ via KP or, more precisely, via the directed path $KP^+$ and supply it into $K_S$. Here R(t) is the remainder of the power class $\{p_{nom}(t),R(t),T\}$ of the energy packet E that is transmitted via TP and $v_{KP}(t)$ is the loss that would occur when transmitting a physical power of C(t) via KP. In one embodiment, C(t) can be determined as $C(t)=f_C(R)=2R$.

In one embodiment, the demand node $K_S$, 1.900, is connected both via a connection edge $e_{p-1}$ with the partial path of the transport path TP, which connects $K_S$ with Q, and with an active edge $e_1^{KP}$ of the compensation path KP and via the demand edge 5.910, as a partial edge of the demand edge $e_p$, with the demand QFC 2.900.

In one embodiment in which the transmission network is a high-voltage direct current electrical network, the physical power is measured during the transmission of the energy packet when it is fed in via the connection edge $e_{p-1}$ of TA to the demand node $K_S$. This is done by the corresponding sensor 1.300 at the location x" of the inner edge of the ohm node $K_S$, that connects $e_{p-1}$ to the inner bus. This is done by the corresponding sensor 1.300 at location x" of the inner edge of the ohm node $K_S$, which connects $e_{p-1}$ with the inner bus. With the help of a prediction, the value for the location $x_p^{K_S}$ of the physical power fed into the demand edge there is determined from these measured values and denoted with $A_{\varphi Ein}(t)$. Here $x_p^{K_s}$ denotes the connection point of the demand edge $e_p$, 5.900, to the demand node $K_S$, 1.900. Furthermore, the demand power that must be fed into the demand edge via the demand node $K_S$ to cover the prediction demand is determined by a demand prediction and denoted by $p_{\varphi Bed}(t)$. In one embodiment, this prediction is refined by repeating the prediction. In doing so, at least the prediction period $T_{prog}$ or the interval between the time of prediction generation (hereinafter also referred to as prediction time t°) and the execution time $t_0$ can be shortened. This refinement then provides increasingly accurate values for $p_{\varphi Bed}(t)$. To simplify matters, we assume for example that the demand node $K_S$ is only connected to edges of the transport and compensation path as well as to the demand edge.

Since $p_{\varphi Bed}(t)$ is taken from the ohm node and fed into the load via the demand edge, it must be subtracted from the fed-in power $p_{\varphi Ein}(t)$ when balancing the power on the bus of the ohm node $K_S$. The result is the power balance difference $\delta(t)$ on the bus of the ohm node, which arises due to possible shortages or excesses and can be determined as $p_{\varphi Ein}(t)-p_{\varphi Bed}(t)=\delta(t)$.

For $\delta(t)>0$, conventional control technology is used to adjust the physical power at the location $x_{Komp}$ of the QFC node of the active edge $e_1^{KP}$ of KP so that it is equal to $\delta(t)$ in order to supply it into $K_{SAS}$.

For $\delta(t)<0$, the physical power is then adjusted at $x_{Komp}$ using conventional control technology so that it is equal to $|\delta(t)|$ and in order to be fed into $K_S$. In both cases, the power is always set so that $|\delta(t)| \leq C(t)$. This condition results from the fact that $K_{SAS}$ can absorb a maximum power of $C(t)$ at each point in time t in the transmission period T, and thus at the location $x_0^{Komp}$ of the connection point of KP to $K_S$ the physical power must not be greater than $C(t)$. If the maximum power delivered by $K_{SAS}$ is $C'(t)=C(t)+v_{KP}(t)$, then this drops to $C(t)$ at the connection point $x_0^{Komp}$.

Thus, at each point in time t in the transmission period T, the physical power $p_\varphi(x_0^{Komp}, t)$ transmitted on the compensation path is set so that for the physical power at the location $x_0^{Komp}$, $-C(t) \leq p_\varphi(x_0^{Komp}, t) \leq C(t)$ applies. Thus, $p_\varphi(x_0^{Komp}, t)$ for each point in time tin the transmission period T is an element of the power class $\{p_{nom}(t)=0, R(t)=C(t),T\}$ with a nominal power $p_{nom}(t)$ of constant equal to zero and a remainder with the value of the previously determined maximum compensation power $C(t)$.

In one embodiment, $\delta(t)$ can be set, starting at execution time $t_0$, for each point in time t of the transmission period, so that $p_{\varphi Ein}(t)-p_{\varphi Bed}(t)-\delta(t)=0$, by keeping the bus voltage of the internal bus of $K_S$ constant by controlling the compensation QFC of the active edge.

According to the powers thus set, $p_{\varphi Bed}(t)=p_{\varphi Ein}(t)-\delta(t)$. Since $p_{\varphi Ein}(t)$ must be an element of the power class $\{p_{\varphi Bed}(t),R(t),T\}$, there is a $\mu(t)$ such that $p_{nom}(t)+\mu(t) \cdot R(t)$ holds. By setting the physical power for each point in time tin the transmission period T and the information stored in the data packet on the transport and compensation path, the physical power at the connection point $x_p^{K_S}$ becomes $p_\varphi(x_0^{Bedarfskante},t)=p_{nom}(t)+\mu(t) \quad R(t)-\delta(t)=p_{nom}(t)+\delta'(t)$, wherein $\delta'(t)$ is a compensation power.

In one embodiment, the data packet describes and/or
v) a previously determined balancing path of the transport graph of the transmission network which connects a previously determined balancing node $K_{Aus}$ and the supply node $K_Q$ via a plurality of edges, the balancing node $K_{Aus}$ absorbing a physical power up to a previously determined maximum balancing power $D(t)$ at any point in time t of the transmission period T of the energy packet, the previously determined maximum balancing power $D(t)$ being determined as a function of the remainder $R(t)$, or can deliver a physical power up to the maximum balancing power $D(t)$, optionally increased by the loss drop determined by a prediction, via the balancing path, and wherein in step C) the physical power flowing between the balancing node $K_{Aus}$ and the supply node $K_Q$ is set for at least one location x on the plurality of edges of the balancing path such that at this at least one location x this physical power at any point in time t within the transmission period T is an element of an equivalence class $\{p_{nom}(t)=0, R(t)=D(t),T\}$ with a nominal power $p_{nom}(t)$ v of zero and a remainder with the value of the previously determined maximum balancing power $D(t)$, and that the physical power $p_\varphi(x,t)$ flowing between the supply node $K_Q$ and the demand node $K\_S$ for at least one location x on the plurality of edges of the transport path is an element of the equivalence class $\{p_{nom}(t),R(t),T\}$ of the energy packet.

In one embodiment, the data packet may describe only a pre-determined balancing path or a pre-determined compensation path or a pre-determined compensation path and a pre-determined balancing path of the pre-determined transport graph. In an exemplary embodiment of the invention, the data packet uniquely associated with the energy packet describes a balancing-only enhanced transport graph ETG (TP(E, Q, S); AP($K_{Aus}$, Q)) of the transmission network with a predetermined balancing path AP ($K_{Aus}$, Q).

As for the cases in which the power generated and injected by a source into the transmission path is not an element of the required power class of the energy packet to be transmitted at every point in time of the transmission period, in one embodiment of the invention the method describes how the resulting deviations to the conditions of the power class are compensated. If at a point in time $t_{aus}$ in the transmission period T the power fed into the supply node via the supply edge $e_1$ from the source located at location $x_0$ of the transmission network exceeds the limit of (($p_{nom}(t_{aus})+R(t_{aus})$), then for this point in time there is a deviation of the limits specified by the energy packet by the excess $\rho^-(t_{aus})=p_\varphi(x_1^{K_Q}, t_{aus})-((p_{nom}(t_{aus})+R(t_{aus}))>0$. If, on the other hand, at a point in time $t_{aus}$ the limit $(p_{nom}(t_{aus})-R(t_{aus}))$ is underrun by the value $\rho^+(t_{aus})=((p_{nom}(t_{aus})-R(t_{aus}))-p_\varphi(x_1^{K_Q}, t_{aus})>0$, the deviation is a shortage. Here, the excess is provided with a negative sign in the exponent of $p^-$ to indicate the flow direction from the supply node $K_Q$ into the balancing path. The positive exponent indicates the flow direction into the ohm node $K_Q$. The signs were chosen according to the selected sign rules for an ohm node. Here $x_1^{K_Q}$ is the location of the connection point of the supply edge $e_1$ to the supply node $K_Q$. In one embodiment, this excess $\rho^-(t_{aus})$ or shortage $\rho^+(t_{aus})$ is compensated for these times $t_{aus}$ by a balancing node $K_{Aus}$ of a balancing path AP($K_{Aus},K_Q$) of a previously determined extended transport graph. The balancing path AP($K_{Aus}, K_Q$) connects the supply node $K_Q$ with the balancing node $K_{Aus}$. The balancing node $K_{Aus}$ can, as a $K_{Q\&S}$ node, take up a previously determined maximum balancing power $D(t)$, the previously determined maximum balancing power $D(t)$ being determined as a function of the remainder $R(t)$, or deliver a physical power up to the maximum balancing power $D(t)$, optionally increased by the loss drop determined by a prediction, via the balancing path. In a preferred embodiment, $K_{Aus}$ can absorb a maximum power of D(t) or deliver a maximum power of $D'(t)=D(t)+v_{AP}(t)$ for each $t \in T$.

Here $v_{AP}(t)$ is the power loss that occurs during the transmission of D(t) via AP. The supply node is connected to the balancing path by an active edge of the balancing path. By a measurement and a prediction for $p_{q}$, $(x_1^{KQ}, t)$, in one embodiment, it can be checked for each point in time $t \in T$ whether there is an shortage or an excess for this point in time and thus determined with $t=t_{aus}$, $\rho^+(t_{aus})$ and $\rho^-(t_{aus})$ respectively. Thus, at the active edge $e_1^{AP}$ of AP connected to $K_Q$, at the location $x_1^{AP}$ of $e_1^{AP}$, the power can be set such that the physical power for location $x_1^{AP}$ is an element of power class $\{0, D(t), T\}$. Here $x_1^{AP}$ is the location of the connection point of $e_1^{AP}$ to $K_Q$. Similarly, if the physical power at location $x_1^{AP}$ of the supply edge is set to be equal to the predicted power at $x_1^{KQ}$, the physical power $p_q(x,t)$ for at least one location x on the plurality of edges of the transport path is an element of the equivalence class $\{p_{nom}(t), R(t),T\}$ of the energy packet.

In one embodiment, the compensation and balancing for the transmission of an energy packet E with a power class $\{p_{nom}(t),R(t),T\}$, from a source Q via a transport path TP to a load S, according to claim 1, is solved in that, for the compensation, an additional load S_ is connected via an additional previously determined path P⁻ to the supply node $K_Q$, the sources Q and an additional source $Q_+$ is connected via a further previously determined path P⁺ to the demand node $K_S$ m of the load S, so that via P⁻ an additional second energy packet with the power class $\{P_{nom}(t)=(\frac{1}{2}(C(t)+D(t))), R(t)=(\frac{1}{2}(C'(t)+D'(t))), T\}$ is transmitted to the load S_ and via the path P⁺ from the source $Q_+$ a further packet with the power class $\{P_{nom}(t)=(\frac{1}{2}(C'(t)+D'(t)), R(t)=(\frac{1}{2}(C(t)+D'(t))),T\}$ is fed in.

The load S_ can take in a maximum power of C(t)+D(t) via P⁻ and the source $Q_+$ can supply a maximum power of C'(t)+D'(t) via the path P⁺ into $K_S$. For this case, the supply as well as the demand prediction and the routing must determine these additional nodes and paths. C(t); C'(t); D(t) and D'(t) are determined as described above.

In one embodiment of the invention, the method for an arbitrarily selectable prediction period $T_{prog}$ with a prediction start $t_{0prog}$ and a prediction duration $DT_{prog}$ further comprises the steps of, at a prediction time $t^0$ which lies prior to the prediction start $t_{0prog}$, D) generating of a supply prediction for a supply power $p_{progEin}(t)$ to be supplied at any point in time t in the prediction period $T_{prog}$ from the respective source, wherein the supply prediction has a supply prediction uncertainty, and E) generating a demand prediction for a power demand $p_{progBed}(t)$ predicted to be required by the respective load at any point in time t in the prediction period $T_{prog}$, wherein the demand prediction has a demand prediction uncertainty, wherein the temporal course of the nominal power $p_{nom}(t)$ of the energy packet is determined at least from the supply prediction and the demand prediction, and wherein the temporal course of the remainder R(t) is a function of at least the supply prediction uncertainty and the demand prediction uncertainty.

This embodiment makes it possible to determine the corresponding energy packets transmitted via the transport graphs by predicting the generation of a source, the demand of a load and optionally the transmission losses.

In one embodiment, the prediction generation is a dynamic process in the form of a time series of repetitive predictions $\mathcal{P}$, in which the distance between the prediction time $t^0$ and the start $t_{0prog}$ of the prediction period $T_{prog}$ becomes smaller and smaller. Here, the prediction time $t^0$ denotes the point in time at which the prediction is created. The prediction period $T_{prog}$ has a prediction duration $DT_{prog}$, which begins with the start $t_{0prog}$. In this embodiment, the procedure is started by first creating predictions for the generation of the sources and the demand of the loads for a prediction period in the distant future with a large prediction duration $DT_{prog}$. Demand data packets are derived by using the corresponding predictions to determine power classes and thus data packets for the generation of a source and the demand of a load. By repeating these predictions, whereby the interval between the prediction time $t^0$ and the start $t_{0prog}$ of the prediction period $T_{prog}$ becomes shorter, and/or the prediction duration $DT_{prog}$ is shortened, these predictions become increasingly accurate.

In one embodiment, a prediction $\mathcal{P}(X, t^0, T_{prog})$ is generated at a point in time $t^0$ for the temporal course of a power for at least one location or a subgraph of the graph of the transmission network. Here, X denotes the different prediction types. For example, X=Q or X=$x_c$, denotes a supply prediction for the supply power of a source Q at location $x_Q$. A demand prediction for the demand power of a load S at location $x_S$ is denoted by X=S or by X=$x_S$. Correspondingly, X=$v_{e_i}$ stands for the power loss that occurs during the transmission of an energy packet E via an edge $e_i$. However, one can also write X=v(x=ω($e_i$)) for this. Here x=ω($e_i$) denotes the power loss at the end point x of the edge $e_i$ at which this edge is connected to the next node. For the power loss that occurs during the transmission of an energy packet via a path P($K_i$, $K_j$) connecting the nodes $K_i$ and $K_j$, then X=P($K_i$,$K_j$). X=$K_i$ or X=$x_{K_i}$ are the predictions of the losses that occur during the transmission of an energy packet via a node of a transport path. Here $x_{K_i}$ stands for the location of the node $K_i$. In the prediction period $T_{prog}$, by the mapping $\mathcal{P}(X, t^0, T_{prog}) \rightarrow \{p_{nom}(t),R(t),T_{prog}\}$ a power class is assigned to the prediction by setting $p_{nom}(t)$ equal to the variation of the expected value of the prediction for the corresponding power denoted by X and the time variation of the remainder R(t) as a function of the variance of this prediction. In the embodiment in which, for example, the probability distribution for the probability that the predicted power assumes a certain value is a Gaussian distribution, the expected value is the mean value and the variance is the standard deviation. Here $p_{nom}(t)$ describes the function graph in the prediction period $T_{prog}$, i.e. the power flow.

In one embodiment, the power lot $p_{progEin}(t)$ that can probably be provided by a source Q in a future period, which future period is denoted the prediction period $T_{prog}$, is determined by generating a supply prediction $p_{progEin}(t)$ in the form of the time histories of the expected value or mean value for the power $\mathcal{P}(Q\,t^0, T_{prog})$ and the supply prediction uncertainty given by the variance or standard deviation $\sigma_{Ein}(t)$.

In one embodiment, associated measured values are recorded for the supply prediction of the respective source 6.000. This also includes sensors that are provided directly at the source and record measured values that describe the state of the source, as well as measured values of a QFC node 2.800 connected to the source via the supply edge. In addition, in one embodiment, measured values of sensors of a perimeter network 210.000 assigned to the source are taken into account for the supply prediction. The perimeter network comprises sensors for recording additional measured values in addition to the measured values of the transmission network. These are measured values relevant for the power generation of the corresponding source, such as wind speed, which are recorded at various distances from the corresponding sources. In one embodiment, the perimeter network also comprises sensors that, in addition to the measured values of the load, record measured values associated with the load that are relevant for the demand and thus for the demand prediction. The recorded measured values are transmitted to a control instance 220.000 of the data and computer network 200.000 assigned to the prediction for this source and the load respectively. Using these measured values and other information, such as global weather predictions from a weather service, the control network creates the supply prediction at a prediction time $t^0$.

In one embodiment, the supply predictions are formed on the basis of mathematical models, such as weather models, through several calculation runs as well as the combination of the results of different models and their static evaluation as well as the mapping to the sources under consideration and their generation characteristics. In one embodiment, the supply predictions for the respective source under consideration are generated using artificial intelligence methods and technologies, such as Deep Learning Networks (DLN).

By a supply prediction we also mean the exact generation output of a deterministic source. These differ only in that the corresponding models do not contain any uncertainty, but are exact and there is therefore no prediction uncertainty. The remainder $R(t)$ of the power class, which describes an energy packet of such a supply prediction, is then zero regardless of time.

In one embodiment, at a prediction time $t^0$, the power demand $p_{progBed}(t)$ that is likely to be purchased by a load S in a future period, the prediction period $T_{prog}$, is calculated by generating a demand prediction $(S, t^0, T_{prog})$ in the form of the time histories of the expected value or mean value for the power demand $p_{progBed}(t)$ and the power demand $p_{progBed}(t)$ determined by the variance or standard deviation standard deviation $\sigma_{Bed}(t)$.

Depending on the type of loads 7.000, there are different embodiments for the demand predictions. Embodiments of loads include whole residential areas with private households, private houses, a single industrial campus, commercial enterprises, up to individual consumers such as electric cars which, when charged, constitute a load, as well as other forms of loads such as power-to-gas or SynBio-Gas plants. However, electric cars with their storage units can also constitute sources in the sense of the present application at the same time. Possible embodiments for the demand predictions are the statistical methods already used today up to predictioning methods based on artificial intelligence, e.g. Deep Learning Networks. In one embodiment of a demand prediction for an industrial company, the results of sales predictions and production planning are taken into account when determining the power demand $p_{progBed}(t)$.

According to the preceding description, there are embodiments for the demand predictions that create the demand predictions for the individual loads on the basis of global predictions. For example, a demand prediction for a private household can be derived from the usual statistical demand predictions as they are already used today, from the consumption in the past, the house and property size, the number of inhabitants and their profile.

In a preferred embodiment, measured values are recorded for the demand predictions in the same way as for the supply predictions. Measured values can be recorded e.g. at the demand QFC 2.900 but especially with sensors of a perimeter network that are assigned to the load. The sensors of the perimeter network can be sensors, e.g. in an industrial plant, which record the current power consumption of large consumers, for example. In one embodiment, these measured values are transmitted back to the control instance 220.000 assigned to the demand prediction of this source. This control instance generates the demand prediction using, for example, data obtained from outside. The externally obtained data can be, for example, the predictions for the probable temperature course to be expected. From these, the expected electrical power consumption, e.g. for air conditioning, can be predicted in summer, for example.

In one embodiment, the transmission losses can be determined for already known and probable transport graphs for the transmission of an energy packet as part of the demand prediction.

According to one embodiment, an energy packet E is transmitted from a previously determined source to a load via a previously determined transport graph $TP(E, Q, S, T)$ in order to meet the demand of the load. In this case, the energy packet to be transmitted is determined in that the time characteristic of the nominal power $p_{nom}(t)$ of the power class $\{p_{nom}(t), R(t), T=T_{prog}\}$ of the energy packet is determined at least from the supply prediction and the demand prediction and the time characteristic of the remainder $R(t)$ of the power class is a function of at least the supply prediction uncertainty and the demand prediction uncertainty.

In one embodiment, the determination of the power class of an energy packet that is possibly to be transmitted between the relevant source 6.000 with the supply prediction and the considered load 7.000 with the demand prediction is carried out in relation to the ratios of the two predictions to each other on a case-by-case basis according to predefinable rules.

Thus, in one embodiment, in the event that the source according to the supply prediction can probably provide more power than the load according to the demand prediction for all points in time t in the same prediction period $T_{prog}=T$ probably requires, I.e. the following applies $p_{progEin}(t)=p_{progBed}(t) \geq p_{progBed}(t) \forall t \in T$, and the prediction uncertainty of the supply prediction is less than or equal to that of the demand prediction, i.e. it is $R_{progEin}(t) \leq p_{progBed}(t) \forall t \in T$, the time history of the nominal power $p_{nom}(t)$ of the energy packet is determined by $p_{nom}(t)=p_{progBed}(t)$ and the time history of the remainder is determined by $R(t)=R_{progged}=\sigma_{Bed}(t) \cdot P_{progBed}(t)$, so that the power class of the energy packet is $\{p_{non}(t)=P_{progBed}(t); R(t)=\sigma_{Bed}(t) \cdot p_{progBed}(t), T\}$. In the case that $R_{progEin}(t) > R_{progBed}(t) \forall t \in T$, in one possible embodiment the remainder of the energy packet $R(t)$ is set equal to $R_{progEin}(t)$. In the case that $p_{progEin}(t) < p_{progBed}(t)$ and $R_{progEin}(t) \leq R_{progBed}(t) \forall t \in T$, an energy packet derived from this can only cover a part of the demand. For this part, in one embodiment, the supply prediction is then taken to determine the power class of the energy packet that is used for the partial coverage of the demand. In an embodiment in which the magnitude ratios between the supply prediction and the demand prediction are reversed over time, the power class is determined piecetneal by restricting the time period to partial intervals in which the corresponding preceding rules apply.

In one embodiment of the invention, the method comprises the steps of

F) forming a demand data packet $\{p_{progBed}(t), R(t), T_{prog}\}$ of the load, the demand data packet describing the predicted temporal course of the nominal power required by the load $p_{nomBed}(t)$ at any point in time t within the prediction period $T_{prog}$ and the temporal course of a remainder R(t) as a function of the demand prediction uncertainty of the demand prediction at any point in time t within the prediction period $T_{prog}$, G) forming a supply data packet of the source, the supply data packet describing the predicted temporal course of the nominal power $p_{nomEin}(t)$ to be supplied by the source at any point in time t within the prediction period $T_{prog}$ and the temporal course of a remainder R(t) as a function of the supply prediction uncertainty of the supply prediction at any point in time t within the prediction period $T_{prog}$ and wherein forming of the equivalence class of an energy packet for transmission from a source to a load comprises at least one allocation of a sub-packet of the supply data packet to a sub-packet of the demand data packet at least to meet the demand of the load.

In one embodiment, the supply and demand data packets are formed by the steps of 1. forming a demand data packet $E_S^{Bed}$ with the power class $\{p_{progBed}(t), R_{Bed}(t), T_{prog}\}$ of the load, the demand data packet containing the predicted time history of the nominal power $p_{progBed}(t)$ required by the load S, at each time t within the prediction period $T_{prog}$ and the temporal course of a remainder $R_{bed}(t)$ as a function of the demand prediction uncertainty of the demand prediction at each time t within the prediction period $T_{prog}$,
2. forming a supply data packet $E_Q^{Ein}$ of source Q, where the power class $\{p_{progEin}(t), R_{Ein}(t), T_{prog}\}$ of the supply data packet describes the prediction temporal course of the nominal power $p_{progEin}(t)$ to be fed in by the source at each point in time t within the prediction period $T_{prog}$ and the temporal course of a remainder $R_{Ein}(t)$ as a function of the supply prediction uncertainty of the supply prediction at each point in time t within the prediction period $T_{prog}$.

In one embodiment, for example, on the basis of the mean value, which is set equal to $p_{proX}$, of the results of the corresponding prediction calculations $\mathcal{P}(X, t^0, t \in T_{prog}$ for each $t \in T_{prog}$ and the associated determination of the remainder as a function of the standard deviation σ(t), the corresponding supply and demand data packets are formed by carrying out the corresponding predictions as described above on the correspondingly assigned control instances 220.000 and then forming corresponding demand and supply data packets there based on these predictions.

In one embodiment, where the standard deviations are expressed as a percentage, the remainders are formed, for example, by the product of a multiple of the corresponding standard deviation σ(t) with the mean value $p_{prog}X$. In one embodiment, for example, $R_{progX}(t)$ is determined by $R_{progX}(t)=2 \cdot \sigma(t) \cdot p_{progX}(t)$.

In one embodiment, the fast and simple determination of the energy packets and the transmission graphs as well as the simple transmission of these energy packets is made possible by dividing the time and the power into fixed time and power slices dt, the time quanta, and dp, the power quanta. In this embodiment, time is divided into intervals of fixed length dt for this purpose. This defines an equivalence relation, so that all t and t' are equivalent exactly when the amount of the difference between t and t' is smaller than dt. For the choice of a temporal reference point, every point in time t after this reference point $\hat{t}$ can thus be assigned to exactly one interval i·dt, where $i \in \mathbb{N}$, $\mathbb{N}$ including zero, is a positive integer. With this choice, all times that lie in one of these time intervals are treated equally and are represented by number $i \in \mathbb{N}$. This means that for each point in time t with respect to an arbitrarily selectable but fixed reference time t there is an $i \in \mathbb{N}$ such that $t=\hat{t}+i \cdot dt$. Furthermore, let all transmission periods T in this embodiment be a positive integer multiple of dt. That is, in one embodiment, the point in time t is represented by $i \in \mathbb{N}$ and the transmission period is represented by $k \in \mathbb{N}$. Analogously, in one embodiment, the nominal power $p_{nom}(t)$ is required to be a positive integer multiple of a constant elementary power level dp at each point in time t. This means that for each point in time t the following applies: $p_{nom}(t)=p_{nom}(i)=n_i dp$. Here $n_i$ is the positive integer multiple of dp in time interval i. The remainder R(t) is treated analogously, so that $R(t)=R(i)=m_i dp$ applies. Thus the residue for each point in time t represented by an integer i is an integer multiple of dp and is represented by the integer $m_i$. In this embodiment, the power classes $\{p_{nom}(t), R(t), T\}=\{i, n_i, m_i, k\}$ are then represented by the corresponding positive integers i, $n_i$, $m_i$, and k.

Furthermore, one embodiment of the invention allows for easy management of energy storage devices that are themselves nodes in the transmission network. These storages are both sources and loads, and in embodiments also compensation and balancing nodes. For this purpose, in this embodiment, corresponding control instances 220.000 executed on the data and computer network are connected to the storages and there the storage management is implemented for management. For the management of the storage and the storage content of a storage, the storage is divided into an analogue storage portion, the so called sump, and a quantised or digitised memory portion. In this embodiment, the memory content of the quantised portion can be represented as an integer multiple of dp·dt. That is, the quantised fraction consists of energy packets with power class ({dp, R=0, dt}. The remainder here is zero, since the quantised portion of the storage is a deterministic source or load. Let us now consider in this embodiment the storage of a quantised physical power flow. This can be represented by $p_\varphi(t)=n_i \cdot dp+\mu_i \cdot m_i \cdot dp$. Note that, for all i, $\mu_i$ cannot be an integer because of its definition. It follows that the product $\mu_i \cdot m_i$ can be represented as the sum of an integer $m'_i$ and a $\mu_i'$, with $0 \leq |\mu_i'| < 1$. It follows that any "quantised" power flow can be represented as the sum of an integer part of dp and a "remainder" of $\mu i' dp < dp$, so that $p_\varphi(t)=(n_i+m_i') \cdot dp+\mu_i' \cdot dp$ holds. If we set $k_i=n_i+m_i$, then the $k_i$ elementary energy packets of size $dE=dp \cdot dt$ are included in the quantised part of the memory by the memory management and the "energy packet" $\mu_i' \cdot dp \cdot dt$ for all I from T is stored in the sump. If quantised packets can be formed again by recording these portions and the existing analogue memory content of the sump, the memory management assigns them to the quantised portion. With the help of the sump, the memory can also provide a physical flow, as shown above, if required.

For this to work, the storage management must manage and control the two portions accordingly. In this embodiment, the memory management is carried out on control instances 220.000 assigned for this purpose. For this purpose, the actuators for power consumption and output by the storage unit as well as the sensors of the storage units are connected to the corresponding control units via the data and computer network 200.000. The corresponding sensors of the storage tanks transmit the measured values required for storage tank management, such as the fill level or, in the case of electric storage tanks, the state of charge. By means of corresponding models of the storage tanks, the necessary predictions for the supply as well as for the demand power as well as for the charging losses can then also be created.

In one embodiment, analogue storage units in the analogue parts of the sources or the loads are provided with sensors of the perimeter network that determine the state of charge of these storage units, so that within the framework of the supply or the demand predictions for the corresponding source or load, the maximum power that these storage units can supply into the analogue part of the source or load, as well as the maximum power that these storage units can absorb from the analogue part of the source or load, are determined for each point in time of the transmission period on the basis of these measurements.

In addition, one embodiment makes it possible to set the physical power flow in such a way that, apart from minimal technically unavoidable deviations, it is an integer multiple of the elementary power dp and is composed of both an integer multiple of dp as the nominal power and an integer multiple of dp as the remainder.

For this purpose, in one embodiment, dt and dp are chosen to be sufficiently small, and each QFC node 2.000 has an analogue buffer, analogous to the sump of the memories, so that at least at the locations of the edges connected to the respective QFC node, the physical power flows can be set as integer multiples of dp. This means that these buffers either absorb the "remainders" already mentioned above or fill them up to a whole dp.

In one embodiment of the invention, when a plurality of energy packets are transmitted simultaneously over exactly one edge of the transmission network, the following steps are carried out H) superpositioning the simultaneously transmitted energy packets to exactly one simultaneous energy packet with a superpositioned simultaneous data packet, I) adjusting the physical power flowing via the exactly one edge, so that the physical power at at least one location x of the exactly one edge is an element of the equivalence class $\{p_{nom}(t), R(t), T\}$ of the superpositioned simultaneous data packet of the exactly one simultaneous power packet formed by the superpositioning in step H), wherein the nominal power $p_{nom}(t)$ of this equivalence class $\{p_{nom}(t), R(t), T\}$ is the sum of the nominal powers of the simultaneously transmitted energy packets, wherein in the summation for the nominal power $p_{nom}(t)$ the flow directions of the power is taken into account, and wherein the remainder $R(t)$ of the equivalence class $\{p_{nom}(t), R(t), T\}$ is the sum of the remainders of the simultaneously transmitted energy packets and wherein for the summation of the remainder the flow direction is disregarded.

In one embodiment, the energy packets $E_i$ of the sources $Q_i$ with the transmission periods $T_i$ or their sub-packets, which are transmitted simultaneously via exactly one edge, are determined by the fact that all of these transport graphs, which are stored and described in the data packets of the energy packets, contain this edge and that there is a non-empty intersection $T'=\cap T\_i$. In this embodiment, the sub-packets $E_i' \subseteq E_i$ of the energy packets $E_i=\{p_{nom}{}^i(t), R^i(t), T^i\}$ transmitted simultaneously or at the same time over the exactly one edge are then formed by considering only points in time t within the time average T'. Thus, these sub-packets for T' are transmitted simultaneously via the corresponding edge.

Due to the fact that we have nodes such as prosumers, which can be both source and load, there are sub-packets of opposite transmission direction transmitted simultaneously over an edge. The direction is simply given by the flow direction of the associated physical power flow. In one embodiment, one direction is defined as positive and one direction as negative for the overall network.

In the preferred embodiment of a purely electrical transmission network with an exemplary global directional definition, in one embodiment we use the physical superposition principle for the simultaneous transmission of electrical power. Thus, it would be obvious to superpose the power classes by simply adding the nominal power and the remainder to form the superposition of the power classes. This is exactly the calculation rule for packets running in the same direction. But what does it look like for packets running in opposite directions? Clearly, the nominal power of the packet with negative flow direction is given a negative sign in the superposition and thus the sum is formed with the nominal power of the packet with positive flow direction. But what happens to the remainder of the packets? If the remainder were also given a negative sign, this would make no sense. This is because the remainder is defined in its essence by the variance of a prediction and describes a kind of uncertainty. If one were to proceed in this way, then the remainders would add up to zero for packets with the same remainder but flowing in the opposite direction. That would mean that the uncertainty would be zero. Then the v's of the associated physical flows would have to be equal. But this is usually not the case. Thus, only the corresponding remainders remain to be added. For this reason, the obvious calculation rule for the classes does not provide the correct result. Since the remainders describe the variances that the physical flows can take, these are not physical quantities on which the flow directions have no influence. Rather, these variances are amplified during superposition.

In a preferred embodiment, the superpositioning of the simultaneously transmitted energy packets $E_i$ to exactly one simultaneous energy packet $E_{Sim}$ with a superpositioned simultaneous data packet is performed by superpositioning the power classes of the energy packets $E_i$ constrained to the common average of their transmission periods T' and common edges and thus defining $\oplus_i$ the superpositioning operation of i power classes by adding the nominal powers of the individual power classes taking into account the flow direction and the remainders without taking into account the flow direction on common edges. Thus, the power class of the superposed simultaneous data packet of the simultaneous power packet is $\{p_{nom_{Sim}(t)}, R_{Sim}(t), T'\}=\oplus_i\{p_{n_i}(t), R_i(t), T'\}$ with which the superposition operation $\oplus_i$ of i power classes defined by $\oplus_i\{p_{n_i}(t), R_i(t), T'\}:=(\Sigma p_{n_i}(t), \Sigma R_i(t), T'\}$, wherein for negative flows $p_n=-|p_n|$ and $R=|R|$ holds.

In this embodiment, when energy packets $E_i$, with power classes $\{p_{nom_i}(t), R_i(t), T'\}$, are transmitted simultaneously over exactly one edge, the physical power over the exactly one edge is adjusted, such that the physical power at at least one location x of the exactly one edge is an element of an equivalence class $\{p_{nom_{Sim}}(t), R_{Sim}(t), T'\}=\oplus_i\{p_{nom_i}(t), R_i(t), T'\}$ of the data packet of the simultaneous energy packet. In one embodiment, the at least one location x, of exactly this edge, with respect to the transmission direction is the connection point of a QFC node to exactly this edge or, in the case of an active edge, the location of the QFC of the active edge.

In one embodiment, the method further comprises the steps of

J) at each node on the transmission network determining the fractions of energy packets pending at each edge of the respective node in an arbitrary test period for simultaneous transmission to the next node based on the data packets, K) for the duration of the test period, adjusting the power supply to each edge of the respective node so that the physical power $p_{\varphi'}(x,t)$ at at least one location x of the respective edge is an element of an equivalence class $\{p_{nom}(t) R(t),T\}$ whose nominal power $p_{nom}(t)$ is the sum of the nominal powers of the simultaneously transmitted energy packets, the flow directions of the electrical power being taken into account in the summation for the nominal power, and the remainder of which is the sum of the remainders of the simultaneously transmitted energy packets, the flow direction being disregarded for the summation of the remainder, wherein the flow direction for an electrical power fed out via an edge of the node being counted with the opposite sign compared to the flow direction of an electrical power supplied via an edge.

In one embodiment of the invention, determination of the energy packets $E_i$ transmitted simultaneously, i.e. simultaneously, over all transport graphs consisting of the transport paths, compensation paths and balancing paths is performed by the following subsequent steps: For each node $K_i \in V$ of the transmission network, determining the portions $E_i$ from the data packets of the energy packets $E'_i$ pending at each edge $e_{ki}^{in}$ in the respective node $K_i$, in an arbitrarily selectable test period T' for simultaneous transmission to this node $K_i$. Thus $e_{ki}^{in}$ are the edges over which the physical flows assigned to the energy packets are fed into node $K_i$.

In the next step, for each node $K_i$ of the transmission network, at each edge $e_{ij}^{out}$ of the respective node $K_i$, the portions $E_i$ of the energy packets $E'_i$ that are simultaneously pending for transmission to the next node are determined in an arbitrarily selectable test period T'. Wherein $E_i$, the sub-packets of the energy packets $E'_1$, with $E_i \subseteq E'_i$ formed by restricting their transmission periods $T_i$ to Thus, $e_{ij}^{out}$ are the edges into which, the simultaneously transmitted portions $E_i$ of the energy packets, associated physical flows are injected by node $K_i$.

In a preferred embodiment, all test periods have the same duration and follow each other without gaps.

In one embodiment, the shares $E_i$ of the energy packets $E'_i$ pending at each edge of the respective node in an arbitrarily selectable test period for simultaneous transmission to this node are determined from the data packets by the responsible control entities 220.000, which are executed on the data and computer network 200.000. In one embodiment, for the duration of the test period T' for the simultaneous transmission of energy packets $E_i$, the responsible control entities 220.000 controllable, the power injection at a location x into the following edge, via which simultaneous energy packets $E_i$ are transmitted, related to the direction of the superposed power flow, preferably at the connection point x of this following edge to the upstream QFC, x is set from this upstream QFC in such a way that the physical power $p_{\varphi}(x,t)$ is an element of the superposed power class of the data packet of the simultaneous energy packet $E_{Sim}$; $\{\tilde{p}_{nom}(t), \tilde{R}(t), T\} = \{p_{nom_{Sim}}(t), R_{Sim}(t),T\} = \{\oplus_i \{p''_{nom}(t), R''(t),T\}$. The data packet's nominal power $\tilde{p}_{nom}(t)$ is the sum of the nominal powers $p''_{nom}(t)$ of the simultaneously transmitted energy packets $E'_i$. In the summation for the nominal power $p''_{nom}(t)$, the flow directions of the electrical power are taken into account. The remainder $\tilde{R}(t)$ is the sum of the remainders $R'_i(t)$ of the simultaneously transmitted energy packets, whereby the flow direction is not taken into account for the summation of the remainder. The flow direction for an electrical power fed out via an edge of the node is counted with the opposite sign to the flow direction of an electrical power supplied via an edge.

In this embodiment, the superposed power class $\oplus_i \{p_{nom_i}(t), R_i(t), T\}$ defines the simultaneous energy packet $E_{Sim}$ transmitted over the respective edge, called simultaneous edge, during the test period. This simultaneous energy packet $E_{Sim}$ is formed by the simultaneous transmission of the individual packets via a simultaneous edge. In addition to this superposed power class, the superposed simultaneous data packet of a simultaneous energy packet contains the directed path, the so-called simultaneous path, as a transport path, which is formed by simultaneous edges via which simultaneous edges this simultaneous energy packet is transmitted for the transmission period T'. It is thus possible that this path consists of only one edge with its start and end nodes or of only one node.

In one embodiment, the superposition of energy packets on a common subgraph of their transport graphs can thus be generally determined by the following definition. The superposition operation $\oplus$ of n energy packets $E_i$, with transmission periods $T_i$, transport paths $TP_{E_i}$ and power classes $\{p_{nom_i}(t), R_i(t),T_i\}$ then forms the simultaneous energy packet $E_{Sim} = E_t$, which is determined by the simultaneous transmission period $T_{Sim} = \cap_{i=1}^{n} T_i$, described in the data packet of the simultaneous energy packet, the simultaneous transport path $TP_{Sim} = \cap_{i=1}^{n} TP_{E_i}$ and the simultaneous power class $\{p_{nom_{Sim}}(t), R_{Sim}(t), T_{Sim}\} = \{\Sigma_{i=1}^{n}(z_i) \cdot p_{nom_i}(t), R_i(t), T_i\}$, where by $z_i$ the sign of the energy packet according to its transmission direction is defined. The superposition operation then transforms the individual transport paths $TP_i$ into a transport graph $TG_{Sim}$ by $TG_{Sim} = \cup_{i=1}^{n} \widetilde{TG}_i \cup TG_{Sim}$, where $\widetilde{TG}_i$ is determined for each i=1 to n by $\widetilde{TG}_i = TP_i \setminus TP_{Sim}$. Thereby, with a simultaneous transport path $TP_{Sim}$, one end node according to the sign of $p_{nom_{Sim}}(t)$ is the source and at the same time the supply node for $TP_{Sim}$ and correspondingly the other end node is the load and at the same time the demand node.

In this embodiment, sub-packets for energy packets can also be defined in this way. An energy packet $E'$ is a sub-packet of an energy packet E, $E' \subseteq_{TP' \cap TP} E$ on the intersection of the transport paths TP' and TP, exactly when there is an energy packet $E_{resi}$ with a simultaneous transport path $TP_{resi}$, so that $TP_{resi} = TP' \cap TP$ and $E = E' \oplus E_{resi}$ holds.

A sub-packet E' is a maximum sub-packet on $P_E \cap TP_E$ of E with $E = E' E' \oplus E_{resi}$ if there is no E" and $E''_{resi}$ with $E = E'' \oplus E''_{resi}$ and $\|E''_{resi}(t)\| \leq \|E_{resi}(t)\|$, $\forall t \in T$. Here, $\|E(t)\| = \text{Norm}(t)$ in one embodiment denotes a norm function for an energy packet E and is given by the function that assigns a number $\text{Norm}(t) = p_{nom}(t) + R(t)$ to the power class $\{p_{nom}(t), R(t), T\}$ of E for each time $t \in T$.

In one embodiment, for a reservation period $T_{res}$, at a reservation time $t^{00}$, the reservation time $t^{00}$ being prior to the beginning of a reservation period $T_{res}$ with a start time $t_{0res}$, and a reservation duration $DT_{res}$ and wherein the reservation period $T_{res}$ lies within the prediction period $T_{pro}$, the invention further comprises the steps L) for each load, determining the amount of all transport graphs, each of which transport graphs is connected to the load, such that for each of these transport graphs, each source connected to the transport graph is connected to the load via a transport path of the transport graph and, for the reservation period $T_{res}$ via a sub-packet $E'_{Ein}$ of a supply packet defined by the supply data packet for the reservation period, wherein this available sub-packet $E'_{Ein}$ is formed by a coverage packet defined by a coverage data packet $E_D$ and a loss packet $E_v$, the coverage packets of the sources Q of the transport graph together cover a maximized portion of a demand packet of the load S defined by the demand data packet and wherein the respective loss data packet describes the loss determined by a prediction during the transmission of the respective coverage packet defined by the coverage data packet via the corresponding transport path, M) associating a loss data packet $E_v$ to each of the coverage data packets, wherein each of the coverage packets defined by the coverage data packets is transmitted via a transport path assigned thereto as a subgraph of a transport graph out of the amount of transport graphs formed according to the preceding step L), wherein a nominal power of the equivalence class of a loss packet defined by the loss data packet is determined by a prediction of the loss and the remainder of the equivalence class of the loss packet defined by the loss data packet is determined as a function of a prediction uncertainty of a loss prediction, wherein the nominal power of the loss is the power predicted to be lost in the transmission of the cover packet via the transport path from the source Q to the load S by the loss prediction, and wherein for the loss prediction all energy packets to be transmitted via the considered transport path during the reservation period are taken into account, and the transport path has an available transmission capacity to transmit the sub-packet $E'_{Ein}$ which is composed of the coverage packet defined by the coverage data packet $E_D$ and the loss packet defined by the loss data packet $E_v$, wherein the coverage packet $E_D$ defined by the coverage data packet and the loss packet E defined by the loss data packet have the same transmission direction, N) wherein the equivalence class of the sub-packet $E'_{Ein}$ is formed by adding the nominal powers of the coverage packet and the loss packet and the remainders, and wherein the loss packet has the same flow direction as the coverage packet and the transmission period T is set equal to the reservation period $T_{res}$, O) for each load, determining the optimized transport paths as subgraphs of the transport graph optimizedly determined with respect to a selected metric, wherein each source of each transport path so optimizedly determined, connecting that source Q with the load S of the transport graph for the transmission of a sub-packet of the supply packet, at any point in time t within the reservation period $T_{res}$ provides an available power which is an element of the equivalence class of the sub-packet determined in accordance with step N) above, P) forming in each case a reservation data packet for defining a reservation packet of the transport path from step O), wherein the reservation data packet of the reservation packet describes the equivalence class of the respective sub-packet of the supply packet as an equivalence class of the reservation packet, the supply edge of the respective subpacket of the supply packet as the supply edge of the reservation packet, the transport path and the reservation period $T_{res}$, Q) for each source of the transport graph determining a sub-packet of the supply packet of each source that is still available, so that the supply packet is formed by superposition of all reservation packets and this available sub-packet for the reservation period, R) for each load for the reservation period $T_{res}$ determining the not yet covered sub-packet of the demand packet, so that the demand packet is formed from the coverage packets according to step N), the reservation packets being assigned to the load and the not covered subpacket, S) for each point in time t within the reservation period $T_{res}$ determining the remaining available transmission capacity of the transmission network, such that the given transmission capacity of the transmission network is the sum of the remaining available transmission capacity and the sum of the nominal powers plus the remainders of the reservation packets, T) for each supply prediction, demand prediction and loss prediction by which at least one of the values determined by them is changed, repeating the preceding steps, U) for each reservation packet formed in steps L) to O) at an arbitrary booking time $t_{Buch}$, which is prior to the start time $t_{0res}$ of the reservation packet, bindingly booking the reservation data packet of the reservation packet as the data packet of the energy packet, wherein the transmission period of the energy packet is the reservation period, wherein the equivalence class $\{p_0,(t), R(t), T=T_{res}\}$ is the equivalence class of the reservation packet, wherein the supply edge of the reservation packet is the supply edge of the energy packet, and wherein the transport path of the reservation packet is the transport path of the energy packet, and V) at the execution time $t_0$ transmitting of the respective energy packet according to the data packet of the energy packet.

In one embodiment, there are timetables for the future sequence of the prediction times tP. A timetable thus determines the respective prediction times $t_i^0$ at which the different predictions $P(X, t^0, t \in T_{prog})$ with the corresponding and different prediction periods $T_{prog}^i$ are carried out. Here, the minimum possible time interval between the prediction time $t_i^0$ and the start of the corresponding prediction period $t_{0prog}$ is determined by the duration of the calculation runs using different models for the respective X and their merging of the results. In one embodiment, the predictions $P(X, t^0, t \in T_{prog})$ with fixed X can be distinguished according to the different duration of $T_{prog}$, e.g. into short-term, medium-term and long-term predictions, with the corresponding schedules.

According to the timetables for the predictions, this results in timetables for the future sequences of the reservation times $t_i^{00}$ and the corresponding reservation periods $T_{res}^i$. In one embodiment, corresponding to the maturity, the prediction periods are consecutive periods of equal duration, i.e., for example, a prediction period for a short-term prediction immediately follows the preceding prediction period for a short-term prediction. Accordingly, the check periods, reservation periods and booking periods are also consecutive periods of the same duration. In this embodiment, the reservation times $t_i^{00}$, which are prior to the start of a reservation period $T_{res}^i$, with a start time $t_{ores}^i$ and a reservation duration $DT_{res}^i$, wherein the reservation period $T_{res}^i$ is within the prediction period $T_{prog}^i$ are a sequence of times determined according to a schedule, and the duration of the reservation periods $T_{res}^i$ is an integer divisor of the duration of the respective prediction period $T_{prog}^i$.

In the following, without loss of generality, we consider only an arbitrary but fixed point i in the order of schedules.

In one embodiment, the supply data packet for a source at location $x_0$ of the transmission network defines a supply packet $E_{Ein}$ by this supply data packet, in that in the supply data packet the transport path to be described there consists only of location $x_0$. A demand packet $E_{Bed}$ is defined by the demand data packet for a load at location $x_{p+1}$ of the transmission network, in that the transport path to be described there consists only of location $x_{p+1}$ in the demand data packet.

In one embodiment, an energy packet E transmitted from a source Q via a transport path TP(E, Q, S, T) to a load S in the transmission period T is a simultaneous energy packet that is a superposition of a cover packet defined by the cover data packet $E_D$ and its loss packet E uniquely assigned to the cover packet and the transport path and defined by its loss data packet $E_V$. Here, both the cover packet and the loss packet describe this transport path.

Since in these embodiments the supply packet $E_{Ein}$ is uniquely defined by the supply data packet, we also denote it by $E_{Ein}$. We proceed in the same way for the demand, coverage and loss packets, which we designate in the same way as their data packets. In these embodiments, it is thus true that $E = E_D \oplus E_V$. Since $E_D$ and $E_V$ have the same transport path, the simultaneous energy packet is determined for the whole transport path. For simplicity, when the relationship is clear, we also refer to the data packets according to their packets, such as the coverage data packet, or the loss data packet as coverage and loss packets respectively.

The loss packet $E_v$ describes the loss incurred during the transmission of a cover packet $E_D$ via TP. The nominal power $v_{nom}(t)$ of the power class $\{v_{nom}(t), R_{Verlust}(t), T_{res}\}$ of $E_v$ is determined by a prediction of the loss incurred in the transmission of the cover packet $E_D$ via TP, taking into account further power transmissions via TP. The remainder $R_{Verlust}(t)$ is a function of the prediction uncertainty of this prediction.

The coverage energy packet $E_D$ fully or partially covers the demand of the load prediction according to the demand energy data packet $E_{Bed}$ for the transmission period T. This means that $E_D \subseteq |_{x_{p+1}} E_{Bed}$. Since the transport path of the cover packet and the transport path of the demand packet, which consists only of $x_{p+1}$ have only the location $x_{p+1}$ of the load in common, the sub-packet condition is only fulfilled there. In the following, the demand packet $E_{Bed}$ of a load $S_k$ is denoted by $E_{S_k}^{Bed}$ for better representation.

In one embodiment, the data packet of the energy packet E to be transmitted via the previously determined transport path TP is formed by forming it from the previously determined coverage and loss energy data packets according to the superposition rules.

In one embodiment, for each reservation period $T_{res}$ at its reservation time $t^{oo}$, for each load that has an uncovered demand data packet or an uncovered sub-packet of the demand data packet for $T_{res}$, the possible transport graphs of the remainder graph $\hat{G}_{Residual}$ of the transmission network for maximum coverage of the demand data packet or its sub-packet of the loads under consideration are determined optimally. The determination of the possible transport graphs is carried out by the control instance or several coherently coupled control instances 220.000 responsible for the corresponding region or sub-network of the transmission network 100,000 in which the load 7.000 is located. At this instance we want to note that if for an edge $e_i$ at least for a time $c_i(t)=0$, the edge $e_i$ cannot be considered for the formation of possible transport graphs.

In one embodiment, the injection data packets $E_i^{Ein}$ of the sources $Q_i$ and the demand data packet $E_{S_k}^{Bed}$ of the load $S_k$ are determined from the corresponding predictions by restricting the corresponding prediction periods to the considered reservation period.

In an embodiment in which this determination is carried out by several control instances, each of which is responsible for a corresponding subgraph of the graph of the transmission network, the data required for this purpose, which are held in a distributed manner in the control instances, are used for the determination by means of a method such as that described, for example, in European Patent EP 2 250 588 A2. By means of this method, the control instances, which are distributed over 200.000, are coherently coupled and thus form a coherently coupled control instance network. If we speak of only one control instance in the following, this is for the sake of simplification and does not exclude that the correspondingly described task can also be solved by several control instances.

In one embodiment, for each reservation period $T_{res}$ at the corresponding reservation time $t^{oo}$, one or more responsible control instances 220.000 determine the set TG of possible transport graphs for the maximum coverage of the demand packet $E_{S_k}^{Bed}$ of a load $S_k$ for the assigned reservation period by the control instances 220.000 responsible for the corresponding region or subnetwork of the transmission network 100.000 in which the load $S_k$ is located $$TG((E'E_{in_1}, TP_{11}, Q_1), \ldots (E'_{Ein_n}, TP_{ni}, Q_n), S_k) \text{ with } k$$
fixed and $i=1$ to $n$ as well as $j=1$ to $l$.

These transport graphs are formed from the possible transport paths $TP_{ij}$, each of which connects exactly one source $Q_i$ with exactly one load $S_k$. Whereby this $TP_{ij}$ forms the set $\mathfrak{TP}$ of possible transport paths via which a possible sub-packet $E'_{Ein_i}$ of the supply packet $E_i^{Ein}$ of the source $Q_i$ defined by the supply data packet could be transmitted from this source to the load $S_k$. Whereby this available sub-packet $E'_{Ein_i}$ is formed from a coverage packet $E_{D_i}$ defined by a coverage data packet and a loss packet $E_{vij}$ defined by a loss data packet.

In this embodiment, the set of possible combinations of cover packets $E_{D_i}$ is first formed so that the union of the transmission periods $T_i$ of the cover packets covers at most the transmission period of the demand data packet $E_{S_k}^{Bed}$, and for each of these combinations $E_{S_k}^{Bed} = \oplus E_{D_i} \oplus E_{S_k}^{Residual}$ and for all $E_{D_i}, E_{D_i} \subseteq |_{x_0} E_{Ein_i}$ holds. As a reminder $x_0^i$ are the locations of the source $Q_i$ and respectively the intersection of the transport path of the cover and supply data packets. In the following, for the sake of simplicity, we will not restrict the sub-packets to the simultaneous transport path if it is clear from the context what is meant. Here the cover packets are chosen so that the superposed cover packets $\oplus E_{D_i}$ are a maximum sub-packet of the demand packet $E_{S_k}^{Bed}$ of the load $S_k$. $E_{S_k}^{Residual}$ is. Subsequently, for each possible transport path $TP_{ij}$, from the set $E_{vij}$ of transport paths, then for the corresponding cover packet to be transmitted $E_{D_i}$, the loss packets $E_{vij}$ are determined by the responsible control instances 220.000 by predicting the transmission losses and taking into account energy packets that are transmitted simultaneously via one or more edges and nodes of the corresponding transport graph, so that the energy packets that can be transmitted via the possible transport paths $TP_{ij}$ and the energy packets that can be transmitted via them $$E'_{Einij} = E_{D_i} \oplus E_{vij}$$

are determined. $E_{vij}$ are the loss energy packets that arise accordingly during the transmission of the cover packets $E_{D_1}$ via the various transport paths $TP_{ij}$. These loss packets are defined by the power classes $\{v_{nom}^{ij}(t), R_V^{ij}(t), T_{res}\}$, determined by loss prediction.

In one embodiment, the temporal course of the nominal power $v_{nom}^{ij}(t)$ is determined by calculating, by means of the laws of electrodynamics, the loss that occurs during the transmission of the nominal power of the cover packet $p_{nom_D}(t)$ via $TP_{ij}$. With the corresponding calculation of the losses of $p_{nom_D}(t)+R_D(t)$ and $p_{nom_D}(t)-R_D(t)$, the course in time $R_V^{ij}(t)$ of the remainder of the loss packet can then be calculated.

In this embodiment, only the packets $\check{E}_{ij}$ that are sub-packets, i.e. $\check{E}_{ij} \subseteq E_i^{Ein}$ of the corresponding supply data packets $E_i^{Ein}$ are considered in the subsequent steps. In one embodiment, a metric $\mathcal{M}$ is then applied to the set of possible transport graphs $\mathfrak{TG}$ for the remaining packets $\check{E}_{ij}$ wherein $$\mathcal{M}: \mathfrak{TG} \to \mathbb{R}$$

wherein $\mathcal{M}$ is composed of, for example, the different prices for the sub-packets $\check{E}_{ij}$ and the different prices for the use of the corresponding portions of the transmission network, and an optimised transport graph is then determined by means of the metric $\mathcal{M}$.

In one embodiment, the prices for the sub-packets as well as for the use of the transmission network are determined by an auction process. In one embodiment, known methods and methods are used to determine the optimally determined transport graph $TG_{op}$ for this purpose. In another embodiment, genetic algorithms or other artificial intelligence methods are used. At this point, it should be noted that due to the runtime of the algorithms used, it is usually not possible to determine an optimal transport graph, but only an optimised one. In one embodiment, a maximum calculation time can be specified for carrying out the optimisation and the best result after the maximum calculation time has elapsed is then the optimally determined transport graph.

In one embodiment, the respective optimally determined transport paths $TP_{op}^b \subseteq TG_{op}$, $\forall$ b are determined from this transport graph $TG_{op}$, which is determined in this way with respect to a selected metric, for a load $S_k$, where the indices b are determined by the index pairs (i,j), for which $P_{ij} \subseteq TG_{op}$ holds. Wherein each source $Q_b$ of each transport path thus optimised determined $TP_{op}^b(E_b, Q_b, S_b, T_b)$, which connects said source $Q_b$ to the load $S_k$ of the transport graph for the transmission of a sub-packet $E_b = E_{D_b} \oplus E_{v_v} = E'_{Ein_b}$ of the supply packet $E_{Ein_b}$ of the source $Q_b$, provides, at any point in time t within the reservation period $T_{res}$, an available power which Is an element of the equivalence class $\{p_{nom_b}(t), R_b(t), T_b\}$ of the subpacket $E_b$ determined according to the previous step. Alternatively, this equivalence class can be written equivalently as $\{p''_{nom_b}(t), R''_b(t), T_{res}\}$, with $p''_{nom_b}(t)=p_{nom_b}(t)$, $R''_b(t)=R_b(t)$, $\forall t \in T_b$ but $p''_{nom_b}(t)=R''_b(t)=0$, $\forall t \in T_{res} \setminus T_b$. Similarly, the superposed coverage packets $\oplus E_{D_b}$ of the sources $Q_b$ form a maximum sub-packet of the demand packet $E_k^{Bed}$ of the load $S_k$ with $E_k^{Bed}=E_k^{BedResidula} \oplus E_{D_b}$. Furthermore, for each of these sources $Q_b$, the sub-packets $E_{Ein_b}^{Residual}$ wherein $E_{Ein_b}=E_b \oplus E_{Ein_b}^{Residual}$, form the still free sub-packets of the corresponding supply packets. The corresponding data packets, the so-called reservation data packets $E''_b$ of the energy packets $E_b$ to be transmitted via this transport graph are then formed for this specific transport graph $TG_{op}$ optimised by the control instance.

The reservation data packet $E''_b$ for defining a reservation packet of the transport path $TP_{op}^b$ is formed in that the reservation data packet of the reservation packet has the equivalence class of the respective sub-packet $E_b$ of the supply packet as the equivalence class of the reservation packet, describes the transport path $TP_{op}^b$ of the respective sub-packet of the supply packet and the reservation period $T_{res}$. By describing $TP_{op}^b$ in the reservation data packet, the corresponding supply edge is also described there. By determining $TG_{op}$ and $E_k^{BedResidula}$ as well as $E_{Ein_b}^{Residual}$ the still available sub-packet of the supply packet of each source is determined for each source of the transport graph, so that the supply packet is formed by superposition of all reservation packets and this available sub-packet for the reservation period. Similarly, for each load for the reservation period $T_{res}$, the still uncovered subpacket of the demand packet is determined, so that the demand packet is formed from the reservation packets assigned to the load and the uncovered sub-packet.

In this embodiment, for the transmission of a reservation packet $E''_b$ over a transport path $TP_{op}^b$ with power class $\{p_{nom_b}(t), R_b(t), T_b\}$ for each of the directed edges of the transport path $TP_{op}^b$ and each t out of $T_b$, at most the transmission capacity n $(p_{nom_b}(t)+R_b(t))=\|E_b(t)\|$ is required. In one embodiment, these required transmission capacities are reserved for the affected edges by the control instance. In one embodiment, the remainder graph $\hat{G}_{Residual}$ remaining after this reservation is then determined as follows. Let $c_i^{alt}(t)$ be the free transmission capacity without the transmission capacity required for the reservation packets, then the remaining free transmission capacity of $\hat{G}_{Residual}$ after the reservation is determined as $c_i(t)=c_i^{alt}-\|E_b(t)\|$, $\forall \in T_b$ by the control instance.

In one embodiment, the procedure described above is performed iteratively load by load by the corresponding control instances on the set of remainder supply data packets $E_i^{Einresid}$ and the remainder graph, as well as when at least one of the values determined by them changes for each of the supply predictions, demand predictions and loss predictions prior to a booking time $t_{Buch}$.

As of an arbitrarily selectable booking time $t_{Buch}$, the reservations are no longer changed by the responsible control instances and change to the "booked" state and the reservation data packets become the data packets of the energy packets, which are then transmitted accordingly in the transmission period.

In one embodiment, the invention further comprises, for a reservation period $T_{res}$, the steps of, at the reservation time $t^{oo}$, W) for each load, determining the set of transport graphs each connected to the load such that, for each one of this set of transport graphs, each source connected to the transport graph is connected to the load via a transport path of the transport graph and has an available sub-packet of the remaining available supply packet of the source, the available sub-packet being formed from a coverage packet defined by a coverage data packet and a loss packet defined by a loss data packet, wherein the coverage packets of the sources $Q_i$ of the transport graph together cover a maximized portion of the demand data packet of the load S and wherein the loss packet describes the loss in the transmission of the respective coverage packet over the corresponding path, which loss is determined by a prediction, X) for each load and each transport graph determined according to step W), extending the respective transport graph to an extended transport graph by determining the compensation nodes of the respective extended transport graph such that for each source of the extended transport graph the compensation nodes are determined, wherein each of these compensation nodes is connected via at least one compensation path, as a subgraph of the extended transport graph, to the load S and the compensation nodes together provide a maximum total compensation power C(t) determined beforehand in order to receive a physical power up to the maximum total compensation power C(t) at each point in time t within the reservation period $T_{res}$, wherein the maximum total compensation power C(t) is a function of the remainders of the coverage packets of the respective source Q and in order to supply via the compensation paths in sum a physical power up to this maximum total compensation power C(t), which is increased by the power losses determined by prediction, which power losses drop during the transmission of the sub-packets from the compensation nodes via the compensation paths into the demand node $K_S$, Y) for each load determining exactly one extended transport graph optimized according to a given metric from the set of all extended transport graphs determined according to steps W) and X), each of the extended transport graphs being connected to the load via a demand edge, Z) for the optimized extended transport graph of step Y) forming the reservation data packets for defining the reservation packets of the energy packets to be transmitted over the optimized extended transport graph, wherein the reservation data packet of each reservation packet includes the equivalence class of the respective available supply packet as the equivalence class of the reservation packet, the supply edge of the respective supply packet as the supply edge of the corresponding source node $K_Q$ of the reservation packet, the corresponding transport path connecting the source to the load, the reservation period $T_{res}$, as well as the compensation nodes with the corresponding compensation potentials and the compensation paths connecting the compensation nodes with the load node $K_S$ to which the load is connected via the demand edge, AA) determining the still available sub-packets of the supply packets and the not yet covered portions of the demand packet of the still available transmission capacities according to step O), reducing the still available capacity of the reserved compensation nodes by the reserved maximum powers for receiving and for delivering the corresponding powers, reducing the still available transmission capacities of the compensation paths by the reserved potentials for delivering power of the reserved compensation nodes increased by the power loss, BB) for each supply prediction, demand prediction and loss prediction by which at least one of the values determined by the respective prediction is changed, repeat the previous steps, CC) for each reservation packet of an optimized extended transport graph formed in the preceding steps, at an arbitrary booking point in time $t_{Buch}$, which booking point in time $t_{Buch}$ is prior to the start time $t_{0res}$ of the reservation packet, bindingly booking the reservation data packets of the reservation packets as the data packets of the energy packets, wherein for each of these data packets the transmission period of the energy packet is the reservation period, wherein the equivalence class is $\{p_{nom(t)}, R(t), T\}$ is the equivalence class of the reservation packet and the supply edge of the reservation packet is the supply edge of the energy packet, and bindingly booking the reserved transmission capacities on the optimal extended transport graph, and at the execution time $t_0$ transmitting the respective energy packet according to the data packet of the energy packet via the booked capacities of the booked extended transport graph, and/or DD) for each load, extending the possible transport graphs and/or possible extended transport graphs previously determined in steps W) and X) by the possible balancing nodes and the possible balancing paths, such that each of these balancing nodes is connected via a balancing path to one of the sources of the transport graph and/or extended transport graph, for which the associated supply data packet requires a balancing, and these balancing nodes can individually or collectively provide a balancing for the corresponding sources and can balance the losses determined by at least one loss prediction occurring during the transmission of the balancing packet from the balancing node to the source, EE) according to a predetermined metric, determining an optimized transport graph with balancing or an extended transport graph with compensation with a balancing out of the set of possible transport graphs with a balancing determined according to step DD) or a transport graph with compensation extended by the compensation, and FF) for the optimized transport graph with balancing determined in this way or a transport graph with balancing extended by the compensation carrying out steps Z) to CC).

In one embodiment, in the event that a load $S_k$ has no analogue storage for compensation, the invention solves the task of compensating for a possible shortage or excess of the demand of a load $S_k$ caused by the transmitted physical power of the energy packets $E_i = E_{D_i} \oplus E_{v_i}$, by determining an optimally determined transport graph ETG extended by the compensation.

In one embodiment, the compensation is performed by compensation nodes $K_{SAS_i}$ which together have a previously determined maximum total compensation power C(t) to absorb a physical power up to this maximum total compensation power C(t) for each point in time t within the reservation period $T_{res}$, the maximum total compensation power C(t) being a function of the remainder of the coverage packets $E_{D_i}$ of the respective source $Q_i$. That is, $C(t) = F_{kom}(R_{D_1}(t), \ldots, R_{D_n}(t))$. Here $R_{D_i}(t)$ are the remainder of the determined cover packets $E_{D_i}$.

In the following, we consider, by way of example, another embodiment in which physical power up to a maximum compensation power $C_i(t)$ can be absorbed by each compensation node $K_{SAS_i}$ for each point in time t within the reservation period $T_{res}$, wherein $C_i(t)$ is a function of the remainder $R_{D_i}(t)$ of the sub-packets or cover packets $E_{D_i}$ of the source $Q_i$, such that $$C(t) = \Sigma C_i(t) = E f_{komp}(R_{D_i}((t))) \forall t \text{ from } T_{res}$$

holds. The responsible control instances 220.000 now form the set $\mathfrak{TEG}$ of the transport graphs extended by compensation, $$TG(TP_{11}(E_1,Q_1), \ldots TP_{1l}(E_1,Q_1), \ldots TP_{nj}(E_n,Q_n); KP_{1l}(K_{SAS1}), \ldots; KP_{mi}(K_{SAS_m})), S_k),$$

by extending the set of possible transport graphs $\mathfrak{TG}$ by the possible compensation nodes $K_{SAS_i}$ which can be connected to the load $S_k$ via possible compensation paths $KP_{ii}(K_{SAS_i}, S_k)$.

By means of a loss prediction $v_{il}(C_i(t))$ for the transmission of a power of C; (t) via one of the possible compensation paths $KP_{il}$ it is then checked by the corresponding control instances, which compensation nodes $K_{SAS_s}$ out of the set of possible compensation nodes $K_{SAS_s}$ for each point in time t within the reservation period $T_{res}$ can provide a physical power up to a maximum compensation power of magnitude $C'_{is}(t)=C_i(t)+v_{is}(C_i(t))$ increased by the loss for supplying into $KP_{is}$. Then the quantity 𝔗𝔈𝔊 is restricted to these compensation nodes $K_{SAS_s}$ and is denoted 𝔗𝔈𝔊.

In one embodiment, the metric M is then extended to include the costs of the potentials $C'_i(t)$ and the use of the compensation path $KP_{ij}$.

In one embodiment, the optimally determined transport graph extended by compensation and the corresponding reservation packets as well as the booking are then determined from 𝔗𝔈𝔊, analogously to the steps of determining the optimally determined transport graph. When determining the remainder graph, a capacity of $C'_i(t)$ is taken into account for the reserved compensation paths.

For the optional compensation, the extended transport graph is extended by the compensation paths and the compensation nodes, with the corresponding maximum compensation capacities for the power input as well as the maximum compensation capacities for the power output increased accordingly by the losses, and the further procedure is analogous to the known procedure described above.

In one embodiment, for a real-time prediction period $T_{RT}$ having a real-time prediction start time $t_{0RT}$ and a real-time prediction duration $DT_{RT}$, the real-time prediction period $T_{RT}$ being a sub-period of the reservation period $T_{res}$ of the reservation packet, the method further comprises the steps of, at a real-time prediction time $t^{00}$, that is after the reservation time $t^{00}$ of the reservation period $T_{res}$ and prior to the real-time prediction start time $t_{0RT}$, GG) measuring at least one parameter, HH) creating a real-time prediction $p_{RT}(x,t)$ of the physical power $p_\varphi(x,t)$ at any point in time t within the real-time prediction period $T_{RT}$ at a location x of the transmission network, the real-time prediction $p_{RT}(x,t)$ having negligible real-time prediction uncertainty and being created with consideration of the at least one parameter, wherein the physical power $p_\varphi(x,t)$ is a function of the at least one parameter, and II) forming a real time energy packet for transmission over a subgraph of the transmission network by using the real time data packet associated with the real time energy packet, which real time data packet defines the real time energy packet, which real time data packet describes the time history of the nominal power $p_{nomRT}(x,t)=p_{RT}(x,t)$ at at least one location x of each edge of the subgraph as a function of the predicted time history of the physical power supplied into that subgraph $p_\varphi(x,t)$ at the location x, wherein the remainder R(t) is set equal to constant zero and the transmission period T is set equal to the realtime prediction period $T_{RT}$.

In this embodiment, the future temporal course of the physical power for the transmission of an energy packet is determined as accurately as possible in each case at a location of the transmission network, in that for a real-time prediction period $T_{RT}$ with a real-time prediction start $t_{0RT}$ and a real-time prediction duration $DT_{RT}$, wherein the real-time prediction period $T_{RT}$ is a partial period of the reservation period $T_{res}$ of the reservation packet, by measuring at least one parameter $m_i(t^{000})$ at the real-time prediction point in time $t^{000}$, which is after the reservation point in time $t^{00}$ of the reservation period $T_{res}$ and prior to the real-time prediction start $t_{0RT}$, a real-time prediction $$\mathcal{EP}(t^{000},T_{RT},m_i(t),x,t)=p_{RT}(x,t)$$

of the physical power $p_\varphi(x,t)$ at any point in time t within the real-time prediction period $T_{RT}$ is produced at a location x of the transmission network. Thereby, the real-time prediction $p_{RT}(x,t)$ has a negligible real-time prediction uncertainty due to its short-term nature. The real-time prediction is generated taking into account at least one measured parameter $m_i(t)$, where the predicted physical power $p_\varphi(x,t)$ is a function of this parameter. For example, a location of the transmission network is a source, a load, a node or a location on an edge of the transmission network.

Furthermore, this embodiment enables real-time data packets to be formed for transmission over a subgraph of the transmission network by means of the real-time prediction, in that the real-time data packet associated with the real-time energy packet, which defines the realtime energy packet, defines the time history of the nominal power $p_{nomRT}(x,t)=p_{RT}(x,t)$ at at least one location x of each edge of the subgraph as a function of the predicted time course of the physical power $p_\varphi(x,t)$ fed into this subgraph at location x, the remainder R(t) being set constantly equal to zero and the transmission period T being set equal to the real-time prediction period $T_{RT}$.

In one embodiment, real-time predictions are carried out at real-time prediction points in time $t^{000}$ which repeat periodically at a previously determined time interval from $DT_{RT}$. The realtime prediction points in time $t^{000}$ are determined in such a way that they are assigned exactly to a prediction period $T_{prog}$ with the prediction start $t_{0prog}$ and all real-time prediction points in time $t^{000}$ lie after the reservation time $t_{res}$ and prior to the start of the prediction period.

In the preferred embodiment, for a reserved or booked energy packet, with transmission period $T_{res}$, or $T_{Buch}$, the prediction period $T_{prog}$ is selected such that $T_{prog}=T_{res}=T_{Buch}$, wherein $T_{Buch}$ is then the transmission period T once the energy packet is transmitted. In the preferred embodiment, for a reserved or booked energy packet, with transmission period T, the prediction period $T_{prog}$ is chosen such that $T_{prog}=T$.

In one embodiment, time series $m(x_i, t_{mess}^k)$ of the physical power are measured by sensors at locations $x_i$ of the transmission network at the measurement times $t_{mess}^k \leq t^{000}$. In addition, time series of measured parameters $pm(r_j, t_{mess}^j)$ are determined by sensors at the locations $r_j$ of a perimeter network 210.000 at the measurement points in time $t_{mess}^j \leq t^{000}$. These measured parameters have a direct influence on the physical generation or supply power of a source 6.000, e.g. metrological measured quantities, and the physical power requirement of a load 7.000, e.g. production key figures of a production plant.

In a preferred embodiment, in dependence on the real-time prediction method or function $\varepsilon\mathcal{P}$, $T_{RT}$ is chosen such that the expected value $<p_{TR}(x,t)>$ has a vanishing variance in the interval $T_{RT}$, and for the real-time prediction period $T_{RT}$ in this preferred embodiment is constant $<p_{TR}^{t^{000}}(x,t)>_\varepsilon$ $\mathcal{P}=p_{RT}(x,t^{000}),\forall t$ from $T_{RT}$. Furthermore, in this embodiment, for all points in time t within $T_{RT}$, the deviation of the actual physical power $p_\varphi(x,t)$ for all t within $T_{RT}$ from $p_{RT}(x,t^{000})$ is so small that it is negligible. That is, with a suitable choice, $p_\varphi(x,t)$ in the subspace of the transmission period corresponding to the correspondingly assigned $T_{RT}$ can be equal to $p_{RT}(x,t^{000})$, with the corresponding real-time prediction point in time $t^{000}$ for $T_{RT}$.

In one embodiment, the real-time predictions $\varepsilon\mathcal{P}$ for determining $p_{RT}(x_i, t)$ for t from $T_{RT}$ are generated using linear and non-linear time series analysis methods. In doing so, $p_{RT}(x_i, t)$ is determined for the locations $x_i$ of the transmission network, preferably at a connection point of an edge to a QFC node via which QFC this node sets power at this location. The methods of linear and non-linear time series analysis are carried out using the time series of measured values at this location $x_i$ as well as further measured values at locations $x_j$, with j<i. Thereby, these locations $x_j$, with respect to $x_i$ and the transmission direction, are located on the downstream subgraph of the transmission graph.

In one embodiment, these real-time predictions are performed using the methods of linear and non-linear time series analysis on one or more coherently coupled control instances 220.000. For this purpose, the acquired time series of the measured values are forwarded to these associated control instances 220.000 of the data and computer network connected to the perimeter network. In FIG. 3 and the associated description, the relationship between the perimeter network as part of the data and computer network, as well as its tasks, can be derived.

In a preferred embodiment, the real-time predictions for the regenerative sources 6.000 and for loads 7.000 are selected in such a way that the dead time is minimised. In this context, dead time is defined as the time span between the signal change at the input of the real-time prediction process and the time until the real-time prediction is generated.

In a preferred embodiment, the parameters $m_i(\hat{t})$ influencing the generation and/or demand power are additionally measured by the sensors of the perimeter network 210.000 at spatial distances r around selected regenerative sources 6.000 and/or in an area assigned to a load. The measurement points in time $\hat{t}$ lie prior to the real-time prediction times $t^{000}$. The time series $m_i(\hat{t})$ acquired in this way are forwarded to the associated control instances 220.000 of the data and computer network connected to the perimeter network. In FIG. 3 and the associated description, the relationship between the perimeter network as part of the data and computer network, as well as its tasks, can be derived.

In one embodiment, there is a distinguished real-time prediction function $\mathcal{EP}_{Ein}$ for the generation power $p_{RT}(x_0, t^{000}, t\in T_{RT})$ of a renewable source at location $x_0$ of the transmission network, with negligible prediction uncertainty at suitable duration $DT_{RT}$, such that for all t within $T_{RT}$ $$p_{RT}(x_0, t^{000}, t\in T_{RT}) = p_{RT}(x_0, t^{000}) \forall t\in T_{RT}$$

wherein $p_{RT}(x_0, t^{000})$ is given by the real-time prediction $$\mathcal{EP}_{Ein}(x_0, t^{000}, pm(\vec{r}, t_{mess}^1), \ldots, pm(\vec{r}, t_{mess}^n = t^{000}), m(x_0, t_{mess}^1), \ldots, m(x_0, t_{mess}^n = t^{000}), \mathcal{P}_{ein}(x_0, T_{RT}))$$

of the supply power of the source at location $x_0$.

Here the input values of $\mathcal{EP}$ are the time series of the measured values $pm(\vec{r}, t_{mess}^1)$ to $pm(\vec{r}, t_{mess}^n = t^{000})$ of the perimeter network at the locations $\vec{r}=(r_1, \ldots, r_l)$ at the measurement times $t_{mess}^1$ bis $t_{mess}^m = t^{000}$ with $t_{mess}^i \leq t^{000}$, i=1 to n and the time series $m(x_0, t_{mess}^1)$ to $m(x_0, t_{mess}^n = t^{000})$ of the power generated by the source at the corresponding measurement times before and at time $t^{000}$, as well as the result of the supply prediction $\mathcal{P}_{ein}(x_0, T_{RT})$ for the source at point $x_0$ for the prediction period $T_{prog}$ restricted to $T_{RT}$.

With this embodiment, then, at a location $x_i$ of the transmission network, through $p_{RT}(x_i, t^{000}, t\in T_{RT})$ the physical power $p_\varphi(x_i, t)$ is predicted by the real-time prediction $\varepsilon\mathcal{P}$, so that $$p_{RT}(x_i, t^{000}, t\in T_{RT}) = \varepsilon\mathcal{P}(x_i, t^{000}, t\in T_{RT}, p_{RT}(x_0, t^{000}),\\ m(\vec{x}, t_{mess}^1), \ldots, m(\vec{x}, t_{mess}^l))$$

holds. Here $p_{RT}(x_0, t^{000})$ is the supply power of the source predicted by the real-time prediction $\mathcal{EP}$ and $\vec{x}=(x_1, \ldots, x_S)$, with s<l, are locations of the transport path connecting the source at location $x_0$ to the load at location $x_{p+1}$ at which the physical power $m(x_j, t_{mess}^i)$, $x_j\in\vec{x}$ is measured at the measurement points in time $t_{mess}^1$ bis $t_{mess}^l$, $t_{mess}^l \leq t^{000}$.

In a distinguished embodiment of the real-time prediction of the power demand of a load S at location $x_{p+1}$, there is a distinguished real-time prediction $\mathcal{EP}_{Bed}$ using perimeter measurements with $$p_{RT}(x_{p+1}, t^{000}) = \mathcal{EP}_{Bed}(x_{p+1}, t^{000}, pm(\vec{y}, t_{mess}^1), \ldots,\\ pm(\vec{y}, t_{mess}^n), m(x_{p+1}, t_{mess}^1), \ldots, m(x_{p+1}, t_{mess}^n),\\ \mathcal{P}_B(x_0, T_{RT}))$$

wherein $t_{mess}^n = t^{000}$. In this embodiment, $\vec{y}=(y_1, \ldots y_k)$ are the measurement locations of the perimeter network for the measurements in a demand area associated with the load and $pm(\vec{y}, t_{mess}^i)$ denote the corresponding time series of these measurements. By $m(x_{p+1}, t_{mess}^i)$ the time series of measurements of the power at the load at the location $x_{p+1}$ are denoted. $\mathcal{P}_{Bed}(x_0, T_{RT})$ are the values of the demand prediction for the load constrained to $T_{RT}$, using another prediction, such as for industrial enterprises a prediction of the number of units to be produced.

In one embodiment, the real-time prediction function $\mathcal{EP}_{Ein}$ can be based on a wind model that determines the effective wind on a wind generator within $T_{RT}$ based on the measured wind speed and direction at point in time $t^{000}$, by which the power supplied can then be predicted using the generator data.

In another embodiment, the real-time prediction function can be based on a shadow casting model that predicts the power of a solar generator by observing clouds and tracking by camera systems or LIDAR, measuring wind speeds, depending on the date, time and exact geographical location of a solar generator.

This perimeter-based real-time prediction has the advantage that changes are detected before they have an impact on performance, thus reducing the dead time problem.

In another embodiment, the participating sources, QFC nodes and the QFCs of the active edges have buffers so that, if the real-time prediction periods are sufficiently small, remaining dead-time-based deviations can be compensated.

In the preferred embodiment, a real-time data packet is formed by a real-time prediction that is generated at the real-time prediction point in time $t^{000}$ for at least one location of each edge of a subgraph of the transmission network and that describes the time course of $p_{RT}(x,t)$ for all t within $T_{RT}$. The corresponding real-time data packet contains the power class or equivalence class with the temporal and local course of the nominal power $p_{nomRT}(x,t)$ $p_{RT}(x,t)$ and a remainder R(t) constant equal to zero as well as a transmission period T which is set equal to the corresponding real-time prediction period $T_{RT}$.

In this embodiment, a real-time packet is then transmitted over the subgraph according to this real-time data packet by setting a physical power at locations x that is an element of the equivalence class from the real-time data packet, hereinafter referred to as real-time class. Since R(t) is constantly equal to zero for all t at all the locations x, the physical power is set to be equal to $p_{RT}(x,t)$.

In one embodiment of the invention, transmitting the energy packet associated with the data packet over a directed transport path of the booked transport graph connecting the source for the energy packet to the load, for each real-time prediction period $T_{RT}$, that is part of the overlap of the transmission period by real-time prediction periods and for each point in time t within the respective real-time prediction period $T_{RT}$, comprises the following steps, JJ) creating a real-time prediction for the temporal course of the physical power $p_\varphi(x,t)$ for at least one location x on at least each edge of the transport path according to step ii. of claim 9, including at least one measurement of the physical power fed into the respective transport graph at the real-time prediction point in time $t^{000}$, supplied into the transport graph, KK) forming a real-time energy packet for the supply via the supply edge into this transport path according to step II), in that in the associated real-time data packet the temporal course of the nominal power over the real-time prediction period $T_{RT}$ at least one location x on each edge of the transport paths, over which transport paths the transfer of the power packet from the source supply edge to the corresponding load demand edge occurs is set equal to the corresponding predictions from steps HH) and II), and the remainder for all points in time t within the real-time prediction period $T_{res}$ and all subgraphs is constantly set equal to zero, LL) transmitting the real-time data packet to the control instances of the transport graph; and MM) setting the physical power $p_\varphi(x,t)$ for at least one location x on each edge of the transport path, such that the physical power $p_\varphi(x,t)$ is a function of the nominal power $p_{nomRT}(x,t)$ described in the real-time data packet for that location x, and the physical power $p_\varphi(x,t)$ at any point in time t within the transmission period T satisfies the equivalence relation described in the data packet of the energy packet, and NN) for simultaneous transmission of energy packets via a single edge of a node for each transmission period T' setting the physical power $p_\varphi(x,t)$ for at least one location x on this edge, so that the physical power $p_\varphi(x,t)$ is a function of the sum of the nominal powers of the real-time packets associated with the simultaneously transmitted energy packets at that location x taking into account the direction of flow, so that the physical power $p_\varphi(x,t)$ at any point in time t within the transmission period T is an element of the equivalence class formed for the simultaneous energy packet according to claim 5.

For clarification, when speaking of a transport graph, transport path and energy packet in the following, we always mean a booked transport graph, booked transport path and booked energy packet.

In this embodiment, for the transmission of an energy packet E, the physical power $p_\varphi(x,t)$ is set to be an element of the power class $\{p_{nom}(t),R(t),T\}$ of the energy packet at at least one location x of each edge $e_i \in TP(E, Q, S, T)$. The power class as well as the transport path are described in the data packet defining the energy packet. To set the physical power, for at least one location $x_i$ of each edge $e_i \in TP \subseteq TG$, a real-time prediction $$p_{RT}(x_i,t^{000},t\in T_{RT})=\mathcal{EP}(x_i,t^{000},t\in T_{RT},p_{RT}(\vec{x},t_{mess}^1),\ldots,m(\vec{x},t_{mess}^l))$$

including at least one measurement $m(x_i, t_{mess}^{000})$, of the respective physical power $p_\varphi(x,t^{000})$ fed in at the real-time prediction point in time $t^{000}$ is generated.

By means of these real-time predictions, real-time data packets and thus real-time energy packets are then formed, so that for the supply via the supply edge $e_1$ of the transport path which connects the source Q with the transport path TP, a real-time energy packet is formed in that the associated real-time data packet is assigned the temporal course of the nominal power at at least one location $x_i$ on each edge $e_i$ of the subgraph, via which edge the transmission of the energy packet from the supply edge of the source to the corresponding demand edge of the load takes place, is set equal to the corresponding predictions $p_{RT}(x_i, t^{000}, t\in T_{RT})$ and the remainder is set constant equal to zero for all points in time t within the real-time prediction period $T_{RT}$ and for all subgraphs. The real-time data packet thus formed is then transmitted to the control instances of the transport graph.

At each time t during the transmission period T, the physical power $p_\varphi(x_i, t)$ at at least one location $x_i$ on each edge $e_i$ of the subgraphs is set such that the physical power $p_\varphi(x_i,t)$ is a function of the nominal power $p_{nomRT}$ described in the real-time data packet for that location $x_i$, i.e.

$$p_\varphi(x_i,t)=f(p_{RT}(x_i,t^{000})) \text{ for } \forall t\in T_{RT}$$

with $t^{000}$ and $T_{RT}$ assigned for each $t\in T$ and the physical power $p_\varphi$ at each point am time t within the transmission period T satisfies the equivalence relation described in the data packet of the energy packet, i.e.

$$p_\varphi(x_i,t)\in\{p_{nom}(t),R(t),T\} \text{ at least one } x_i\in e_i, \forall e_i\in TP$$
$$\text{and } \forall t\in T$$

holds.

Furthermore, in one embodiment, the power at at least one location on exactly one edge via which edge energy packets are transmitted simultaneously is set such that for a simultaneous transmission of energy packets via this edge of a node for each transmission period T the physical power $p_\varphi(x,t)$ at at least one location x on this edge is a function of the sum of the nominal powers of the real-time packets associated with the simultaneously transmitted energy packets at this location x, taking into account the direction of flow, so that the physical power $p_\varphi(x,t)$ at any point in time t within the transmission period T is an element of the equivalence class formed according to claim 5 for the simultaneous energy packet.

In one embodiment with a data packet of an energy packet E, describing the power class $\{p_{nom}(t),R(t),T\}$ and the transport path TP, via which the energy packet is transmitted from a source Q to a load $S_1$ at execution time, a sequence of locations $x_i$, with i=0 to p+1, is assigned to the transport path TP. Here $x_0$ denotes the source, $x_1$ denotes the connection point of the supply edge 5.920 to the supply QFC 2.800, $x_{p+1}$ denotes the load, $x_p$ is the connection point of the demand edge 5.920 to the demand QFC 2.900, for i with i>1 and i<p−1, $x_i$ denote the connection points of QFC nodes of TP with a, related to the transmission direction, following edge.

In one embodiment, real-time predictions $p_{RT}(x_i, t)$ are performed for each of the locations $x_i$ at a real-time prediction point in time $t^{000}$ for a real-time prediction period $T_{RT}$.

In the preferred embodiment, depending on the real-time predictioning method, $T_{RT}$ is chosen such that the expected value $<P_{RT}(x,t)>$ has a vanishing variance $\vartheta$ on the interval $T_{echt}$, and in this preferred embodiment, then $\forall t$ from $T_{RT}$ is $$<p_{RT}(x,t^{000},t \in T_{RT})>_{\mathcal{EP}} = p_{RT}(x,t^{000}).$$

This means that the real-time prediction for the period $T_{RT}$ delivers the constant value $p_{RT}(x,t^{000})$ determined at the point in time $t^{000}$. In a preferred embodiment for the real-time predictions, the real-time prediction times are periodically repeating points in time $t_k^{000}$, which are selected in dependence on the real-time prediction duration $T_{RT}$ in such a way, that the (k+1)-th prediction point in time $t_{k+1}^{000}$, at which the real-time prediction for the k+1-th real-time prediction period $T_{RT}^{k+1}$ is carried out, coincides with the beginning $t_{oRT}^{k}$ of the realtime prediction period $T_{RT}^{k}$. Thus, the real-time prediction period TA. is determined by the time interval with the start point in time $t_{k-1}^{000}$ and the end point in time $t_{oRT}^{k}$, wherein $DT_{RT}^{k}$ denotes the real-time prediction duration of the real-time prediction period $T_{RT}^{k}$. In a preferred embodiment, $DT_{RT}^{k} = DT_{RT} \forall k$ and the transmission periods T of all energy packets with duration DT are chosen such that DT is an integer multiple of $DT_{RT}$. In this preferred embodiment, for each transmission period T, there is an $n \in \mathbb{N}$, such that $T = \cup_{k=1}^{n} T_{RT}^{k}$ and each $t \in T$ can be uniquely associated with a real-time prediction point in time $t_k^{000}$ and a real-time prediction period $T_{RT}^{k}$ by $t \in T_{RT}^{k}$. In this preferred embodiment, with respect to a reference point in time $\check{t}$, there is a $k \in \mathbb{N}$, such that for each real-time prediction point in time $t_k^{000} = \check{t} + k \cdot DT_{RT}$. In this embodiment, there is thus a one-to-one mapping that assigns a tuple $(t_1^{000}, \ldots, t_m^{000})$, of real-time prediction points in time to a transmission period T of an energy packet.

In a preferred embodiment, this choice results in a schedule for the execution of the real-time predictions and consequently a time series of real-time prediction values corresponding to the advancing time for each entry $(t_1^{000}, \ldots, t_m^{000})$ of the schedule. In this preferred embodiment, each of these real-time predictions defines a real-time data packet such that, starting at the execution time for the duration DT of T, it transmits a stream, i.e. time series, of real-time energy packets $E_{RT}^1, \ldots, E_{RT}^m$. Where the defining real-time data packet of $E_{RT}^k$ describes the power class $\{\vec{p}_{nomRT}^k, 0, T_{RT}^k\}$ and the transport path TP(Q, S, T). Here, $\vec{p}_{nomRT}^k = (p_{nomRT}^{1k}, \ldots, p_{nomRT}^{pk})$ for all for $t \in T_{RT}^k$ denotes the nominal power $p_{nomRT}^{ki}$ of the real time energy packet at location $x_i \in e_i \in TP$.

In a preferred embodiment, the real-time predictions at location $x_1$, i.e. at the connection point of the supplier QFC 2.800 with the supply edge 5.820, determine the nominal powers of the real-time packets $p_{nomRT}^{11}, \ldots, p_{nomRT}^{1m}$ for the intervals $T_{RT}^1$ to $T_{RT}^m$ by means of the real-time predictions $$p_{RT}(\text{Source},t_k^{000},t) = p_{RT}(x_0,t_k^{000}), \forall t \text{ from } T_{RT}^k$$

of the potential maximum generation or supply power of the source for the corresponding intervals $T_{RT}^1$ to $T_{RT}^m$ at the points in time $t_k^{000}$, as a function of $p_{RT}(x_0, t_k^{000})$, so that $$p_{nomRT}(x_1,t_k^{000}) p_{nomRT}^{1k} = f_{ein}(p_{RT}(x_0,t_k^{000}))$$

wherein $F_{ein}$ also includes the transmission losses from $x_0$ to $x_1$ determined by means of real-time prediction. In this embodiment, $p_{nomRT}^{ik}$ is determined for all other locations $x_i$ with i>1 by a prediction function on the basis of time series of the physical powers $p_\varphi^{1'}$ to $p_\varphi^{j'-1}$, measured at selected locations $x'_1$ to $x'_{j-1}$, in each case at a point in time and from further measured values. The locations $x'_i$ are the previous connection points in TP with respect to $x_i$. In one embodiment, the resulting transmission losses are thus taken into account and the predictions are calculated for electrical transmission networks based on the electromagnetic interaction models.

In one embodiment, wherein the maximum power made available by a source for injection is transmitted on different transport paths connecting the source to different loads $S_i$ for transmission of different energy packets, the function for the individual transport paths is determined as the product of $p_{RT}(x_0,t_k^{000})$ with the quotient of the nominal power of the individual demand data packets of the loads or the energy packets with the nominal power of the demand data packet of the source.

In one embodiment, wherein the source is regenerative, $p_{RT}(x_0,t_k^{000})$ is predicted with a distinguished real-time prediction function $\mathcal{EP}_{Ein}$ for a regenerative source, with negligible prediction uncertainty, applied to the corresponding time series of perimeter and network measurements and the prediction results of the previously determined supply prediction $P_{Ein}$, determined for all t within $T_{RT}$, $p_{RT}(x_0,t_k^{000})$ such that $$p_{RT}(x_0,t_k^{000}) = \mathcal{EP}_{Ein}(x_0;r_1,\ldots,r_i;t_k^{000}, pm_1(t_{k-s}^{000}),\ldots,pm_i(t_k^{000}),m(x_0, t_{k-n}^{000}),\ldots,m(x_0,t_k^{000});\mathcal{P}_{Ein})$$

wherein $p_{RT}(x_0,t_k^{000})$ stands for the value of the real-time prediction, $\mathcal{EP}_{Ein}$ stands for the supply power of the source at location $x_0$ and $t_k^{000}$ is the real-time prediction point in time assigned to time t. Here, the input values of $\mathcal{EP}_{Ein}$ are the time series of the measured values $pm_i$ of the perimeter network at the locations $r_1$ to $r_l$ at the points in time $t_r^{000}$, with $k-s \leq r \leq k$, k, r, $s \in \mathbb{N}$ u and subsequently with the measured values for the past real-time prediction times up to the real-time prediction point in time $t_s^{000}$. In addition, time series $m(x_0, t_l^{000})$, $k-n \leq l \leq k$ of the measured values collected in the source as well as the result of the previously determined supply prediction $\mathcal{P}_{Ein}$ of the source are input into $\mathcal{EP}_{Ein}$ as input values.

In the preferred embodiment, the real-time packets determined at the points in time $t_k^{000}$ are transmitted directly to the control instance of the transport graph belonging to the transport path that is responsible for the transmission. In this preferred embodiment, the transmission of the energy packet E takes place by transmitting the corresponding, uniquely assigned real-time packets $E_{RT}^1, \ldots, E_{RT}^m$ being transmitted by starting at the locations $x_i$, i=1 to p of the edges $e_i \in TP$ of the directed transport path of the booked transport graph, starting at the execution point in time equal to $T_1^{000} + DT_{RT}$, and in sequence, at each subsequent starting point of each time period $T_{RT}^k$, according to the real-time data packets previously transmitted to the control instance, the physical power $p_\varphi(x_i,t)$ for all $t \in T$ is set by the control instance such that it is a function of the corresponding $T_{echt}^k$, assigned for t, nominal power $p_{nomRT}^{ki}$ assigned for t, and thus $p_\varphi(x_i, t) = f(p_{nomRT}^{ki}) = \text{Id}(p_{nomRT}^{ki}) = p_{nomRT}^{ki}$, for all $t \in T_{RT}^k$ and all i and k. Further, the physical power at each point in time within the transmission period T is set to satisfy the equivalence relation described in the data packet of the energy packet, and thus $p_\varphi(x_i, t) \in \{p_{nom}(t), R(t), T\}$ holds. In this embodiment, the corresponding real time energy packets are associated with each energy packet for transmission. In one embodiment, for the simultaneous transmission of packets over an edge, the associated real-time predictions corresponding to the global orientation determine the corresponding signs of the nominal powers $p_{nomRT}(t)$ of the corresponding energy packets.

In this embodiment, for the simultaneous transmission of packets via an edge, called simultaneous edge, the superposed real-time packets are transmitted by adding for each interval $T_{RT}^{k}$ the nominal powers of the real-time packets associated with the energy packets, taking into account the signs, and setting the physical power at at least one location x of this simultaneous edge equal to the sum of the nominal power of the real-time packets.

In one embodiment, during a simultaneous transmission of packets $E_1, \ldots E_m$ via an edge $e_i$, connected to an ohm node, at which these packets are forwarded, according to their transport paths via different edges $e_r$ to $e_l$ of the ohm node, each of which is connected to a QFC node, at the locations $x_r \in e_r$ to $x_l \in e_l$ of the corresponding subsequent edges, the physical power for $x_r$ to $x_l$ is set by the nominal power of the real-time packet assigned to the corresponding packet, determined by the corresponding real-time prediction for these locations. This means for the energy packet $E_r$, forwarded via edge $e_l$ that at $x_l$ the physical power is set equal to the original nominal power of the assigned real-time packet, so that $p_\varphi(x_l,t) = p_{RT}^{Er}(x_l,t_k^{000}) \forall t \in T_{RT}^{k}$.

In this embodiment, without loss of generality for two locations $x_i$ and $x'_j$ of the transport paths of the energy packets E and E' with transmission periods T and T' with $T'' = T \cap T' \neq \emptyset$, transmitted over at least one edge, wherein $x_{i-1}$ is a location of the transport path of E and $x'_{j-1}$ is a location of the transport path of E' and wherein $x_{i-1} = x'_{j-1}$, but for the subsequent locations of the two transport graphs $x_i \neq x'_j$, then the physical power at $x_i$ and $x'_{j-1}$ is set such, that $p_\varphi(x_i, t) = p_{nomRT}^{E}(x_i, t_k^{000}) \forall t \in T'$ and $t_k^{000} \in T_{RT}^{k1}$ and $p_\varphi(x'_j, t) = p_{nomRT}^{E'}(x'_j, t'_k^{000})$, $\forall t \in T'$ and $t'_k^{000}$ holds. Here $p_{nomRT}^{E}(x_i, t_k^{000})$ is the value of the nominal power, at location $x_i$ for t from T, of the real-time packet assigned to the energy packet E. The same holds for $p_{nomRT}^{E'}(x'_j, t'_k^{000})$.

In one embodiment, when transmitting an energy packet over the associated transport path, the sampling rate for the power measurements at the source 6.000 and at the transmission path locations and the duration $DT_{RT}$, are chosen such that the variance of the real-time prediction is negligible, and the physical power at locations $x_1$ to $x_{s-p}$, wherein $x_1$ is the point of connection of the supply edge 5.820 to the supply QFC 2.800 and $x_p$ is the point of connection of the demand edge 5.920 to the demand QFC 2.900, is set with conventional control technology according to the nominal powers of the corresponding real-time packets.

In this embodiment, the physical power is controlled so that it does not exceed the sum of the nominal power of the energy packet and the remainder at each of these locations x and for each point in time t within the transmission period of the energy packet.

In this embodiment, if a power failure is injected in one of the QFC nodes setting the power, i.e. the injected physical power for a $T_{Echt}^{k}$ is less than the difference of the nominal power and the remainder of the energy packet, a re-routing is carried out, i.e. another source is determined to cover the load's demand, or a termination of the transmission and a fault message is issued.

In another embodiment, the physical power at the locations of the edges of the transport graph is adjusted on the basis of the time series of power measurements, acquired at the necessary sampling rate, at the measurement locations of the transport graph, using artificial intelligence methods, e.g. deep learning networks, according to the nominal powers of the real-time data packets associated with the energy packet.

In one embodiment for each each real-time prediction period $T_{RT}$, which is a part of the overlap of the transmission period by real-time prediction periods and for each point in timepoint in time (t) within the respective real-time prediction period $T_{RT}$ comprising the steps of OO) for each supply node $K_{Q_i}$ to which a source is connected via a booked transport path of the booked transport graph extended by compensation, whereby the source $Q_i$ is booked to cover the demand of the load S, determining a power supplied by the source via the edge of the transport path, via which edged the load node $K_S$ of the load S is connected, at at least one location on x of that edge by a real-time supply prediction, PP) determining the difference $\delta(t)$ between the sum of the physical power supplied into all booked transport paths which connect all sources $Q_i$ with the load S from the real-time supply predictions, and the physical power taken by the load S, which load S is connected to the demand node $K_S$ via the demand edge, at a location x of the demand edge from the real-time prediction, QQ) for each point in time t within the real-time prediction period $T_{RT}$ forming a maximum total compensation power C(t) as the sum of all maximum compensation powers $C_i(t)$ of all booked sources $Q_l$ and the load S and for each booked compensation node $K_{SAS_i}$ determining a quotient $\gamma_i(t)$ of the maximum compensation power $C_i(t)$ of the respective compensation node $K_{SAS_i}$ and the maximum total compensation power C(t), RR) determining real-time compensation packets for transmission on the compensation graph as a subgraph of the booked extended transport graph, which includes the compensation nodes $K_{SAS_i}$ and the load S, by adding, for each compensation path of the booked compensation graph connecting a compensation node $K_{SAS_i}$ with the load, in the associated real-time compensation data packets, the nominal power $p_{nomKomRT}(x,t)$ for at least one location x of each edge of the respective compensation path a function of the product of the difference $\delta(t)$ determined in step PP) with the quotient $\gamma_i(t)$ but only up to a maximum of the value of the maximum compensation power $C_i(t)$ and the remainder R(t) is constantly set equal to zero, wherein if the product $\gamma_i(t) \cdot \delta(t)$ is negative, the product $\gamma_i(t) \cdot \delta(t)$ is increased by an amount determined by a real-time prediction for a location x of the edge of the compensation path via which edge the demand node $K_S$ is connected to the compensation node $K_{SAS_i}$, to compensate for the losses incurred in the transmission from the compensation node to the corresponding load S, SS) transmitting the real-time compensation data packets to the control instances, and TT) transmitting the real-time compensation packets by, at any point in time t within the transmission period, at at least one location x on the edges of the compensation paths, setting the physical power $p_\varphi(x,t)$ such that the physical power $p_\varphi(x,t)$ is equal to the nominal power $p_{nomKomRT}(x, t)$ of the real-time compensation packets for this location x, and by simultaneously at any point in time within the transmission period T setting the physical powers $p_\varphi(x,t)$ to be equal to the nominal powers of the real-time energy packets $p_{nomRT}(x,t)$ at the locations x on the transport graph previously selected by the real-time predictions, so that the physical power $p_\varphi(x,t)$ at a location x selected by the realtime prediction for the demand on the demand edge is equal to the sum of the nominal powers of the energy packets sent from the supply nodes $K_{Q_i}$ to the demand node $K_S$ plus the compensation power $\delta'(t)$, wherein the compensation power $\delta'(t)$ is equal to the difference between the physical power $p_\varphi(x,t)$ of the power taken by the load according to the real-time demand prediction and the sum of the nominal powers of the energy packets transmitted to the load S.

In one embodiment, the invention solves the preceding problem of setting the corresponding physical powers at the transmission time for the case that only one energy packet E, with the power class $\{p_{nom}(t), R(t), T\}$, is transmitted from a source Q via a transport path TP(E, Q, S, T), in the following with TP to a load S and the energy packet $E = E_D \oplus E_V$ with $E_D = E_B$, and the load node $$K_{S_{x_{p+1}}}$$

via a compensation path $KP(K_{SAS},$ $$K_{S_{x_{p+1}}})$$

is connected to a single compensation node $K_{SAS}$ via which the corresponding compensation packets are transmitted, with the following steps. $S_{x_{p+1}}$ denotes a load at location $x_{p+1}$ of the transmission network and $$K_{S_{x_{p+1}}}$$

denotes the corresponding compensation node connected to the load $S_{x_{p+1}}$ via a compensation path. At the location $x_p$ of the transport graph, as a subgraph of the correspondingly optimised transport graph extended by the compensation, that is the connection point of the demand edge 5.920 to the demand QFC 2.900, whereby this demand edge is connected with its other end to the load, the nominal power $p_{nomRE}^{Ein}(x_p, t_i^{000})$, of the real-time packets of $x_p$ during the transmission of the energy packet E, which are fed into the demand edge by this transmission, is determined. At the same time, the nominal power $p_{nomRT}^{Bed}(x_p, t_k^{000})$ of the real-time demand packets for the demand power of the load at the location $x_p$ for the periods $T_{RT}^k$ are determined at the points in time $t_k^{000}$ by real-time predictions. This is done by determining $p_{nomRT}^{Bed}(x_p, t_k^{000})$ as a function of the real-time prediction $f(\mathcal{EP}_{Bed}(x_{p+1}, t_k^{000}))$ for the demand of load S at location $x_{p+1}$, wherein $f(\mathcal{EP}_{Bed}(x_{p+1}, t_k^{000})$ also includes the transmission losses from $x_p$ to the load location $x_{p+1}$. The next step in this embodiment is to calculate the differences $$\delta(t_k^{000}) = p_{nomRT}^{Ein}(x_p, t_k^{000}) - p_{nomRT}^{Bed}(x_p, t_k^{000})$$

and the two cases $\delta(t_k^{000}) < 0$, the shortage $|\delta(t_k^{000})| = \delta_k^+$ and $\delta(t_k^{000}) > 0$, the excess $\delta(t_k^{000}) = \delta k^-$ are treated. Here, $\delta_k^- > 0$ as well as $\delta_k^+ > 0$ holds. As a reminder, the signs in the exponents are chosen according to the consequent transmission directions according to the sign rules for an ohm node, as it is the demand node. If $\delta(t_k^{000}) < 0$, i.e. for a shortage, then $t_k^{000}$ is determined accordingly for all $v(t_k^{000})$ to compensate for transmission losses arising. Here, $v(t_k^{000}) = v_k^+$ is the value of a real-time prediction for a loss that, when transmitting $\delta_k^+$ via the compensation path KP ($K_{SAS}$, $$K_{S_{x_{p+1}}})$$

would occur. In this embodiment, the physical power at $x_{K_{SAS}}^{KP}$, which is the point of connection of the compensation path to the QFC connected via an edge to the compensation node $K_{SAS}$, is then set for all t within $T_{RT}^k$. This is done by setting the physical power that the compensation node supplies into the compensation path at the location $x_{K_{SAS}}^{KP}$, the connection edge of $K_{SAS}$ to the compensation path, so that $p_\varphi(x_{K_{SAS}}^{KP}, t) = (\delta_k^+ + v_k^+) \in \{0, (C'(t), T_{echt}^k)\} \forall t \in T_{RT}^k$ holds. Where $v_k^+$ has a positive sign corresponding to the direction, and thus at the location $x_p$ of the demand edge connected to the load, the physical power is set to $$p_\varphi(x_p, t) = p_{nomRT}^{Ein}(x_p, t_k^{000}) + \delta_k^+ = p_{nomRT}^{Bed}(x_p, t_k^{000}).$$

Here, C(t) is the maximum compensation power that the compensation node $K_{SAS}$ can absorb and $C'(t) = C(t) + v_{Exakt}(C(t))$, wherein $v_{Exakt}(C(t))$ is the exactly calculated loss in the transmission of C(t) via KP ($K_{SAS}$, $$K_{S_{x_{p+1}}})$$

with a positive sign. Through corresponding real-time predictions $\mathcal{EP}(p_\varphi(x_{K_{SAS}}, t), x_T^{KP}, t_k^{000}))$ is calculated based on the previously determined $p_\varphi(x_{KSAS}^{KP}, t) = (\delta_k^+ + v_k^+)$ for the locations $x_r^{KP}$ of the edges $e_r^{KP}$ of the compensation path $$KP\left(K_{SAS}, K_{S_{x_{p+1}}}\right),$$

wherein the nominal powers of the real-time compensation packets are set to $$p_{nomRT}(x_r^{KP}, t_k^{000}) = \mathcal{EP}(p_\varphi(x_{K_{SAS}}^{KP}, t), x_r^{KP}, t_k^{000}) \in \{0, C'(t), T_{echt}^k\} \forall t \in T_{RT}^k.$$

Clearly, $p_{nomRT}(x_r^{KP}, t_k^{000}) = p_\varphi(x_{K_{SAS}}^{KP}, t)$ must hold for $x_r^{KP} = x_{K_{SAS}}^{KP}$.

In this embodiment, in case $\delta(t_k^{000}) > 0$, the physical power at the location $x_{K_S}^{KP}$, which is the connection point of the compensation path KP ($K_{SAS}$, $$K_{S_{x_{p+1}}})$$

with the QFC, which is connected via an edge of the compensation path with the load node KP), is set so that $p_\varphi(x_{K_S}^{KP}, t) = \delta_k^- \in \{0, C(t), T_{RT}^k\} \forall t \in T_{RT}^i$ and at $x_p$ the physical power, observing the sign rules of the ohm node $K_S$, is set to $$p_\varphi(x_p, t) = (p_{nomRT}(x_p, t_k^{000}) - \delta_k^-) \in \{p_{nom}(t), R(t), T_{RT}^k\}, \forall t \in T_{RT}^k.$$

Accordingly, as for the case $\delta(t_k^{000}) < 0$, real-time predictions based on $p_\varphi(x_{K_S}^{KP}, t)$ determine the nominal powers of the real-time packets at the locations of the edges of the compensation path KP ($K_{SAS}$, $K_{S_{x_{p+1}}}$).

In one embodiment, at each point in time t within the transmission period T, the physical powers $p_\varphi(x_i,t)$ at the locations $x_i \in e_i$ on the transport graph up to the demand node $K_S$ is equal to $p_{nomRT}(x_i, t_k^{000})$, and at the locations $x_r^{KP}$ of the compensation path, the physical power $p_\varphi(x_r^{KP}, t)$ is set equal to the corresponding nominal power of the real-time compensation packets, so that the physical power $p_\varphi(x_p, t)$ at the location $x_p$ on the demand edge chosen by the real-time demand prediction is equal to the sum of the nominal powers $p_{nom_i}(t)$ of the energy packets $E_i$, transmitted from the supply nodes $K_{Q_i}$ to the demand node $K_S$ plus the compensation power $\delta'(t)$, wherein the compensation power $\delta'(t)$ is equal to the difference between the physical power of the power extracted from the load according to the real-time demand prediction and the sum of the nominal powers of the energy packets transmitted to the load S.

By calculation, an equivalent adjustment of the physical power follows by means of a compensation power $\delta'(t)$, so that $$p_\varphi(x_p,t) = p_{nomRT}(x_p, t_k^{000}) + \delta(t_k^{000}) = p_{nom}(t) + \delta'(t),$$
wherein $\delta'(t)$ becomes $$\delta'(t) = p_{nomRT}(x_p, t_k^{000}) - p_{nom}(t) + \delta(t_k^{000}).$$

In this embodiment, immediately after the corresponding real-time predictions, the corresponding real-time data packets with the nominal powers determined by these real-time predictions are formed and transmitted to the controlling entity. At execution time, based on the energy data packet of E and the real-time data packets associated with E and the compensation real-time data packets, the control entity then sets the corresponding physical powers at the corresponding locations.

In an embodiment in which, for a load $S_{x_{p+1}}$, at location $x_{p+1}$, to cover the demand energy packet $E_B$, with power class $\{p_{nom}(t), R(t), T\}$, in a transmission period T, and for compensation, an extended transport graph $$ETG(TP_1(E_1, Q_{x01}, S_{x_{p+1}}), \ldots TP_n(E_n, Q_{x0n}, S_{x_{p+1}}); KP_1(K_{SAS_1}, S_{x_{p+1}}), \ldots, KP_m(K_{SAS_m}, S_m, S_{x_{p+1}}))$$

is booked, the corresponding physical powers are set according to the following steps. According to the booking, via the transport paths $TP_i(E_i, Q_{x0i}, S_{x_{p+1}}, T)$ of ETG, the energy packets $E_1$ to $E_m$ with the power classes $\{p_{nom}^i(t), R_i(t), T_i\}$, and $E_B = \oplus E_{D_i}$ and $T = \cup T_i$, are transmitted to the load $S_{x_{p+1}}$ at transmission time. Here $E_{D_i}$ is the coverage packet of the energy packet $E_l$. At the same time, depending on the transmission direction, compensation energy packets $KE_j$, j=1 to m, are transmitted either with the power classes $\{0, C_j'(t), T\}$ or with $\{0, C_j(t), T\}$ via the compensation paths $KP_j(K_{SAS_j},$ $K_{S_{x_{p+1}}}$).

Whereby the compensation nodes $K_{SAS_j}$ can each absorb a physical power up to the maximum compensation power $C_j$ or can each deliver a maximum physical power up to a maximum compensation power $C_j'(t) = C_j(t) + v_{C_j}(t)$ increased by a power loss. Here, the $v_{C_j}(t)$ are the respective losses, determined by corresponding real-time predictions, which respectively arise during the transmission of C(t) via the compensation graph $KP_j(K_{SAS_j},$ $K_{S_{x_{p+1}}}$).

In this embodiment, the maximum total compensation power C(t) is the sum $\Sigma C_j(t)$ of the maximum compensation powers $C_j$ of the booked compensation nodes with (t)=$\Sigma C_j(t)$ and the quotient $$\gamma_j(t) = \frac{C_j(t)}{C(t)}$$

determines the contribution of each compensation node to the total compensation C(t). In this embodiment, the compensation energy packets $KE_j$ are then transmitted so that for all t out of T on the demand edge 5.920 at location $x_p$, the physical power is set to $p_\varphi(t) = p_{nom}(t) + \delta'(t)$, wherein $\delta'(t)$ is a compensation power.

In one embodiment, real-time prediction is performed to determine the super-positioned nominal power of the energy packet simultaneously injected into the demand edge 5.920 connecting the demand QFC with the load $S_{x_{p+1}}$, injected and transmitted to the load energy packet $E_l$ with l=1 to m at location $x_p$ by $p_{nomRT}(x_p, t_k^{000}) = \Sigma_{l=1}^m p_{nomRT}^l(x_p, t_k^{000})$, wherein $p_{nomRT}^l(x_p, t_k^{000})$ is the nominal power, determined by real-time prediction, of the real-time packet assigned to $E_l$ at location $x_p$ of demand edge 5.920. In this embodiment, all transport paths TP $(E_i, Q_i, S_{x_{p+1}}, T)$ via which the energy packets are transmitted to the load have the demand edge 5.920 in common. Then, in this embodiment, the difference $$\delta(t_k^{000}) := \delta(x_p, t_k^{000}) = (p_{nomRT}^{Ein}(x_p, t_k^{000}) - p_{nomRT}^{Bedarf}(x_p, t_k^{000}))$$

is determined and the cases of shortage, $\delta(t_k^{00}) < 0$, or excess, $\delta(t_k^{000}) > 0$ are considered. For clarity, we have denoted $p_{nomRT}(x_p, t_k^{000})$ as $p_{nomRT}^{Ein}(x_p, t_k^{000})$. In this embodiment, for the case $\delta(t_k^{000}) < 0$, to compensate for the shortage of $|\delta(t_k^{000})| = \delta_k^+$ real-time compensation packets are sent via the compensation paths $KP_j$ ($K_{SAS_j}$, $K_{S_{x_{p+1}}}$)

$x_{K_{SAS}}$ the physical power $p_\varphi(x_{K_{SAS_j}}, t)$ with the corresponding flow direction such that according to the mapping $t \to T_{echt}^k$ $$p_\varphi(x_{K_{SAS_j}}, t) = (\delta_{kj}^+ + v_j(t_k^{ooo})) \in \{0; C_j'(t)\}$$
$$= (C_j(t) + v(C_j(t)); T_{echt}^k) \forall t \in T_{echt}^k$$

holds, with $$\delta_{kj}^+ = \left|\delta(x_{K_{SAS_j}}, t_k^{ooo})\right| = |\gamma_j(t_k^{oo}) \cdot \delta(t_k^{oo})|.$$

Here $v_j(t_k^{000})$ are the real-time predictions of the respective transmission losses of $\delta_{kj}^+$ via the compensation path $KP_j$ ($K_{SAS_j}$, $$K_{S_{x_{p+1}}}).$$

Furthermore, the power transmitted by the real-time compensation packets at the location $x_p$ of the demand edge 5.920 results in $$\delta_k^+ = \Sigma \delta_{kj}^+$$

and thus, according to the sign rules for ohm nodes, at the location $x_p$ of the demand edge 5.920, the physical power is set to $$p_\varphi(x_p,t)=(\Sigma p_{nomRT_l}^{ein}(x_p,t_k^{000})+\delta_k^+)\in \{p_{nom}(t),R(t),T_{RT}^k\} \forall t\in T_{RT}^k.$$

Here, $\Sigma p_{nomRT_l}^{ein}(x_p,t_k^{000})$ is the nominal power of the superposed nominal powers of the real time energy packets associated with the energy packets $E_l$. In this embodiment, $\delta_{kj}^+ \leq C'_j(t) \forall t \in T_{RT}^k$ holds.

For the case of excess, i.e. $\delta(t)>0$, at the locations $\hat{x}_j$ of the connection edges of the compensation paths $KP_j(K_{SAS_j}$, $$K_{S_{x_{p+1}}})$$

to load node $$K_{S_{x_{p+1}}}$$

the physical power $p_\varphi(\hat{x}_j,t)$ is set with the corresponding flow direction such that according to the mapping $t \to T_{echt}^k$ and $$\delta_{kj}^- = \gamma_l \cdot \delta(t_k^{000})$$

$$p_\varphi(\hat{x}_j,t)=\delta_{kj}^- \in \{0,C_j(T),t_{RT}^l\} \forall t \in T_{RT}^k.$$

Further, the physical power at $x_p$, according to the sign rules for ohm nodes, is set such that.

$$p_\varphi(x_p,t)=\Sigma p_{nomRT_l}^{ein}(x_p,t_k^{000})-\delta_{kj}^-)\in \{p_{nom}(t),R(t),T_{RT}^k\} \forall t \in T_{RT}^k$$

and $\delta_{kj}^{-\leq C_j}(t) \forall t \in T_{RT}^k$ holds. Thus, in this embodiment, the physical power $p_\varphi(x_p,t_k^{000})$ at location $x_p$ is adjusted based on the real-time predictions such that $$p_\varphi(x_p,t)=\sum_{i=1}^n p_{nom}^{E_i}(t)+\delta'(t)$$

holds. For clarity, we have denoted the nominal power of the energy packets by $p_{nom}^{E_l}$ and the nominal powers of the real-time packets to be allocated by $p_{nom}^l$, and subsequently the nominal power of the demand data packets to be covered by $p_{nom}^E$. The compensation power $\delta'(t)$ is determined for all t within T by choosing for each t the corresponding $T_{echt}^k$ and the associated $t_k^{000}$ and then defining $\delta'(t)$ accordingly by $$\delta'(t)=\Sigma_{i=1}^n p_{nomRt}^i(t_k^{000})-\Sigma_{i=1}^n p_{nom}^{E_l}(t)+\Sigma_{j=1}^m \delta_j(t_k^{000})$$

by means of the nominal powers of the real-time packets associated with $E_l$ and the nominal powers $\delta_j(t_k^{000})$ of the corresponding compensation real-time packets. Correspondingly, as in the simple case of only one compensation node, the nominal powers of the real-time compensation packets at the locations of the compensation graphs are then determined by means of real-time predictions. Similarly, the physical power at $x_p$ is set to be equal to the sum of the nominal powers $p_{nom_i}(t)$ of the energy packets $E_i$, transmitted from the supply nodes $K_{Q_i}$ to the demand node $K_S$ plus the compensation power $\delta'(t)$, wherein the compensation power $\delta'(t)$ is equal to the difference between the physical power of the power extracted by the load according to the real-time demand prediction and the sum of the nominal powers of the energy packets transmitted to the load S.

In this embodiment, immediately after the corresponding real-time predictions, the corresponding real-time data packets and compensation real-time data packets assigned to the energy packets are formed with the nominal powers determined by these real-time predictions and transmitted to the control instance.

At execution time, the control instance then sets the corresponding physical powers at the corresponding locations on the basis of the energy data packets of $E_l$ and the real-time data packets assigned to $E_l$ and the real-time compensation data packets, such that that at the location $x_p$ of the demand edge $$p_\varphi(x_p,t)=(\Sigma_{l=1}^n p_{nom}^{E_l}(t)+\delta'(t))\in \{p_{nom}^E(x_p,t);R(t);T\}$$

holds.

In one embodiment, the invention has, for each real-time prediction period $T_{RT}$, that is part of the overlap of the transmission period with the real-time prediction period $t^{000}$, the invention further comprises the steps of, for each point in time (t) within the respective real-time prediction period $T_{RT}$ UU) for each supply node $K_{Q_i}$ to which a source $Q_i$ is connected via a supply edge wherein the source $Q_i$ is to cover the demand of the load S for each point in time t within the real-time prediction period, determining a fraction $\rho(t)$ of the supplied physical power $p_\varphi(x,t)$ from the real-time supply predictions at at least one location x of the respective supply edges, which fraction $\rho(t)$ exceeds or falls below the limits defined by the equivalence relation of the power to be transmitted from the source node $K_{Q_i}$ to the load S, VV) for each point in time t within the real-time prediction period $T_{RT}$ forming a maximum total balancing power D(t) as the sum of all maximum balancing powers $D_i(t)$ of the balancing nodes $K_{Aus_i}$ booked for the sources $Q_i$ and for each balancing node $K_{Aus_i}$ determining a quotient $g_i(t)$ from the maximum balancing power $D_i(t)$ of the respective balancing node $K_{Aus_i}$ and the maximum total balancing power D(t), WW) determining real-time balancing packets for transmission on all booked balancing paths which balancing paths include the balancing nodes $K_{Aus_i}$ and the source $Q_i$, wherein in the associated real-time balancing data packets the nominal power $p_{nomAusRT}(x,t)$ for at least one location x of each edge of the respective balancing path is a function of the product of the deviation $\rho(t)$ determined in step UU) with the quotient $g_i(t)$ but only up to a maximum of the value of the maximum compensation power $D_i(t)$, and the remainder $R_i(t)$ is constantly set equal to zero, wherein if the product $t_i(t)\cdot\rho(t)$ is negative, this product $g_i(t)\cdot\rho(t)$ is increased by the amount determined by a real time prediction for a location x of the edge of the balancing path via which edge the supply node $K_{Q_i}$ is connected to the balancing node $K_{Aus_i}$ to compensate for losses incurred during transmission from the balancing node to the corresponding source, XX) transmitting the real-time balancing data packets to the control instances associated with the nodes on the balancing graphs, YY) transmitting the real-time balancing packets by at any point time t within the transmission period T for at least one location x on each edge of the balancing graph setting the physical power $p_\varphi(x,t)$ to be equal to the nominal power $p_{nomAusRT}(x,t)$ of the real-time compensation packets for the location x, and ZZ) at any point in time t within the transmission period T setting the physical power $p_\varphi(x,t)$ for at least one location x of each edge of the transport path, so that the physical power $p_\varphi(x,t)$ is equal to the nominal power $p_{nomRT}(x,t)$ of the real-time energy data packets for the location x and the physical power $p_\varphi(x,t)$ is an element of the power class of the energy packet to be transmitted.

In an embodiment in which the transport graph EETG (TP(E, Q, S); AP($K_{Aus}$,Q)) extended by compensation and balancing consists only of one transport path TP (E, Q, S) for the transmission of an energy packet with the power class $\{p_{nom}(t), R(t), T\}$ from the source Q to the load S and a balancing path AP($K_{Aus}$,Q) connecting the source 6.000 with the compensation node $K_{Aus}$ exists, the adjustment of the physical powers is carried out according to the following steps. The booked transport graph EETG extended by balancing and compensation contains, as an example, only one balancing node $K_{Aus}$ which can deliver a maximum physical power up to a maximum balancing power $D(t)=D(t)+v(D(t))$, increased by the loss at any point in time t within the transmission period T. Therein D(t) is the maximum balancing power of $K_{Aus}$ and a function of the remainder R(t) of the energy packet. Thus, at any point in time t within the transmission period T, $K_{Aus}$, has the potential to absorb a maximum physical power up to the maximum balancing power D(t). Furthermore, $\{p_{nom}(t), R(t),T\}$ is the power class of the energy packet E transmitted via EETG.

In this embodiment, at the appropriate real-time prediction times $t_k^{000}$, real-time predictions for the maximum generation power $p_{RT}(x_0,t_k^{000})$ for source Q at location $x_0$ are generated for the real-time prediction periods $T_{RT}^k$, which cover the transmission period T of the energy packet E without intersection. The power at $x_i$ is then determined by the function $f_{ein}$ by means of real-time prediction. For the corresponding real-time packet, it applies that for its nominal power at location $x_i$ of the supply edge 5.810 $p_{nom}(x_1,t)=p_{nomRT}(x_1,t_k^{000})=f_{ein}(p_{RT}(x_0,t_k^{000})$, $\forall t$, $\forall t$ from the respective real-time prediction period $T_{echt}^k$. For simplicity, we now denote $p_{nomRT}(x_1,t_k^{000})$ by $p_{nomRT}^{1k}:=p_{nomRT}(x_1,t_k^{000})$. In the next step of this embodiment, for all $T_{RT}^k$ and each t E, those $t\in T$ are considered for which there is an excess with $p_{nomRT}^{1k}>(p_{nom}(t)+R(t))$ or a shortage with $p_{nomRT}^{1k}<(p_{nom(t)}-R(t))$. In this embodiment, for all $T_{RT}^k$ and each $t\in T_{RT}^k$ for the excess, $p_{nomRT}^{1k}>(p_{nom}(t)+R(t))$, $$\rho^-(t) = \begin{cases} p_{nomRt}^{1k} - (p_{nom}(t)+R(t)), & p_{nomRt}^{1k} - (p_{nom}(t)+R(t)) > 0 \\ 0, & \text{otherwise} \end{cases}$$

and for the case of shortage, $p_{nomRt}^{1k}<(p_{nom(t)}-R(t))$, $$\rho^+(t) = \begin{cases} (p_{nom}(t)+R(t)) - p_{nomRT}^{1k}, & (p_{nom}(t)+R(t)) - p_{nomRT}^{1k} > 0 \\ 0, & \text{otherwise} \end{cases}$$

determined by the corresponding real-time predictions. In a preferred embodiment, it is required that for the nominal power $p_{nom}(t)$ and the remainder R(t) of an energy packet, $p_{nom}(t)=p_{nom}(t_k^{000})\forall t$ from $T_{RT}^k$ and $R(t)=R(t_k^{000})\forall t$ from $T_{RT}^k$ holds. That is, both the nominal power and the remainder are constant within $T_{RT}^k$ and thus it follows that $\rho^-(t)=\rho^-(t_k^{000})=\rho_k^-$ and $\rho^+(t)=\rho^+(t_k^{000})=\rho_k^+\forall t$ from $T_{RT}^k$. Immediately after the $\rho_k^-$ and $\rho_k^+$, determined by the real-time prediction, the nominal powers for the real-time balancing packets, for the case where $\rho_k^->0$, are now determined by $$p_{nomRT}^{Ausgleich}(x_{in}^{Aus},t)=\rho_k^-\leq D(t)\forall t \text{ from } T_{RT}^k.$$

Wherein $x_{in}^{Aus}$ is the connection point of the equalisation path with the QFC node, which is connected to the source node $K_Q$ via an edge of the balancing path. For the case wherein $\rho_k^+>0$, $p_{nomRT}^{Ausgleich}(x_{out}^{Aus},t)=\rho'(t_k^{000})=(\rho_k^++v_{RT}^k)\leq D(t)+v_{RT}^k<\forall t\in T_{RT}^k$ is set with $v_{RT}^k:=v_{RTi}(\rho_k^+,AP(K_{Aus},K_Q))$. Here, $v_{RT}(\rho_k^+,AP(K_{Aus},K_Q))$ denotes the real-time prediction of the loss in the transmission of $\rho_k^+$ via the balancing path AP($K_{Aus}$,$K_Q$) and $x_{out}^{Aus}$ denotes the connection point of the balancing path to the QFC, which QFC is connected to the balancing node $K_{Aus}$ via an edge. In this embodiment, the nominal powers of the real-time balancing packet, are then determined to be $\rho'_{RT}(x_{out}^{Aus},t_k^{000})=\rho'(t_k^{000})$ for $\rho_k^+>0$ or for $\rho_k^->0$ to be $\rho_{RT}(x_{in}^{Aus},t_k^{000})=\rho_k^-$. Immediately after the real-time balancing data packets are determined, they are transmitted to the control instance 220.000 of the data and computer network 200.000. In this embodiment, at the execution time of the transmission of the energy packet via its transport path, depending on the transmission direction, the physical power, according to the nominal power of the real-time balancing packet, is set such that the physical power for the locations $x_{in}^{Aus}$ and $x_{out}^{Aus}$ of the balancing path is $p_\varphi^{Aus}($. At the same time, either for $\rho_k^->0$ at $x_2\in e_2$, which is the at least one location on edge $e_2$, connecting supply node $K_Q$ to transport path TP (E, Q; S), the physical power is set such that $\forall t$ from $T_{RT}^k$, according to the sign rules for ohm node $K_Q$ $$p_\varphi(x_2,t)=p_\varphi(x_2,t_k^{000})=p_{nomRT}^E(x_2,t_k^{000})-p_\varphi^{Aus}(x_{out}^{Aus}, t_k^{000})=t_k^{000})=p_{nomRT}^E(x_2,t_k^{000})-\rho_k^-,$$

or for $\rho_k^+>0$, the physical power becomes simultaneously $p_\varphi(x_2,t)=p_\varphi(x_2,t_k^{000})=p_{nomRT}^E(x_2,t_k^{000})+p_\varphi^{Aus}(x_{out}^{Aus}, t_k^{000})=p_{nomRT}^E(x_2,t_k^{000})+\rho'(t_k^{000})$. The nominal powers for the real-time balancing packets at the other locations of the balancing path are determined by the corresponding real-time predictions. In addition, the powers are set so that for all t within T $$p_\varphi(x_2,t)\in\{p_{nom}(t),R(t),T\} \text{ and } p_\varphi(x_{out}^{Aus},t)\in\{0,(D(t)+v(D(t))),T\} \text{ or}$$

$p_\varphi(x_{in}^{Aus},t)\in\{0, D(t),T\}$, respectively. Here, $v(D(t))$ is the calculated loss for the transmission of D(t) via the equalisation path. In one embodiment, multiple balancing nodes $K_{Aus}^i$, are connected to the source node $K_Q$ via balancing paths $AP_i$, and $D_i(t)$ are the maximum balancing powers of the balancing nodes $K_{Aus}^i$. In this embodiment, D (t)=$ED_i(t)$ and D'(t)=$\Sigma(D_i(t)+v_{D_i}(t))$, wherein the total balancing potential D(t) is a function of the remainder $R_E(t)$ of the corresponding energy packet of the source Q under consideration. Here $v_{D_i}(t)$ are the transmission losses of $D_i(t)$ over the balancing paths $AP_i$ determined by real-time prediction. It remains to determine the nominal powers $\rho_{ki}^-$ or $\rho_i'(t_k^{000})$ for the real-time balancing packets over the corresponding balancing paths $AP_i$. These are determined by $\rho_{ki}^-=g_i\cdot\rho_k^+$ or $\rho_i'(t_k^{000})=\rho_{ki}^++v_i(t_k^{000})$. Where $\rho_{ki}^+=g_i\cdot\rho_k^+$ and $v_i(t_k^{000})$ is the transmission loss of $\rho_{kl}^+$ via the balancing graph $AP_i$ determined by real-time prediction and $g_i$ is determined by $$g_i = \frac{D_i(t_k^{000})}{D(t_k^{000})}.$$

The real-time balancing data packets formed accordingly are then transmitted to the control instance and, at execution time, a physical power is set at the respective locations at the respective real-time intervals $T_{RT}^k$ corresponding to the real-time data packets so as to be an element of the power class of the power packet to be transmitted at at least one location of the edge connecting the supply node $K_Q$ to the transport path TP(E, Q, S, T).

The invention also relates to a system for directional transmission of energy in the form of at least one energy packet, comprising a transmission network and a data and computer network, wherein the transmission network comprises
- at least two nodes, one of which is a supply node $K_Q$ and one of which is a demand node $K_S$,
- at least one edge, each edge interconnecting exactly two nodes,
- at least one power controller, the at least one power controller being set up and arranged in such a way that, by means of the at least one power controller, a physical power $p_\varphi(x,t)$ actually flowing over the respective edge can be set for at least one location x on each edge,
- a plurality of sources Q, each of the sources Q being connected to a supply node $K_Q$ via a supply edge, and
- a plurality of loads S, each of said loads S being connected to a demand node $K_S$ via a demand edge, the data and computer network comprising
- at least one computer node and
- at least one control instance executing on said at least one computer node, wherein the data and computer network is configured and operatively connected to the at least one power controller such that, in the operation of the system, the physical power $p_\varphi(x,t)$ is controllable by the at least one power controller for at least one location x on each edge by the control instance, wherein the at least one control instance of the at least one computer node is configured in such a way that, in the operation of the system, the control instance executes a method comprising the steps:

A) forming a data packet, wherein the data packet is uniquely assigned to precisely one energy packet, wherein the data packet defines the respective energy packet and wherein the data packet describes
i) a transmission period T of the energy packet comprising a duration DT and an execution time $t_0$, which execution time $t_0$ identifies the start of the transmission period T,
ii) a predetermined transport path of a transport graph of the transmission network for the directed transmission of the energy packet, which transport path connects at least one of the plurality of sources Q with exactly one of the plurality of loads S, wherein exactly one of the plurality of sources Q is connected via exactly one supply edge to a supply node $K_Q$ of the predetermined transport path and the exactly one load S is connected via a demand edge of the predetermined transport path to the demand node $K_S$, and
iii) an equivalence class $\{p_{nom}(t),R(t),T\}$ of the energy packet, wherein the equivalence class $\{p_{nom}(t), R(t),T\}$ is given by
- a time course of a nominal power $p_{nom}(t)$ of the energy packet previously determined by at least one prediction and a time course of a remainder R(t) as a function of a prediction uncertainty of the at least one prediction,
- where, for each point in time t within the transmission period T of the energy packet, there is a $\mu(t)$, with $-1 \leq \mu(t) < 1$ or with $-1 < \mu(t) \leq 1$ or with $-1 \leq \mu(t) \leq 1$, so that the physical power $p_\varphi(x,t)$ in the transmission of the energy packet at each point in time t and at at least one location x on each edge of the transport path is fixed as the sum of the nominal power $p_{nom}(t)$ and the product of $\mu(t)$ and the remainder R(t), where the equivalence class is defined by an equivalence relation,
according to which, for each point in time t of the transmission period T, a first physical power $p'_\varphi(\hat{x}, t)$ at any location $\hat{x}$ of an edge of the transport path and a second physical power $p_\varphi(x,t)$ at any location x of an edge of the transport path are equivalent if and exactly if there is a given remainder R(t) greater than or equal to zero and less than or equal to a limit value $R_{max}$ as well as a $\mu(t)$, with $-1 \leq \mu(t) < 1$ or with $-1 < p(t) \leq 1$ or with $-1 \leq \mu(t) \leq 1$, such that the first physical power $p'_\varphi(\hat{x}, t)$ is equal to the sum of the second physical power $p_\varphi(x,t)$ and the product of $\mu(t)$ and the remainder R(t), B) prior to the execution time $t_0$, transmitting the data packet to all control instances of the data and computer network to which the power controllers are connected for controlling the physical power, so that all the data necessary for transmitting an energy packet are coherent on the control instances, and C) beginning with the execution time $t_0$ transmitting the energy packet biuniquely assigned to the data packet, wherein, for all points in time t within the transmission period T of the energy packet, the physical power $p_\varphi(x,t)$ flowing on the transport path between the supply node $K_Q$ and the demand node $K_S$ is set for at least one location x of each edge of the transport path such that the physical power fed into the demand node $K_S$ is an element of the equivalence class $\{p_{nom}(t),R(t),T\}$ described by the data packet.

In one embodiment, the data and computer network is implemented according to the schematic representation of FIG. 3 and the associated description.

In one embodiment, at least one node of the data and computer network 200.000 is equipped with a neuromorphic chip for executing the predictions according to claims 3 and 9, exemplified by specially trained spiking neural networks.

In a further embodiment, at least one node of the data and computer network 200.000 may be implemented as a quantum computer for executing the methods according to claims 3, and 7 to 12.

In one embodiment, an ohm node to which n edges are connected and to each of which a QFC node is connected forms a so-called Quantum Grid 2.0 Router. The sensors and actuators of these n-QFC nodes are connected to the CPS 2.500 of the ohm node via a data link. The CPS node 2.500 of the ohm node thus takes over the function of the CPS nodes of the individual QFC nodes. Since these are no longer required, they can be omitted in the individual QFC nodes.

In one embodiment, the physical power is set at a location x of an edge of the transmission network according to FIG. 1 by setting this location x the connection point of this edge at a QFC node according to FIG. 5.

In one embodiment, the supply edge, as an active edge, comprises the supply QFC for setting the physical power at at least one location x of the supply edge, and the demand edge, as an active edge, comprises the demand QFC for setting the physical power at at least one location x of the demand edge.

Insofar as aspects of the invention are described herein with respect to the system for directional transmission of energy in the form of at least one energy packet, these also apply to the corresponding method described above and vice versa. Insofar as the method is carried out with a system according to the present invention, this system comprises the corresponding devices therefor. In particular, embodiments of the system are suitable for carrying out previously described embodiments of the method.

In so far as the embodiments described above can be implemented, at least in part, using a software-controlled data processing device, it is apparent that a computer program providing such software control and a storage medium on which such a computer program is stored are aspects of the invention to be considered.

BRIEF DESCRIPTION OF THE DRAWING

Further advantages, features and possible applications of the present invention will become apparent from the following description of an embodiment and the accompanying figures. In the figures, identical elements are denoted by identical reference signs.

FIG. 1 shows a schematic representation of a possible embodiment of the system according to the invention for the directed transmission of energy using the example of an electrical supply network consisting of a transmission network 100.000 and a data and computer network 200.000. The data connections between the supply nodes 1.800, demand nodes 1.900, supply QFCs, demand QFCs, QFC nodes 2.000, ohm nodes 1.000 and edges 5.000 of the transmission network as well as the data connection of the data and computer network to other data networks such as the Internet are not shown. Furthermore, FIG. 1 schematically shows the control instances executed on the computer nodes of the data and computer network for setting the physical powers at locations of the edges of the transmission network. The representation of the transmission network schematically comprises the representation of two transport graphs consisting of edges and ohm and QFC nodes, such that sources are connected to a load for the transmission of energy packets. A node of 100.000 to whose edge 5.000 of 100.000 a source 6.000 is connected is referred to as a supply node 1.800 for the purposes of this application. A QFC 2001, see FIG. 4, of an active supply edge 2.800, which is both permanently connected to the source 6.000 and permanently connected to the supply node 1.800, is referred to as supply QFC 2.800. A node of 100.000 to whose edge 5.000 a load 7.000 is connected is referred to as a demand node 1.900 for the purposes of this application. This edge in this embodiment is an active edge and is referred to as a supply edge. The QFC 2.001 of this supply edge connected to this demand node 1.900 and to the load 7.000 is referred to as the demand QFC 2.900. In FIG. 1 the supply edge is shown in the embodiment of an active edge consisting of the supply edge 5810 connecting the source to the supply QFC 2.800 and the supply edge 5.820 connecting this QFC to the supply node. Here, an active edge has two connecting points at each of its end points for flexible connection. Accordingly, the demand edge 5.900 in the embodiment is shown as an active edge consisting of the demand edge 5.910 connecting the load to the demand QFC 2.900 and the demand edge 5.920 connecting this QFC to the demand node. Furthermore, FIG. 1 shows a schematic representation of a transmission network according to a first embodiment and the representation of two transport paths of the present invention. The transmission network can be formed from several autonomous transmission networks that are interconnected. Similarly, the data and computer network can be formed from autonomous, interconnected data and computer networks. FIG. 1 shows the possible transmission of a first energy packet $E_1$ from a wind generator 6.100 to a private household 7.100 as a load via a transport path 101.000 and the transmission of a second energy packet $E_2$ from a solar generator 6.200 via a second transport graph 102.000, also to the private household 7.100, Here, the private household is a prosumer that can also form a source in other operating states of the transmission network. The transport path 101.000 consists of the supply edge 5.810 which connects the wind generator 6.100 with the supply QFC 2.800. The latter is connected to the supply node 1.800 via the supply edge 5.820. This supply node 1.800 in turn is connected to a QFC 2.000 via an edge 5.000, which in turn is connected to the demand node 1.900 via a sequence of edges 5.000, which are connected to QFCs 2.000 and ohm nodes 1.000. This demand node is then connected to demand QFC 2.900 via demand edge 5.910. The transport path 101.000 then terminates with the connection of 2.900 via 5.920 at the private household in the role of a load 7.100 in this transmission. The structure of one embodiment of an ohm node 1.000 and a QFC node 2.000 is shown in FIGS. 4 and 5. The edges are active supply and demand edges and edges that are the lines for transmitting the corresponding physical power. In the case of an electrical transmission network, these are electrical lines. In the case of a gas network, they are corresponding pipelines.

To cover the demand of 7.100, a second energy packet $E_2$ must be transmitted simultaneously in this example. The routing procedure has booked the solar generator 6.200 and the transport path 102.000 for this purpose; the transport graph 110.000 is formed from the union of the two transport paths 101.000 and 102.000. FIG. 1 shows that the two transport paths only have the demand node 1.900 and the demand partial edges 5.910 and 5.920 as well as the demand QFC 2.900 in common, thus the transport graph 110.000 as part of the transmission network 100.000 consists of these and of all other nodes and edges of the two transport paths. Furthermore, FIG. 1 shows that a third energy packet being transferred from SynBio source 6.300 to load 7.001 via a further transport path TP3. This transport path is connected to the supply node 1.800 of the transport path 102.000, designated TP2. This means that node 1.800 is also the supply node for transport path TP3. The transport path TP3 thus has the route in TP2 from 1.800 to the ohm node 1.000 in common with TP2. The ohm node 1.000 of TP2 is also the load node of TP3.

Figure 2:
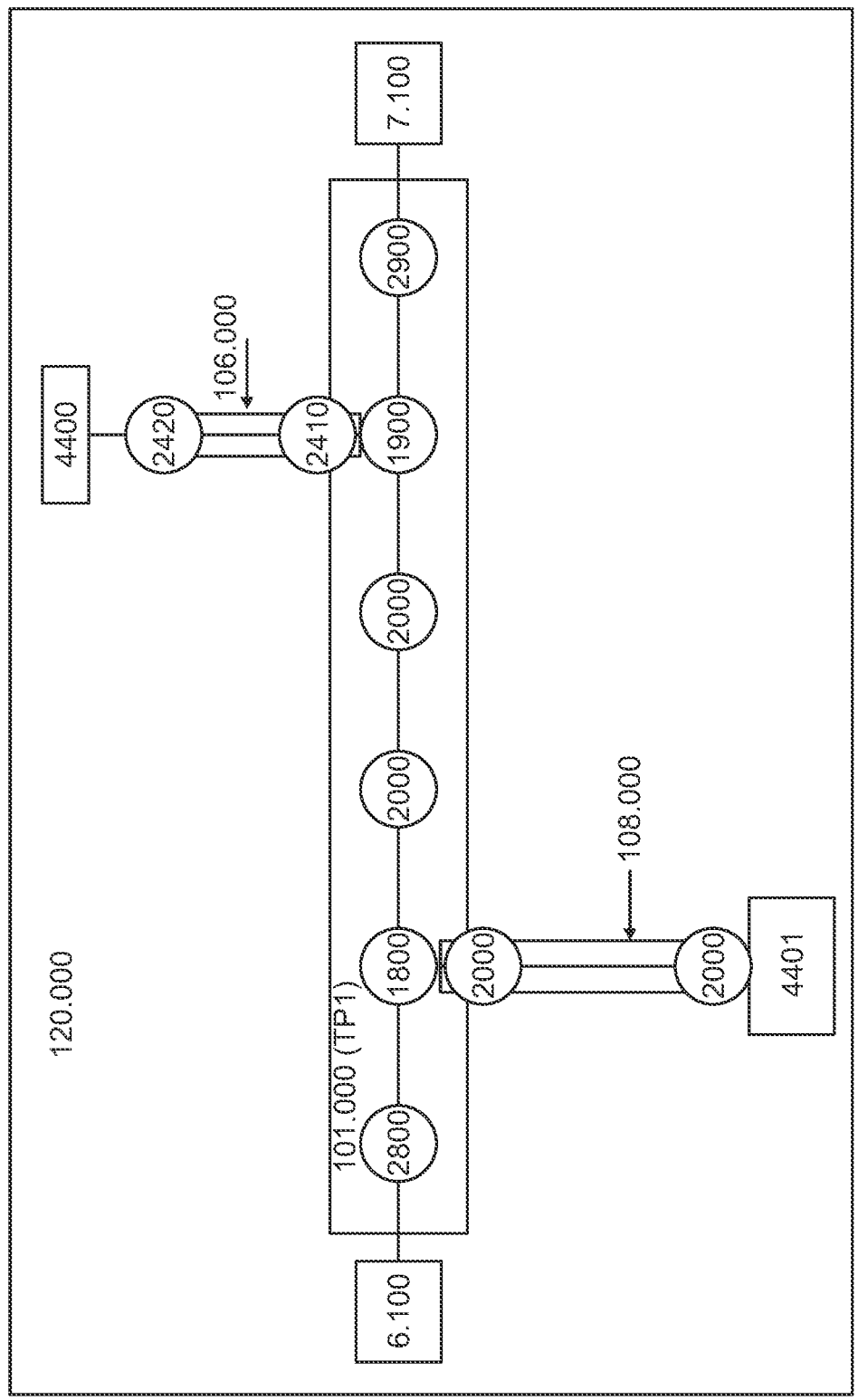
FIG. 2 is a schematic representation of a transmission network extended by compensation and balancing.

FIG. 2 shows the transmission of a packet from a source 6.100 via a transport graph 101.000 to a load 7.000, wherein the booking requires both compensation and balancing. In addition to the transport path, which in this case is identically equal to the transport graph, the booking procedure has booked both the compensation node 4.401, with the capacities given by the energy packet, and the compensation path 106.000 which connects 4.401 to the demand node 2.900. Since balancing is also required, the routing procedure booked the balancing node 4.401 and the balancing path 108.000, wherein 108.000 connects the balancing node 4.401 with the demand node 2.800, with the corresponding capacities accordingly. The compensation path has in common with the transport path, the demand node and the connection to the load; and the balancing path has in common the supply node and its connection to the load. FIG. 2 thus shows the extended transport graph 120.000 with compensation and balancing.

Figure 3:
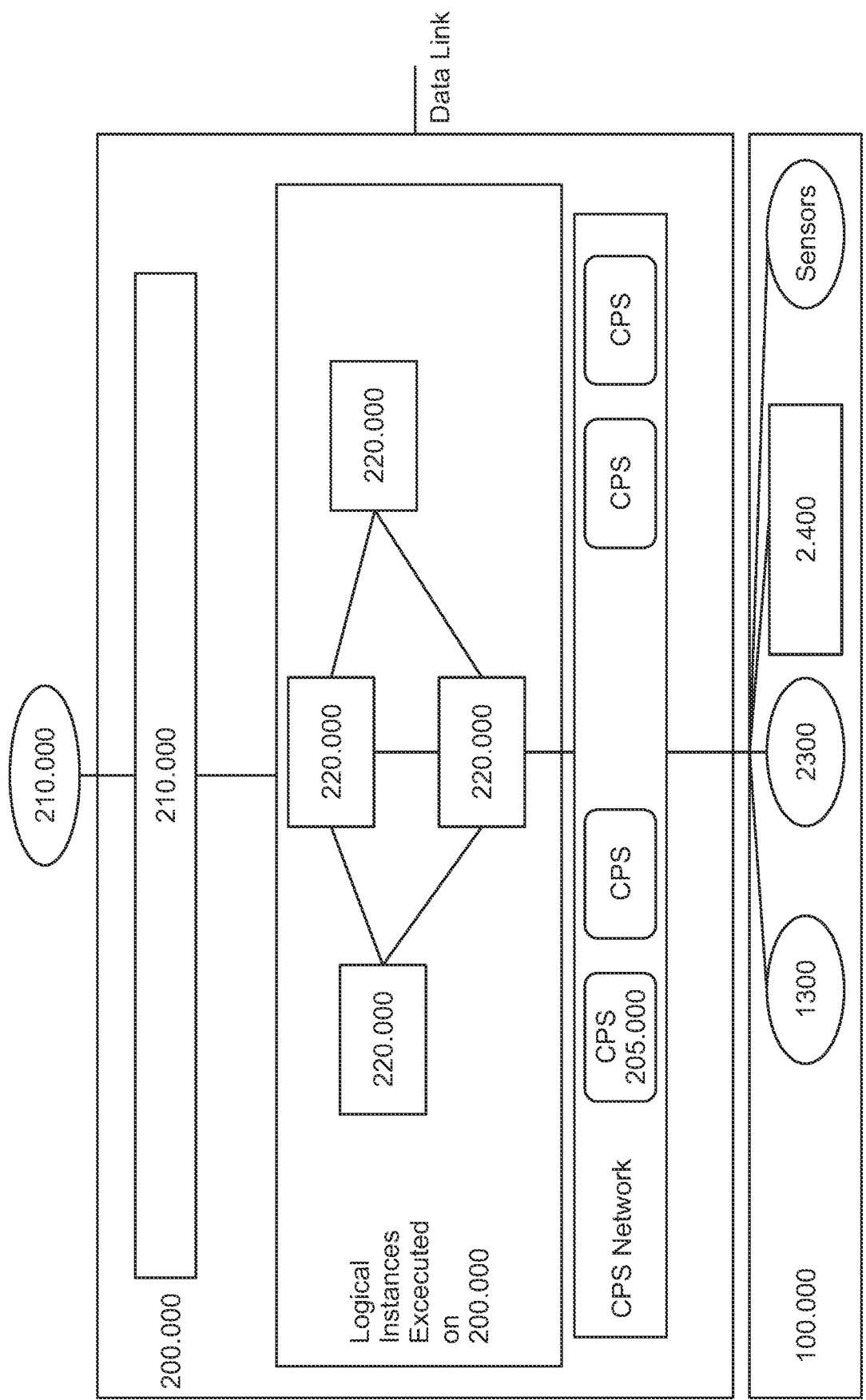
FIG. 3 is a schematic representation of the data and computer network comprising a control instance.

FIG. 3 shows the schematic design of the data and computer network 200.000 as well as the logical functions that are executed on this data and computer network. FIG. 3 is used to explain the structure and the logical functions. The data and computer network 200.000 consists of computer nodes networked with each other via a data network as at least a logical sub-network of 200.000. This data networking can be implemented via a dedicated line-based and/or radio-based data network or as a virtual private network via a third-party data infrastructure. On each of these computers, the correspondingly required data networking functions can be provided via a virtual router and/or virtual switches. Furthermore, the computers of 200.000 can have virtual computers for the execution of a control instance 220.000. At least one of these nodes is a so-called CPS node 205.000, on which the corresponding Cyber Physical System (CPS) operates for controlling and regulating the power controllers of the QFC nodes, the acquisition of measured values and the data communication with 200.000 are executed. These CPS 205.000 together form the so-called CPS network as a sub-network of 200.000. In one embodiment, at least one CPS node is assigned to each node of the transmission network 100.000. These CPS nodes have a corresponding data connection to the sensors 1.300 of the ohm nodes and sensors 2.300 of the QFCs as well as to the actuator 2400 of the QFC nodes for controlling the setting of the physical power by the respective QFC node or QFCs. Furthermore, in one embodiment, each sensor of the perimeter network, i.e. sensors at locations outside the transmission network, is assigned to at least one CPS node and connected to 200.000 via a data link. These sensors of the perimeter network, together with the CPS nodes assigned to them, form the perimeter network 210.000 and serve to record additional measured values as input variables for the various predictions, in particular for the real-time predictions of the power generation of the sources and the power demand. In one embodiment, a CPS node may be a particularly designed computing node with its own design, size and power consumption, and with connections for analogue and digital data communications. The coherently coupled control instances 220.000 together form a virtual control instance network by executing the corresponding task-specific control instances 220.000 on the corresponding virtual computers of the data and computer network. The data and computer network also has at least one wired and/or radio-based data connection to third-party data networks, such as the Internet. In one embodiment, the various tasks of the method according to the invention, such as performing the supply, demand and realtime predictions, the routing procedure comprising the reservation and booking procedure and the optimised determination of the transport and extended transport graphs, as well as the control of the QFCs for setting the physical power for the transmission of the packets, can be performed as a distributed application on different coherently coupled control instances. The control instances are executed on the computing nodes of 200.000. In one embodiment, for example, at least one control instance can be responsible for assigning the execution of the corresponding process steps to one or more control instances in dependence on subnetworks or also on specific nodes, or for initialising the corresponding control instances for execution on the virtual computers of the computer nodes. This can be, for example, the localisation, i.e. derivation of a weather prediction modified for the location of the source, from a general weather prediction obtained from third parties via the external data connection. The execution of demand predictions, real-time predictions and the routing procedure can also be divided accordingly for sub-networks or for subsets of 100.000 and assigned to corresponding control instances. These assignments can be made dynamically depending on the load situation. Thus, each element of 100.000 comprising a data connection to 200.000 has a control instance responsible for it.

Figure 4:
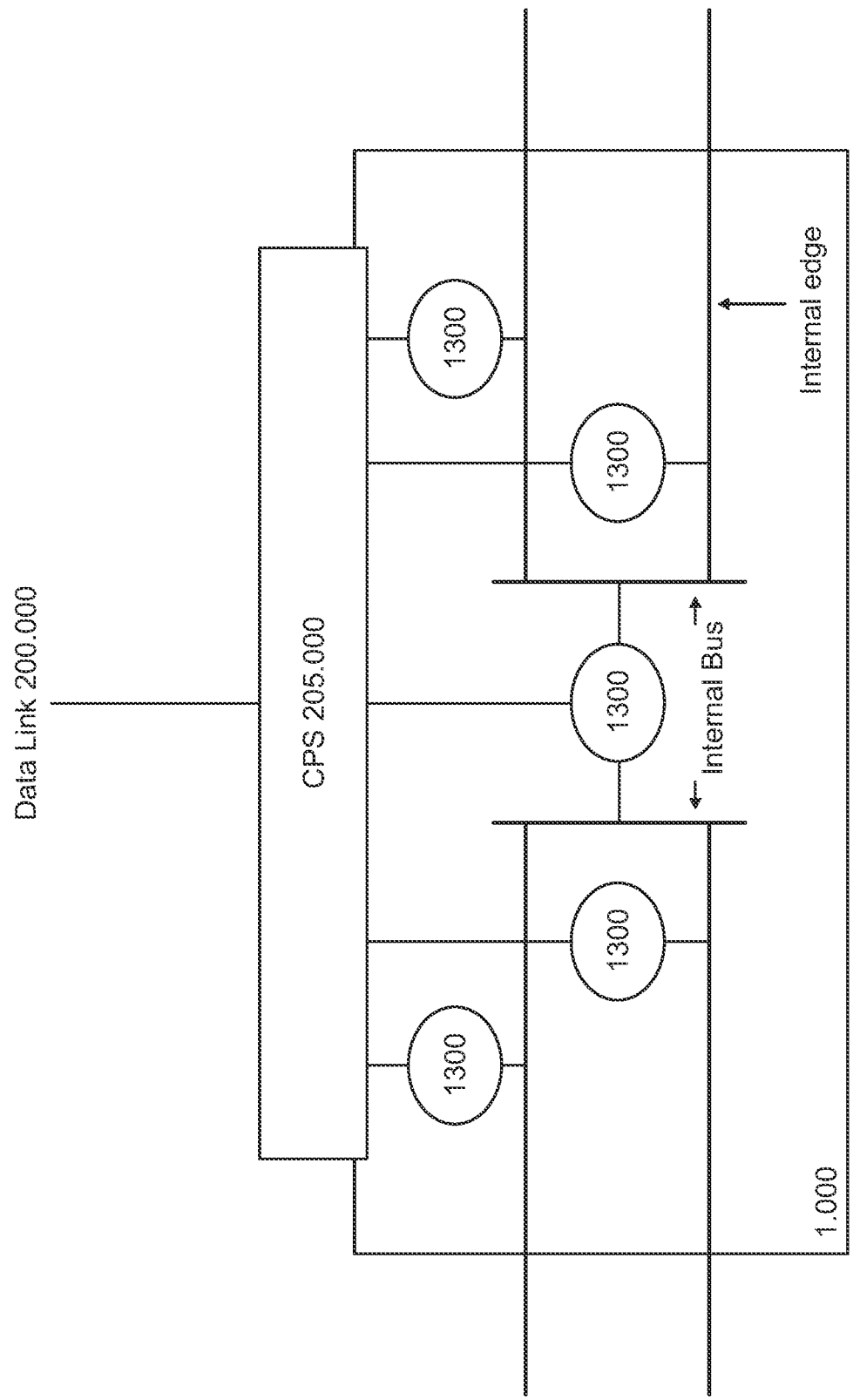
FIG. 4 is a schematic representation of an ohm node.

FIG. 4 schematically shows the internal structure of an ohm node 1.000. This ohm node consists of the bus, the inner edges which are connected to the bus on one side and to the ports on the other side, i.e. the connection points for connecting outer edges, and the sensors 1.300 for measuring the physical power at the various points in the ohm node. These are divided into the sensors for measuring the power at the measuring points of the inner edges and for measuring the power at the measuring point of the bus. The sensors 1.300 are connected to the CPS 205.000 via data links. The CPS 205.000 is in turn connected to the data connection 1.200 to 200.000 for data exchange with the responsible control instance 220.000.

Figure 5:
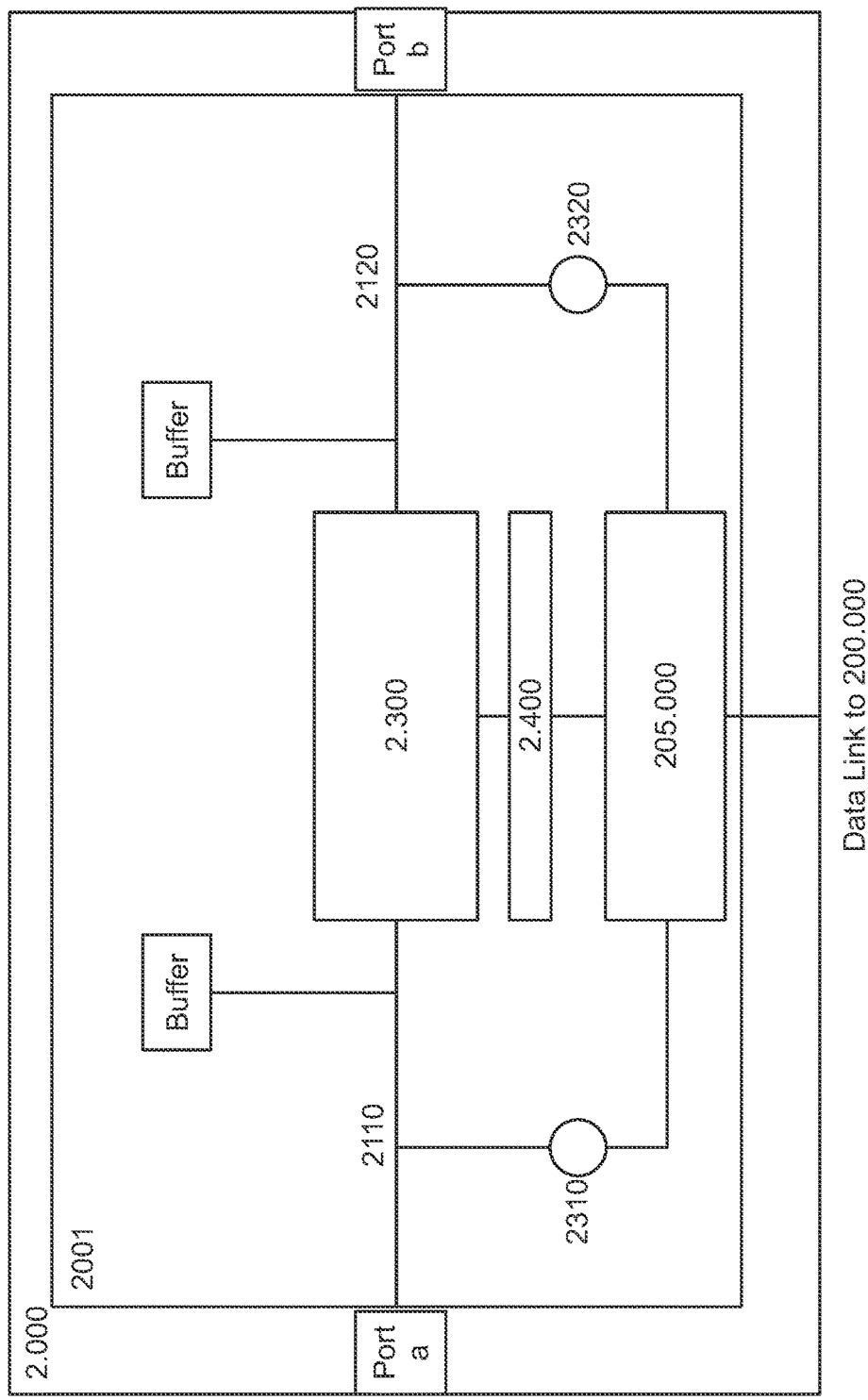
FIG. 5 is a schematic representation of a QFC node.

FIG. 5 schematically shows the internal structure of a QFC node. The QFC node consists of the two ports a and b which are each connected to the QFC via inner edges. The QFC is structured as follows. The inner edge 2.310 of 2.000 is connected on one side to the bidirectional power controller 2.300 and a sensor 2.310 for power measurement and on the other side to port a) for connecting an outer edge. On the other connection side of 2.300, the inner edge 2.320 with the sensor 2.320 and the port b) is connected.

The bidirectional power controller 2.300 is connected to an actuator 2.400. The sensors 2.310 and 2.320 as well as the actuator 2.400 are equipped with a connection for transmitting data to the corresponding CPS 205.000. The CPS in turn is equipped with a connection to 200.000 for data exchange. Furthermore, the QFC has a buffer on each of its edges 2.110 and 2.120 to compensate for small deviations or to implement quantisation. In one embodiment, in order to transmit an energy packet either via an edge connected to port a) or to port b), the physical power is set by the power controller 2.300 at the corresponding location of the edges, i.e. the connection point to the corresponding port. This is done by the corresponding control instance carrying out the corresponding setting by means of the actuator. In one embodiment, this is done by transmitting the real-time data packets assigned to the energy packet to be transmitted from the corresponding control instance 220.000 to 205.000 via the data connection from 205.000 to 200.000 for setting. There, the corresponding setting data for the setting device is then calculated and entered into a queue system. For the corresponding time cycles, the setting device 2.400 then takes these values from the queue and sets the power at the power controller 2.300 depending on the flow direction. The data determined by the sensors is transferred to 205.000 and, if necessary, already subjected to processing there, for example by forming moving average values in one embodiment. These values are then transmitted to 220.000 for further processing, e.g. for real-time predictions, but also for early fault detection. In another embodiment, the setting parameters for setting the physical power are already calculated by the corresponding control instance and transferred to 205.000 for setting.

In the following, we will explain the method according to the invention with the help of FIGS. 1 to 5 using a very simplified example. We assume that the sources 6.100 and 6.200 described in FIG. 1 and the load 7.100 are located in an area where, due to the seasonal period, an essentially constant production and consumption can be assumed for the transmission period T under consideration. The time series of the measured values acquired by the sensors of the perimeter network 210.000, which are assigned to the sources 6.100 and 6.200, are transmitted to the perimeter network 210.000, which, as FIG. 3 shows, is a part of the data and computer network 200.000. By means of Sensors in the analogue electrical part of the sources 6.100 and 6.1000 and the sensors of the supply QFC 2.800, as shown in FIG. 5, further measured values are transmitted to the data and computer network. Using the results of a general weather prediction and the various time series of the measured values, the supply predictions are produced for T by one or more prediction systems as part of one or more control instances 220.000, which are executed on 200.000. Similarly, by the prediction system responsible for the load, as part of the control instance time series responsible for the load, the power absorbed by the load 7.100 via the demand edge 5.920 is measured by the sensor of the demand QFC. Furthermore, time series on the power curves in the analogue electrical part assigned to the load are measured by sensors of the perimeter network 210.000 assigned to the load. Based on these time series and additional information influencing the future consumption, the prediction system assigned to the load as part of the corresponding control instance then creates the demand prediction for the load 7.100. In addition, time series on the time courses of the power from the relevant sensors in the ohm nodes, as shown in FIG. 5, and the QFCs are recorded and processed by the relevant control instances. In this example, we will describe an embodiment of the reservation and booking determination method described in claims 7 and 8, which we will refer to as the routing method. For a time period T lying in the future, the routing procedure determines the corresponding demand and supply data packets on the basis of the demand prediction for the load 7.100 and the supply predictions for the wind generator 6.100 and the solar generator 6.200. We assume that the supply data packets $E_{Ein_W}$ for 6.100 and $E_{Ein_S}$ for 6.200 determined by the routing procedure on the basis of the demand prediction for 7.100 and the supply predictions for 6.100 and 6.200 are composed as follows. There is a sub-packet $E'B_{Ein_W}$ of the supply data packet $E_{Ein_W}$ of the wind generator 6.100, so that $E'B_{Ein_W} = E_D \oplus E_{V_{TP1}}$. Wherein for the cover packet $E_D = E_{Bed}$, wherein $E_{Bed}$ is the demand data packet of load 7.100, and $E_{V_{TP1}}$ is the loss packet to compensate for the loss incurred when transmitting $E_D = E_{Bed}$ via transport path TP1. For the supply packet $E_{Ein_S}$, there is a sub-packet $E'_{Ein_S}$, such that $E'_{Ein_S} = E_D \oplus E_{V_{TP2}}$. Here, $E_{V_{TP2}}$ is the loss packet that compensates for the loss in the transmission of $E_D = E_{Bed}$ via TP2. As a metric for determining which of the two paths 101.000 and 102.000 is the optimal one, the incurred cost is taken. We assume that the price for power is the same for both sources and that the transmission costs only depend on the length of the transport paths and the power transmitted at the same time. Equally, however, the transport paths in question must have the corresponding transmission capacities. We assume that both 101.000 and the transport path 1002.000 have the corresponding capacities to transmit the corresponding energy packets. In the routing procedure, the possible transport paths connecting 6.100 with 7.100 and 6.200 with 7.100 and comprising the transmission capacity to transmit the respective energy packets $E_1 = E'_{Ein_W} = E_D \oplus E_{V_{TP1}}$ and $E_2 = E'_{Ein_S} = E_D \oplus E_{V_{TP2}}$ are considered. These are the transport paths 101.000 and 102.000 of FIG. 1. For booking, the routing procedure determines which one of the two is the more optimal transport path. Since the prices for power for both sources are the same, the transport path with the smallest transmission costs, which are mainly determined by the transfer costs, is the optimal one. We assume that the two transport paths do not differ in terms of length and specific line resistance. Thus, the transmission loss depends on whether additional packets are transmitted simultaneously over one edge. Since both the wind generator 6.100 via transport path 101.000 and the solar generator 6.200 via transport path can transmit the energy packet $E_2$ to cover the demand of load 7.100, the routing procedure for booking, we skip the reservation here, must select the most optimal of the two paths.

Figure 1:
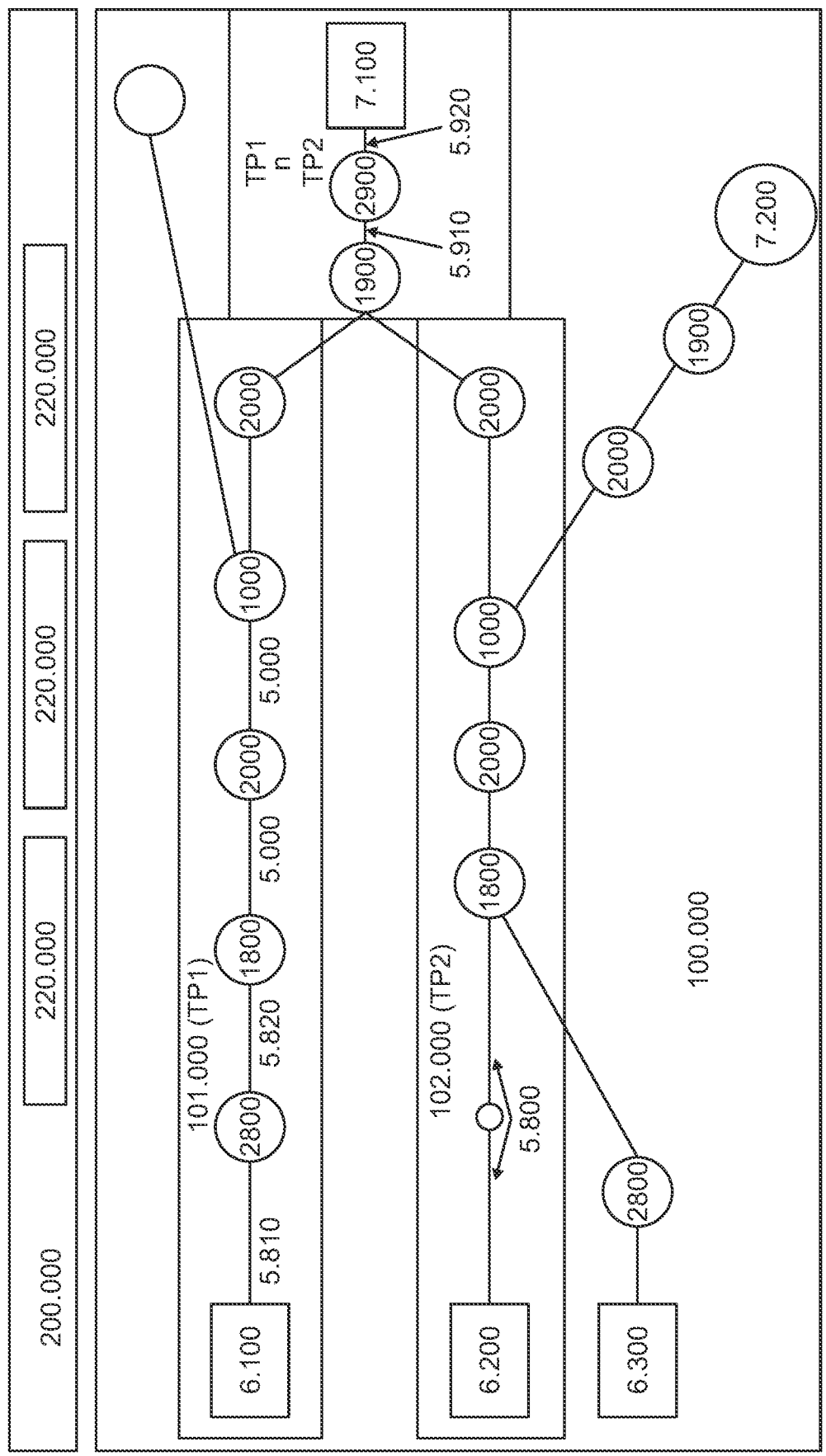
FIG. 1 is a schematic representation of the energy transmission system according to the invention with an exemplary transport graph.

According to FIG. 1, the transmission of another energy packet from the SynBio generator 6.300 to a load 7.200 via a subgraph 102.000 is also booked for the period 7'. Thus, the loss packet $E_{V_{TP2}}$ for the transmission of the cover packet $E_D = E_{Bed}$ to 7.100 via 102.000 is larger than the loss packet $E_{V_{TP1}}$ for the transmission of $E_D = E_{Bed}$ via 101.000 and thus 101.000 is booked. In the following we consider the path that the booked energy packet $E = E_1 = E'_{Ein_W} = E_D \oplus E_{V_{TP1}}$ takes in the transmission from the wind generator 6.100, via the optimally determined transport path 101.000 to the load 7.100. We have again omitted the edge designations in FIG. 1 for the sake of clarity. These result automatically from the position of the edges in the figure. The transmission takes place from 6.100 via the supply edge 5.810, by means of which 6.100 is connected to the supply QFC 2.800. The supply QFC 2.800 then transmits the packet via edge 5.820 by means of which edge the QFC is connected to the supply node 1.800. Via an edge 5.000 connecting 1.800 to the following QFC 2.000, the packet is then transmitted via the ohm node 1.000 via an edge 5.000 and via another QFC 2.000, then via the following edge to the demand node 1.900. The demand QFC 2.900 then transmits the packet to the load 7.100 via the demand edge 5.910, which is connected to 1.900. All ohm and QFC nodes are connected to the data and computer network 200.000 via a data link, just like all sensors of the perimeter network 210.000, which are assigned to the source 6.100. The architecture, structure and components of 200.000 can be seen in FIG. 3 for the data and computer network and the associated description. This also applies to selected sensors in the analogue parts of 6.100 and 7.100 whose measured values are included in the various predictions. For example, the analogue network part has sensors for measuring the power consumed by the individual consumers of 7.100 and transmits these via the perimeter network 210.000 to the responsible control instance 220.000 which is executed on the data and computer network 200.000. The sensor 2.320, like the sensor 2.320 in the analogue part of 7.100, transmits the data via the perimeter network 210.000 to the responsible control instance 220.000. By means of the sensor 2.320, as shown in FIG. 5, the cumulative power consumed by 8.100 is measured on the edge 5.920 of the demand QFC 2.900 and is used as one of the input parameters for the various predictions. Through the routing procedure, the source 6.100, the transport path 101.000 with the energy packet E to be transmitted to cover the demand packet $E_{Bed}$ of the load 7.100 is determined so that $E=E'_{Ein_W}=E_D \oplus E_{V_{TPI}}=E_{Bed}$. In the following, we will use our example to explain in more detail how the packets $E_{Ein_W}$ and $E_{Bed}$ are determined. At a prediction time $t^0$, the supply data packet for 6.1000 is determined by means of a supply prediction for the power that can be made available for transmission by the source in the transmission time period T. We assume that for the execution time $t_0=t^0+24$ h and the duration DT of T is one hour. Accordingly, the demand data packet of load 7.100 must be formed for time period T. The data and computer network 200.000 has a prediction system, as a subsystem of one or more coherently coupled control instances 220.000, which is executed on 200.000. As assumed, T is a typical annual consumption period, in which consumption period the power consumption of 7.100 is well reflected by the temporal trends in the comparison periods of the past.

For clarification, we simplify our example even further and assume that the measured values for these comparison periods satisfy a Gaussian distribution and have a constant expected value, mean value, over T of $<p_{Bed}(t)>:=<p_{Be}>=100$ kW, $\forall t$ from T, with a constant standard deviation of $\sigma=5\%$. Thus, in the past, about 99.7% of the values of the power consumption of load 7.100 were in the interval from $-3\sigma$ to $+3\sigma$ and fluctuated within the limits of 85 kW to 115 kW. It is therefore obvious to take these data for the demand prediction of the corresponding transmission period for the same seasonal period. To simplify matters, we further assume in our example that the supply prediction for T, due to seasonally largely constant wind conditions, results in a mean value for the source of a predicted power $<p_{Ein}(t)>=110$ kW, $\forall t$ from T. For the standard deviation of the supply prediction, we assume that this is also $\sigma=5\%$. Based on these predictions, the routing procedure now forms the demand, supply, coverage and loss data packet. The routing procedure checks whether $E'_{Ein_W}=E_D \oplus E_{V_{TPI}}$ can be formed. According to the demand prediction, it is obvious to determine the nominal power of the demand data packets $p_{nomBed}(t)=<p_{Bed}(t)>=<p_{Bed}>=100$ kW.

Furthermore, it is obvious to determine the remainder $R_{Bed}(t)$ of the power class of the demand data packet to be $R_{Bed}(t)=\int_{Prognose_{Bed}}(\sigma)=3\sigma*<p_{Bed}>=15$ kW. Since the standard deviations of the demand prediction and the supply prediction are the same, the power class of the supply data packet can be determined from the supply prediction as {110 kW, 16.5 kW, T}. This then also determines the power class of the coverage packet $E_D$, with $E_D=E_D$, to {100 kW, 15 kW, T}. If we now assume for the sake of simplicity that the loss in the transmission of the cover packet is 5%, then the power class of the loss packet $E_{V_{TPI}}$ is equal to (5 kW, 0.75 kW, T). Thus $E'_{Ein_W}=E_D \oplus E_{V_{TPI}}$ is a sub-packet of $E_{Ein}$ and the energy packet E to be transmitted to meet the demand of load 7.100 from source 6.100 via 101.000 to 7.100 is obtained by booking the data packet with power class $\{p_{nom_E}(t)=105$ kW, $R_E(t)\equiv15.75$ kW, T} of $E'_{Ein_W}$. As part of the routing procedure, a contract has been concluded between the source 6.100 and the load 7.100 so that the source will set a physical power at at least one location $x_p$ of the demand edge 5.920, which is an element of the power class of E. Similarly, the load undertakes to take in a power via demand edge 5.920 which is an element of this power class of E at $x_p$. In our example, this means that the wind generator 6.100 is allowed to supply a physical power of $p_\varphi^{Ein}(x_p,t)=90$ kW via 101.001 into the demand edge 5.920 according to the contract and at the same time the load 7.100 is allowed to take a power of $e_\varphi^{Bed}(x_p,t)=110$ kW from there according to the contract. That is, within the limits set by the power class of the energy packet to be transmitted, there can be an allowable difference or a shortage or excess between the supplied physical power $p_\varphi^{Ein}(x_p,t)$ and the power demand $p_\varphi^{Bed}(x_p,t)$ at the connection point $x_p$ of the demand edge 5.920 to the demand QFC 2.900. The maximum allowable deviation is therefore $$\left| p_\varphi^{Ein}(x_p,t) - p_\varphi^{Bed}(x_p,t) \right| = \delta(t) \le 30 \text{ kW}$$
$$= 2 \cdot R_{bed}$$
$$= 2 \cdot \frac{R_{Bed}}{R_E} \cdot R_E$$
$$= f_C(R) = C(t),$$

leading to $f_C(R) \approx 1.9 \cdot R_E$. One task of the demand prediction is to predict, in the case that the load has a storage in its analogue part, whether this storage has the potential to absorb or release a maximum power of C(t), $\forall t$, in order to be able to compensate for the difference $\delta(t)$. In the event that the load does not have this potential, the demand prediction is used to instruct the routing procedure to determine a transport graph extended by compensation. In case that the load 7.100 is equipped with a storage in its analogue electrical part that can deliver or receive C(t), the difference $\delta(t)$ is compensated by a suitable control, e.g. by the condition $P_{Bedarf}+p_{ein}(t)+p_{Speicher}(t)=0$, $\forall t$ from T. This is, according to claim 1, the simplest embodiment of the invention, so that by transferring the energy packet of 6.100 via 101.000, the demand of 7.100 is met.

At this point we would like to note that the improvement in prediction accuracy is immediately reflected in the required storage capacity. For example, if $\sigma$ can be reduced from 5% to 2.5%. Then C=2R decreases from 30 kW to 15 kW and over the whole period T the maximum energy that must be able to be absorbed or delivered by the storage decreases from 30 kW T to 15 kW T. For this reason, between the reservation and the final booking, further predictions are carried out with ever decreasing intervals between the prediction and the execution time, so that the prediction uncertainty becomes smaller. Reserved but then no longer required capacities are then released again. The sequence of predictions after booking ends with the sequence of real-time predictions. Here, too, capacities that are no longer required are released immediately if they are no longer needed due to the more accurate prediction. If the storage does not have a suitable storage, then an optimally determined extended transport graph is determined by the routing procedure. In our example, FIG. 2 shows the transport graph thus extended by the compensation. This consists of the transport path 101.000 which connects the source 6.100 with the load 7.100 and the compensation node 4.400 which is connected to the demand node of the load 7.100 via the compensation path 106.000. The compensation node is the demand node of the load 7.100. The demand node of the load 7.100 is connected with the compensation node of the source 6.100. The compensation node is a storage device that can absorb a maximum power up to the maximum compensation power C(t) constantly equal to C(t)=30 kW or deliver a power C'(t)=C(t)+v(t) increased by the loss v(t) occurring during the transmission of C(t) for each point in time within the transmission period.

In case that the source feeds in the physical power $p_\varphi^{Ein}(x_p, t) = p_\varphi^{Bed}(x_p, t) + \delta(t)$, the QFC node 2.410, which is connected on one side to the demand node 1.900 and on the other side to the compensation path 106.000, sets the power δ(t) and the QFC 2.420, which is connected on one side to the compensation path 106.000 and on the other side to the storage as compensation node 4.400, sets the power supplied to 4.400 to $\tilde{\delta}(t) = \delta(t) - \delta_v(t)$. Here $\delta_v(t)$ is the loss that occurs during the transmission of δ(t) via 106.000. In a case wherein $p_\varphi^{Ein}(x_p, t) = p_\varphi^{Bed}(x_p, t) - \delta(t)$, the QFC 2.420 sets the power $\tilde{\delta}(t) = \delta(t) + \delta_v(t)$ in 106.000 and δ(t) is then supplied to demand node 1.900 via QFC 2.410. Since the demand node is an ohm node, taking into account the direction of flow, it follows that the physical power from the demand QFC at the location $x_p$ of the demand edge can be set exactly equal to the demand. To determine δ(t) and δ(t), $p_\varphi^{Ein}(x_p, t)$ and $\rho_\varphi^{Bed}(x_p, t)$ are determined by predictions, and real-time predictions, respectively. Thus, packets with the power class $\{p_{nom}(t)=0, R(t)=C(t), T\}$ are transmitted on the compensation path. By means of a conversion, this then corresponds to the fact that the physical power set for $x_p$ can be represented as the sum of the nominal power of the transmitted energy packet E and a compensation power δ'(t):

$$p_\varphi(x_p, t) = p_{nom}(t) + \delta'(t).$$

In our example, we had assumed, on the one hand, that both the supply and the demand prediction have the same percentage standard deviation of 5% and, on the other hand, that the function $f_{Prognose}$ is the multiplication by the factor 3.

In the following consideration, we want to use the example to show that the function for determining the remainder takes place on a case-by-case basis. To explain this, we will now consider an example, wherein an analogue storage connected to load 7.100 cannot completely provide $C(t) = 2R_{Bed} = 30$ kW. However, the demand prediction shows that the analogue storage can only take in or deliver 10 kW for each point in time of the transmission period. For simplicity, we neglect the losses. In this case, a demand data packet with a remainder $R'_{Bed}(t) = \frac{2}{3} R_{Ein}(t) = 10$ kW can be formed based on the demand prediction. The nominal power remains constant and equal to 100 kW over T. Accordingly, the load then requests that the routing determines a transport graph 120.000 extended by compensation. The compensation node must then have a maximum compensation power of $C(t) = 2, R'_{Bed}(t)$. By transmitting the thus modified energy packet E with power class {100 kW, 10 kW, T}, the physical power injected by the source varies in the interval from −2σ to +2α, whereby, on the other hand, the demand of the load varies in the range from −3σ to +3σ. This means that in about 95% of the cases, a possible difference between the physical power injected and the physical power required by the load 7.100 is compensated by the compensation node of 120.000. Thus, via the energy packet and the compensation packet of compensation node 4.400, a maximum physical power $p_\varphi(x_p, t) = p_{nom}(t) + R'_{Bed}(t) = 110$ kW can be injected into the demand edge of load 7.100. In case the demand is e.g. in the interval between +2σ and +3σ, the missing difference is then compensated by the analogue storage. If, for example, the demand is 115 kW, the missing 5 kW in the analogue part is compensated via the control of the analogue storage. In this case, the choice of the new remainder for the demand data packet can simply be justified by the fact that the use of the analogue storage reduces the purchase price for the energy packet and for the compensation.

It is essential that the sources and loads have concluded a generally valid agreement for the transfer of energy packets. In our example, we assume that the source and the load have committed themselves according to this agreement that in 99.7% of the points in time of a transmission period both injected and absorbed physical power is an element of the agreed energy packet.

In our example, the source 6.100 can only supply a physical power that is an element of the power class (100 kW, 10 kW, T) of the modified energy packet in approx. 95% of the points in time. At the remaining times, the physical power of the source is in the |2σ| to |3σ| range and there is either a shortage $\rho^+$, the power is less than 90 kW, e.g. it is 85 kW, or there is an excess $\rho^-$, the power of 6.100 is greater than 110 kW, e.g. it is 125 kW. To compensate for this gap, the source needs an additional maximum compensating power |D(t)| of 5 kW. Since $D(t) = f_D(R(t))$ and $R(t) = R'_{Bed}(t)$ for the modified energy packet, the function $f_D$ is determined as $$f_D = \left(1 - \frac{R(t)}{R_{Ein(t)}}\right).$$

$R_{Ein}(t)$. Within the framework of the supply prediction, in the case that the source has a connected analogue storage unit, it is also predicted which D(t) the connected analogue storage can absorb or deliver. If the supply prediction shows that 6.100 has such an analogue storage system that can absorb or deliver a physical power up to the maximum balancing power of D(t)=5 kW for each point in time within the transmission period, then the balancing is carried out by this storage system. This means that both a shortage $\rho^+(t)$ and an excess $\rho^-(t)$ are compensated by the storage unit by means of a corresponding control, analogous to compensation.

If a compensation via an analogue storage is only partially possible or not possible at all, the supply prediction requests an optimised transport graph from the routing procedure, as shown in FIG. 2. In FIG. 2, the balancing node 4.401 is connected to the supply node 1.800 of the source 6.100 via a balancing path 108.000. The routing procedure has determined 4.401 in such a way that this, for example, is a storage facility, can take in a maximum physical power up to the maximum balancing power D(t) or can deliver a physical power up to $D'(t) = D(t) + v_{108.00}(D(t))$. This D(t) is the remaining part that cannot be compensated by an analogue storage of the source 6.100.

Balancing packets with the power class {0, D(t), T} are then transmitted on the balancing path. At the transmission time, the modified energy packet is then transmitted via the transport path 101.000 and the physical power, corresponding to the flow direction at the two QFCs of the balancing path, is set so that it is either equal to $\rho^+(t)$ or $\rho^-(t)$ At this point we want to note that both the supply and demand predictions and the derived formation of the supply, demand, coverage and loss data packets are part of the iterative routing procedure. In addition to the ratios of the expected values z of the demand and supply predictions to each other, the ratio of the variances or standard deviations of these predictions to each other also plays a decisive role in determining the power class of an energy packet to be transmitted using the compensation and balancing mechanism.

To show the variety of possibilities for determining the energy packet to be transferred, we now modify our example slightly. We assume that the transmission period falls in a period of very stable wind conditions, so that the standard deviation, in contrast to the one considered before, is only half, i.e. $\sigma'=\sigma_{Ein}=2.5\%$ and thus $R_{Ein}=3\cdot\sigma'\cdot<p_{Ein}(t)>=7.5$ kW. If we again neglect the losses for the sake of simplicity, we could set the coverage packet $E_D$ and thus the energy packet E to be transmitted equal to the demand data packet $E_{Bed}$ with the power class (100 kW, 15 kW, T). We further assume that the load 7.100 has an analogue storage to compensate for the difference $C(t)=2\cdot R_{Bed}$ between the supplied and required power. Since the physical power supplied by source 6.100 is an element of $E_{Bed}$ due to the smaller variation by half, the source 6.100 can meet the demand of load 7.100 by transferring this energy pact $E=E_D=E_{Bed}$, according to the agreement. But the choice of this packet has the consequence that an unnecessarily large amount of transmission capacity, twice as much as necessary, must be reserved for the transmission of the energy packet. An alternative way to define an energy packet is to set the remainder $R_E$ of the energy packet equal to $R_{Ein}=7.5$ kW. In this way, only the transmission capacity that is really needed must be reserved. However, in order to compensate a possible difference, $C(t)=f_c(R_{Bed})$ must be set. Since $R_{Bed}$ can again be expressed as a function of R, in this case, $f_c$ is also a function of R. Since we have assumed that the storage can compensate for this C(t), this energy packet together with 101.000 is determined as the optimal transport graph or transport path due to the transmission costs lowered by half. The example shows that a transport path TP(E, Q, S, T) always consists of a path P in the transmission network that connects the source Q with the load S and an energy packet E, defined by its power class $\{p_{nom}(t), R(t), T\}$.

Finally, let us briefly look at the transmission of the energy packet and the assigned compensation and balancing packets. For this purpose, we assume that all quantities are "quantised". For this we assume that the duration DT=100 dt and the duration of all real-time prediction periods is $DT_{RT}=dt$. Thus T can be covered by the real-time prediction periods $T_{RT}^l$ with l=1 to 100 without intersections. The corresponding real-time predictions are carried out at the real-time prediction periods $t_l^{000}$. Here $t_l^{000}$ is chosen so that for the execution time $t_0=t_1^{000}+dt$ and for $t_l^{000}=t_1^{000}+(l-1)\cdot dt$. According to the real-time predictions, the nominal powers of the corresponding real-time packets are then formed, so that for the nominal powers of the real-time energy packets are determined to $p_{nomRT}(x_{TP},t)=n_{ij}^{TP}\cdot dp$, of the real-time compensation packets are determined to $p_{nomRT}(x_{TP},t)=n_{ir}^{kP}\cdot dp$, and of the realtime compensation packets are determined to $p_{nomRT}^{Aus}(x_{AP},t)=n_{is}^{AP}\cdot dp$. Here $n_{ij}^{TP}$, $n_{ir}^{kP}$ and $n_{is}^{AP}$ are integers greater than or equal to zero, dp is the elementary power, the so-called "power quantum" and dt the "time quantum". The index j designates the location x of the edge $e_j^{TP}$ of the transport path TP 101.000. Correspondingly, the indices r and s are to be understood for the edges of the compensation path KP 106.000 and the compensation path AP 108.000. The index i denotes the "quantised" point in time associated with the point in time t with $(i-1)\leq t\leq i\cdot dt$.

In our example, according to the sequence of real-time predictions for the sequence of $T_{RT}^l$, the values $n_{ij}^{TP}$, $n_{ir}^{kP}$ and $n_{is}^{AP}$ are determined by the corresponding control instances 220.000 and transmitted via the corresponding data connections to the CPS 205.000 of the corresponding QFCs 2.000, as in FIG. 5. There, these are converted into the corresponding actuating parameters, e.g. pulse widths for the power actuator 2.300, and transmitted to the actuating device 2.300. The actuating device 2.300 then sets the power actuator 2.300 via the power actuator. This power actuator then sets the power via the power controller, e.g. a bidirectional step-up step-down controller, according to the flow direction at the corresponding connection point of the respective edge 2.110 or at the edge 2.120 of the corresponding QFC. Through this transmission of the corresponding real-time packets, the energy packet is then transmitted from the source to the load and the demand of the load is met according to the contract.

Finally, we would like to note that with the advances in quantum computing, at least one node of the data and computer network can be a quantum computer. Due to the superior computational power of the quantum computer and the advances in the models for accurate long-term weather prediction that can be run alongside the routing procedure on this quantum computer, a highly dynamic and accurate regenerative hybrid energy supply system can thus be implemented that is superior to today's solutions.

For purposes of the original disclosure, it is pointed out that all features as they become apparent to a person skilled in the art from the present description, the drawings and the claims, even if they have been specifically described only in connection with certain further features, can be combined both individually and in any combination with others of the features or groups of features disclosed herein, unless this has been expressly excluded or technical circumstances render such combinations impossible or pointless. A comprehensive, explicit presentation of all conceivable combinations of features is omitted here only for the sake of brevity and readability of the description.

While the invention has been illustrated and described in detail in the drawings and the foregoing description, this illustration and description is by way of example only and is not intended to limit the scope of protection as defined by the claims. The invention is not limited to the disclosed embodiments.

Variations of the disclosed embodiments will be obvious to those skilled in the art from the drawings, description and appended claims. In the claims, the word "comprising" does not exclude other elements or steps, and the indefinite article "one" or "a" does not exclude a plurality. The mere fact that certain features are claimed in different claims does not exclude their combination. Reference signs in the claims are not intended to limit the scope of protection.

LIST OF REFERENCE SIGNS 100.000 transmission network
200.000 data and computer network, called control network
210.000 perimeter sensor network
220.000 control instance
205.000 CPS computer node
110.000 transport graph without compensation and balancing
120.000 extended transport graph with compensation and balancing
101.000, 102.000 transport paths
106.000 compensation path
108.000 compensation paths
1.000 ohm node
1.300 ohm node sensors

1.800 supply nodes
1.900 demand nodes
2.000 QFC nodes
2.001 QFC
2.300 bidirectional power controller
2.110 inner edge with port a): connection point for flexibly connecting the power controller with an outer edge
2.120 inner edge with port b): connection point for flexible connection of the power controller to an outer edge
2.310 to 2.320 sensors for measuring the power on the inner edges
2.400 device for setting the direction of flow and the magnitude of the power on the bidirectional power controller
205.000 CPS computer
2.800 supply QFC of the supply edge 5.800
2.900 demand edge OFC of demand edge 5.900
4.400 compensation node
4.401 compensation node
5.000 edge
5.810 connection part of the supply edge from the source to the supply QFC
5.820 connection part of the supply edge from the supply QFC to the supply node
5.910 connection part of the demand edge from the demand QFC to the demand node
5.920 connection part of the demand edge from the demand QFC to the load
6.100 wind generators
6.200 solar generators
7.100 private household as load

The invention claimed is:

1. A method for directional transmission of energy in a form of at least one energy packet from a plurality of sources Q via at least two nodes, one of which is a supply node $K_Q$ connected via a supply edge to one of the plurality of sources Q and one of which is a demand node $K_S$ connected via a demand edge to a load S, and via a plurality of edges to a plurality of loads S in a transmission network, the transmission network being controllable by means of a data and computer network in such a way that for at least one location x on each of the plurality of edges an actually flowing physical power $p_\varphi(x,t)$ is controllable by a control instance of the data and computer network, which method comprises the steps of:
   A) forming a data packet for each energy packet, wherein the data packet is biuniquely assigned to exactly one energy packet, wherein the data packet defines the respective energy packet, and wherein the data packet describes
      i. a transmission period T of the energy packet with a duration DT and an execution time $t_0$, which execution time $t_0$ identifies a start of the transmission period T,
      ii. a predetermined transport path of a transport graph of the transmission network for the directed transmission of the energy packet, which transport path connects at least one of the plurality of sources Q with exactly one of the plurality of loads, wherein the exactly one of the plurality of sources Q is connected to a supply node $K_Q$ of the predetermined transport path via exactly one supply edge and the exactly one load S is connected to the demand node $K_S$ via a demand edge of the predetermined transport path, and
      iii. an equivalence class $\{p_{nom}(t),R(t),T\}$ of the energy packet,
         wherein the equivalence class is given by
            a nominal power $p_{nom}(t)$ of the energy packet as a function of time, wherein the nominal power $p_{nom}(t)$ is determined beforehand by at least one prediction, and a remainder R(t) as a function of time and as a function of a prediction uncertainty of the at least one prediction,
            wherein for each point in time t within the transmission period T of the energy packet there is a u(t), with $-1 \leq \mu(t) < 1$ or with $-1 < \mu(t) \leq 1$ or with $-1 \leq \mu(t) \leq 1$, such that the physical power $p_\varphi(x,t)$ during the transmission of the energy packet at each point in time t and at at least one location x on each edge of the transport path is fixed as the sum of the nominal power $p_{nom}(t)$ and the product of $\mu(t)$ and the remainder R(t),
         wherein the equivalence class is defined by an equivalence relation, according to which equivalence relation, for any point in time t of the transmission period T, a first physical power $p'_\varphi(\hat{x},t)$ at any location $\hat{x}$ of an edge of the transport path and a second physical power $p_\varphi(x,t)$ at any location x of an edge of the transport path are equivalent only if there is a predetermined remainder R(t) greater than or equal to zero and less than or equal to a limit value $R_{max}$ and a $\mu(t)$, with $-1 \leq \mu(t) < 1$ or with $-1 < \mu(t) \leq 1$ or with $-1 \leq \mu(t) \leq 1$, such that the first physical power $p'_\varphi(\hat{x},t)$ is equal to the sum of the second physical power $p_\varphi(x,t)$ and the product of $\mu(t)$ and the remainder R(t),
   B) prior to the execution time $t_0$ transmitting the data packet to all control instances of at least all nodes or all edges on the transport path,
   C) beginning with the execution time $t_0$ transmitting the energy packet biuniquely assigned to the data packet, wherein for all points in time t within the transmission period 7 of the energy packet, the physical power $p_\varphi(x,t)$ flowing on the transport path between the supply node $K_Q$ and the demand node Kg is set at at least one location x of each edge of the transport path in such a way that the physical power fed into the demand nodes $K_S$ is an element of the equivalence class $\{p_{nom}(t),R(t),T\}$ described by the data packet.

2. The method according to claim 1, wherein the data packet furthermore describes
   iv) a predetermined compensation path of the transport graph of the electrical transmission network connecting a predetermined compensation node $K_{SAS}$ node to the demand node via a plurality of edges, wherein the compensation node $K_{SAS}$ at any point in time t of the transmission period T of the energy packet either can receive a physical power up to a predetermined maximum compensation power C(t), wherein the predetermined maximum compensation power C(t) as a function of the remainder R(t), or can deliver a physical power up to the maximum compensation power C(t), optionally increased by a loss drop determined by a prediction, via the compensation path, and
wherein, in step C), the physical power flowing between the compensation node $K_{SAS}$ and at least the demand node $K_S$ and is controlled for at least one location x on the plurality of edges of the compensation path such that the physical power at the at least one location x is at any point in time t within the transmission period T an element of an equivalence class $\{p_{nom}(t)=0,R(t)=C$ (t), T} with a nominal power $p_{nom}(t)$ of zero and a remainder having the value of the previously determined maximum compensation power C(t) and such that at at least one location x of the demand edge the physical power $p_\varphi(x,t)$ flowing through the demand edge between the demand node $K_S$ and the load S connected to this demand node is equal to the nominal power $p_{nom}(t)$ of the energy packet plus a compensation power δ'(t) as a function of the prediction, and/or the data packet describes v) a previously determined balancing path of the transport graph of the transmission network, which via a plurality of edges connects a previously determined balancing node $K_{Aus}$ and the supply node $K_Q$, wherein the balancing node $K_{Aus}$ at any point in time t of the transmission period T of the energy packet can receive a physical power up to a predetermined maximum balancing power D(t), wherein the predetermined maximum balancing power D(t) is determined as a function of the remainder R(t), or provide a physical power up to the maximum balancing power D(t), optionally increased by the loss drop determined by a prediction, via the balancing path, and wherein, in step C), the physical power flowing between the balancing node $K_{Aus}$ and the supply node $K_Q$ for at least one location x on the plurality of edges of the balancing path is controlled such that at this at least one location x the physical power at any point in time t within the transmission period T is an element of an equivalence class $\{p_{nom}(t)=0, R(t)=D(t),T\}$ with a nominal power $p_{nom}(t)$ of zero and a remainder with the value of the predetermined maximum balancing power D(t) and such that the physical power $p_\varphi(x,t)$ flowing between the supply node $K_Q$ and the demand node $K_S$ for at least one location x on the plurality of edges of the transport path is an element of the equivalence class $\{p_{nom}(t),R(t),T\}$ of the energy packet.

3. The method according to claim 1, wherein the method for an arbitrary prediction period $T_{prog}$ with a prediction start $t_{0prog}$ and a prediction duration $DT_{prog}$ further comprising the steps of, at a prediction point in time $t^0$, which is prior to the prediction start $t_{0prog}$, D) generating of a supply prediction for a supply power $p_{progEin}(t)$ to be supplied at any point in time t in the prediction period $T_{prog}$ from the respective source, wherein the supply prediction has a supply prediction uncertainty, and E) generating a demand prediction for a power demand $p_{progBed}(t)$ predicted to be required by the respective load at any point in time t in the prediction period $T_{prog}$, wherein the demand prediction has a demand prediction uncertainty, wherein the temporal course of the nominal power $p_{nom}(t)$ of the energy packet is determined at least from the supply prediction and the demand prediction, and wherein the temporal course of the remainder R(t) is a function of at least the supply prediction uncertainty and the demand prediction uncertainty.

4. The method according to claim 3, the method comprising the steps of

F) forming a demand data packet $\{p_{progBed}(t),R(t),T_{prog}\}$ of the load, the demand data packet describing the predicted temporal course of the nominal power required by the load $p_{nomBed}(t)$ at any point in time t within the prediction period $T_{prog}$ and the temporal course of a remainder R(t) as a function of the demand prediction uncertainty of the demand prediction at any point in time t within the prediction period $T_{prog}$, G) forming a supply data packet of the source, the supply data packet describing the predicted temporal course of the nominal power $p_{nomEin}(t)$ to be supplied by the source at any point in time t within the prediction period $T_{prog}$ and the temporal course of a remainder R(t) as a function of the supply prediction uncertainty of the supply prediction at any point in time t within the prediction period $T_{prog}$ and wherein forming of the equivalence class of an energy packet for transmission from a source to a load comprises at least one allocation of a sub-packet of the supply data packet to a sub-packet of the demand data packet at least to meet the demand of the load.

5. The method according to claim 1, wherein, when a plurality of energy packets is transmitted simultaneously via exactly one edge of the transmission network, the following steps are carried out H) superpositioning the simultaneously transmitted energy packets to exactly one simultaneous energy packet with a superpositioned simultaneous data packet, I) adjusting the physical power flowing via the exactly one edge, so that the physical power at at least one location x of the exactly one edge is an element of the equivalence class $\{p_{nom}(t),R(t),T\}$ of the superpositioned simultaneous data packet of the exactly one simultaneous power packet formed by the superpositioning in step H), wherein the nominal power $p_{nom}(t)$ of this equivalence class $\{p_{nom}(t),R(t),T\}$ is the sum of the nominal powers of the simultaneously transmitted energy packets, wherein in the summation for the nominal power $p_{nom}(t)$ the flow directions of the power is taken into account, and wherein the remainder R(t) of the equivalence class $\{p_{nom}(t),R(t),T\}$ is the sum of the remainders of the simultaneously transmitted energy packets and wherein for the summation of the remainder the flow direction is disregarded.

6. The method according to claim 5, the method further comprising the steps of

J) at each node on the transmission network determining the fractions of energy packets pending at each edge of the respective node in an arbitrary test period for simultaneous transmission to the next node based on the data packets, K) for the duration of the test period, adjusting the power supply to each edge of the respective node so that the physical power $p_\varphi(x,t)$ at at least one location x of the respective edge is an element of an equivalence class $\{p_{nom}(t),R(t),T\}$ whose nominal power $p_{nom}(t)$ is the sum of the nominal powers of the simultaneously transmitted energy packets, the flow directions of the electrical power being taken into account in the summation for the nominal power, and the remainder of which is the sum of the remainders of the simultaneously transmitted energy packets, the flow direction being disregarded for the summation of the remainder, wherein the flow direction for an electrical power fed out via an edge of the node being counted with the opposite sign compared to the flow direction of an electrical power supplied via an edge.

7. The method according to claim 3, wherein the method at a reservation point in time $t^{00}$ and for a reservation period $T_{res}$, wherein the time $t^{00}$ is prior to a start of the reservation period $T_{res}$, which reservation period has a start time $t_{0res}$ and a reservation duration $DT_{res}$, and wherein the reservation period $T_{res}$ is within the prediction period $T_{prog}$, further comprises the steps of, L) for each load, determining the amount of all transport graphs, each of which transport graphs is connected to the load, such that for each of these transport graphs, each source connected to the transport graph is connected to the load via a transport path of the transport graph and, for the reservation period $T_{res}$ via a sub-packet $E'_{Ein}$ of a supply packet defined by the supply data packet for the reservation period, wherein this available sub-packet $E'_{Ein}$ is formed by a coverage packet defined by a coverage data packet $E_D$ and a loss packet $E_v$, the coverage packets of the sources Q of the transport graph together cover a maximized portion of a demand packet of the load S defined by the demand data packet and wherein the respective loss data packet describes the loss determined by a prediction during the transmission of the respective coverage packet defined by the coverage data packet via the corresponding transport path, M) associating a loss data packet $E_v$ to each of the coverage data packets, wherein each of the coverage packets defined by the coverage data packets is transmitted via a transport path assigned thereto as a subgraph of a transport graph out of the amount of transport graphs formed according to the preceding step L), wherein a nominal power of the equivalence class of a loss packet defined by the loss data packet is determined by a prediction of the loss and the remainder of the equivalence class of the loss packet defined by the loss data packet is determined as a function of a prediction uncertainty of a loss prediction, wherein the nominal power of the loss is the power predicted to be lost in the transmission of the cover packet via the transport path from the source Q to the load S by the loss prediction, and wherein for the loss prediction all energy packets to be transmitted via the considered transport path during the reservation period are taken into account, and the transport path has an available transmission capacity to transmit the sub-packet $E'_{Ein}$ which is composed of the coverage packet defined by the coverage data packet $E_D$ and the loss packet defined by the loss data packet $E_v$, wherein the coverage packet $E_D$ defined by the coverage data packet and the loss packet $E_v$ defined by the loss data packet have the same transmission direction, N) wherein the equivalence class of the sub-packet $E'_{Ein}$ is formed by adding the nominal powers of the coverage packet and the loss packet and the remainders, and wherein the loss packet has the same flow direction as the coverage packet and the transmission period T is set equal to the reservation period $T_{res}$, O) for each load, determining the optimized transport paths as subgraphs of the transport graph optimizedly determined with respect to a selected metric, wherein each source of each transport path so optimizedly determined, connecting that source Q with the load S of the transport graph for the transmission of a sub-packet of the supply packet, at any point in time t within the reservation period $T_{res}$ provides an available power which is an element of the equivalence class of the sub-packet determined in accordance with step N) above, P) forming in each case a reservation data packet for defining a reservation packet of the transport path from step O), wherein the reservation data packet of the reservation packet describes the equivalence class of the respective sub-packet of the supply packet as an equivalence class of the reservation packet, the supply edge of the respective sub-packet of the supply packet as the supply edge of the reservation packet, the transport path and the reservation period $T_{res}$, Q) for each source of the transport graph determining a sub-packet of the supply packet of each source that is still available, so that the supply packet is formed by superposition of all reservation packets and this available sub-packet for the reservation period, R) for each load for the reservation period $T_{res}$ determining the not yet covered sub-packet of the demand packet, so that the demand packet is formed from the coverage packets according to step N), the reservation packets being assigned to the load and the not covered sub-packet, S) for each time t in the reservation period $T_{res}$ determining the remaining available transmission capacity of the transmission network, such that the given transmission capacity of the transmission network is the sum of the remaining available transmission capacity and the sum of the nominal powers plus the remainders of the reservation packets, T) for each supply prediction, demand prediction and loss prediction by which at least one of the values determined by them is changed, repeating the preceding steps, U) for each reservation packet formed in steps L) to O) at an arbitrary booking time $t_{Buch}$, which is prior to the start time $t_{0res}$ of the reservation packet, bindingly booking the reservation data packet of the reservation packet as the data packet of the energy packet, wherein the transmission period of the energy packet is the reservation period, wherein the equivalence class $\{p_{nom}(t), R(t), T=T_{res}\}$ is the equivalence class of the reservation packet, wherein the supply edge of the reservation packet is the supply edge of the energy packet, and wherein the transport path of the reservation packet is the transport path of the energy packet, and V) at the execution time $t_0$ transmitting of the respective energy packet according to the data packet of the energy packet.

8. The method according to claim 2, the method, for a reservation period $T_{res}$, further comprising the steps of, at the reservation point in time $t^{00}$, W) for each load, determining the set of transport graphs each connected to the load such that, for each one of this set of transport graphs, each source connected to the transport graph is connected to the load via a transport path of the transport graph and has an available sub-packet of the remaining available supply packet of the source, the available sub-packet being formed from a coverage packet defined by a coverage data packet and a loss packet defined by a loss data packet, wherein the coverage packets of the sources $Q_i$ of the transport graph together cover a maximized portion of the demand data packet of the load S and wherein the loss packet describes the loss in the transmission of the respective coverage packet over the corresponding path, which loss is determined by a prediction, X) for each load and each transport graph determined according to step W), extending the respective transport graph to an extended transport graph by determining the compensation nodes of the respective extended transport graph such that for each source of the extended transport graph the compensation nodes are determined, wherein each of these compensation nodes is connected via at least one compensation path, as a subgraph of the extended transport graph, to the load S and the compensation nodes together provide a maximum total compensation power C(t) determined beforehand in order to receive a physical power up to the maximum total compensation power C(t) at each point in time t within the reservation period $T_{res}$, wherein the maximum total compensation power C(t) is a function of the remainders of the coverage packets of the respective source Q and in order to supply via the compensation paths in sum a physical power up to this maximum total compensation power C(t), which is increased by the power losses determined by prediction, which power losses drop during the transmission of the sub-packets from the compensation nodes via the compensation paths into the demand node $K_S$, Y) for each load determining exactly one extended transport graph optimized according to a given metric from the set of all extended transport graphs determined according to steps W) and X), each of the extended transport graphs being connected to the load via a demand edge, Z) for the optimized extended transport graph of step Y) forming the reservation data packets for defining the reservation packets of the energy packets to be transmitted over the optimized extended transport graph, wherein the reservation data packet of each reservation packet includes the equivalence class of the respective available supply packet as the equivalence class of the reservation packet, the supply edge of the respective supply packet as the supply edge of the corresponding source node $K_Q$ of the reservation packet, the corresponding transport path connecting the source to the load, the reservation period $T_{res}$, as well as the compensation nodes with the corresponding compensation potentials and the compensation paths connecting the compensation nodes with the load node $K_S$ to which the load is connected via the demand edge, AA) determining the still available sub-packets of the supply packets and the not yet covered portions of the demand packet of the still available transmission capacities according to step O), reducing the still available capacity of the reserved compensation nodes by the reserved maximum powers for receiving and for delivering the corresponding powers, reducing the still available transmission capacities of the compensation paths by the reserved potentials for delivering power of the reserved compensation nodes increased by the power loss, BB) for each supply prediction, demand prediction and loss prediction by which at least one of the values determined by the respective prediction is changed, repeat the previous steps, CC) for each reservation packet of an optimized extended transport graph formed in the preceding steps, at an arbitrary booking point in time $t_{Buch}$, which booking point in time $t_{Buch}$ is prior to the start time $t_{Ores}$ of the reservation packet, bindingly booking the reservation data packets of the reservation packets as the data packets of the energy packets, wherein for each of these data packets the transmission period of the energy packet is the reservation period, wherein the equivalence class is $\{p_{nom(t)}, R(t), T\}$ is the equivalence class of the reservation packet and the supply edge of the reservation packet is the supply edge of the energy packet, and bindingly booking the reserved transmission capacities on the optimal extended transport graph, and at the execution time $t_0$ transmission of the respective energy packet according to the data packet of the energy packet via the booked capacities of the booked extended transport graph, and/or DD) for each load, extending the possible transport graphs and/or possible extended transport graphs previously determined in steps W) and X) by the possible balancing nodes and the possible balancing paths, such that each of these balancing nodes is connected via a balancing path to one of the sources of the transport graph and/or extended transport graph, for which the associated supply data packet requires a balancing, and these balancing nodes can individually or collectively provide a balancing for the corresponding sources and can balance the losses determined by at least one loss prediction occurring during the transmission of the balancing packet from the balancing node to the source, EE) according to a predetermined metric, determining an optimized transport graph with balancing or an extended transport graph with compensation with a balancing out of the set of possible transport graphs with a balancing determined according to step DD) or a transport graph with compensation extended by the compensation, and FF) for the optimized transport graph with balancing determined in this way or a transport graph with balancing extended by the compensation carrying out steps Z) to CC).

9. The method according to claim 3, wherein the method for a real-time prediction period $T_{RT}$ with a real-time prediction start $t_{ORT}$ and a real-time prediction duration $DT_{RT}$, wherein the real-time prediction period $T_{RT}$ is a sub-period of the reservation period $T_{res}$ of the reservation packet, further comprises the steps of, at a real-time prediction point in time in time $t^{000}$ after the reservation point in time in time $t^{00}$ of the reservation period $T_{res}$ and prior to the real-time prediction start $t_{ORT}$, GG) measuring at least one parameter, HH) creating a real-time prediction $p_{RT}(x,t)$ of the physical power $p_\varphi(x,t)$ at any point in time t within the real-time prediction period $T_{RT}$ at a location x of the transmission network, the real-time prediction $p_{RT}(x,t)$ having negligible real-time prediction uncertainty and being created with consideration of the at least one parameter, wherein the physical power $p_\varphi(x,t)$ is a function of the at least one parameter, and II) forming a real time energy packet for transmission over a subgraph of the transmission network by using the real time data packet associated with the real time energy packet, which real time data packet defines the real time energy packet, which real time data packet describes the time history of the nominal power $p_{nomRT}(x,t)=p_{RT}(x,t)$ at at least one location x of each edge of the subgraph as a function of the predicted time history of the physical power supplied into that subgraph $p_\varphi(x,t)$ at the location x, wherein the remainder R(t) is set equal to constant zero and the transmission period T is set equal to the real-time prediction period $T_{RT}$.

10. The method according to claim 5, wherein transmitting the energy packet associated with the data packet over a directed transport path of the booked transport graph connecting the source for the energy packet to the load, for each real-time prediction time period $T_{RT}$, which is a part of an overlap of the transmission period by real-time prediction periods and for each point in time t within the respective real-time prediction period $T_{RT}$ comprises the following steps JJ) creating a real-time prediction for the temporal course of the physical power $p_\varphi(x,t)$ for at least one location x on at least each edge of the transport path according to step ii. of claim 9, including at least one measurement of the physical power fed into the respective transport graph at the real-time prediction point in time $t^{ooo}$, supplied into the transport graph, KK) forming a real-time energy packet for the supply via the supply edge into this transport path according to step II), in that in the associated real-time data packet the temporal course of the nominal power over the real-time prediction period $T_{RT}$ at at least one location x on each edge of the transport paths, over which transport paths the transfer of the power packet from the source supply edge to the corresponding load demand edge occurs is set equal to the corresponding predictions from steps HH) and II), and the remainder for all points in time t within the real-time prediction period $T_{res}$ and all subgraphs is constantly set equal to zero, LL) transmitting the real-time data packet to the control instances of the transport graph; and MM) setting the physical power $p_\varphi(x,t)$ for at least one location x on each edge of the transport path, such that the physical power $p_\varphi(x,t)$ is a function of the nominal power $p_{nomRT}(x,t)$ described in the real-time data packet for that location x, and the physical power $p_\varphi(x,t)$ at any point in time t within the transmission period T satisfies the equivalence relation described in the data packet of the energy packet, and NN) for simultaneous transmission of energy packets via a single edge of a node for each transmission period T setting the physical power $p_\varphi(x,t)$ for at least one location x on this edge, so that the physical power $p_\varphi(x,t)$ is a function of the sum of the nominal powers of the real-time packets associated with the simultaneously transmitted energy packets at that location x taking into account the direction of flow, so that the physical power $p_\varphi(x,t)$ at any point in time t within the transmission period T is an element of the equivalence class formed for the simultaneous energy packet according to claim 5.

11. The method according to claim 8, wherein the method for the real-time prediction period $T_{RT}$ further comprising the steps of, for each real-time prediction period $T_{RT}$, which is a part of an overlap of the transmission period by real-time prediction periods, and for each point in time t within the respective real-time prediction period $T_{RT}$ OO) for each supply node $K_{Q_i}$ to which a source is connected via a booked transport path of the booked transport graph extended by compensation, whereby the source $Q_i$ is booked to cover the demand of the load S, determining a power supplied by the source via the edge of the transport path, via which edged the load node $K_s$ of the load S is connected, at at least one location on x of that edge by a real-time supply prediction, PP) determining the difference $\delta(t)$ between the sum of the physical power supplied into all booked transport paths which connect all sources $Q_i$ with the load S from the real-time supply predictions, and the physical power taken by the load S, which load S is connected to the demand node $K_S$ via the demand edge, at a location x of the demand edge from the real-time prediction, QQ) for each point in time t within the real-time prediction period $T_{RT}$ forming a maximum total compensation power C(t) as the sum of all maximum compensation powers $C_i(t)$ of all booked sources $Q_i$ and the load S and for each booked compensation node $K_{SAS_i}$ determining of a quotient $y_i(t)$ of the maximum compensation power $C_i(t)$ of the respective compensation node $K_{SAS_i}$ and the maximum total compensation power C(t), RR) determining real-time compensation packets for transmission on the compensation graph as a subgraph of the booked extended transport graph, which includes the compensation nodes $K_{SAS_i}$ and the load S, by adding, for each compensation path of the booked compensation graph connecting a compensation node $K_{SAS_i}$ with the load, in the associated real-time compensation data packets, the nominal power $p_{nomKomRT}(x,t)$ for at least one location x of each edge of the respective compensation path a function of the product of the difference $\delta(t)$ determined in step PP) with the quotient $\gamma_i(t)$ but only up to a maximum of the value of the maximum compensation power $C_i(t)$ and the remainder R(t) is constantly set equal to zero, wherein if the product $\gamma_i(t)\cdot\delta(t)$ is negative, the product $\gamma_i(t)\cdot\delta(t)$ is increased by an amount determined by a real-time prediction for a location x of the edge of the compensation path via which edge the demand node $K_S$ is connected to the compensation node $K_{SAS_i}$, to compensate for the losses incurred in the transmission from the compensation node to the corresponding load S, SS) transmitting the real-time compensation data packets to the control instances, and TT) transmitting the real-time compensation packets by, at any point in time t within the transmission period, at at least one location x on the edges of the compensation paths, setting the physical power $p_\varphi(x,t)$ such that the physical power $p_\varphi(x,t)$ is equal to the nominal power $p_{nomKomRT}(x,t)$ of the real-time compensation packets for this location x, and by simultaneously at any point in time within the transmission period T setting the physical powers $p_\varphi(x,t)$ to be equal to the nominal powers of the real-time energy packets $p_{nomRT}(x,t)$ at the locations x on the transport graph previously selected by the real-time predictions, so that the physical power $p_\varphi(x,t)$ at a location x selected by the real-time prediction for the demand on the demand edge is equal to the sum of the nominal powers of the energy packets sent from the supply nodes $K_{Q_i}$ to the demand node $K_S$ plus the compensation power $\delta'(t)$, wherein the compensation power $\delta'(t)$ is equal to the difference between the physical power $p_\varphi(x,t)$ of the power taken by the load according to the real-time demand prediction and the sum of the nominal powers of the energy packets transmitted to the load S.

12. The method according to claim 8, the method comprising, for each real-time prediction period $T_{RT}$, which is part of the overlap of the transmission period by real-time prediction periods with the real-time prediction point in time $t^{ooo}$ further comprising the steps of, for each point in time t within the respective real-time prediction period $T_{RT}$ UU) for each supply node $K_{Q_i}$ to which a source $Q_i$ is connected via a supply edge wherein the source $Q_i$ is to cover the demand of the load $ for each point in time t within the real-time prediction period, determining a fraction $\rho(t)$ of the supplied physical power $p_\varphi(x,t)$ from the real-time supply predictions at at least one location x of the respective supply edges, which fraction ρ(t) exceeds or falls below the limits defined by the equivalence relation of the power to be transmitted from the source node $K_{Q_i}$ to the load S, VV) for each point in time t within the real-time prediction period $T_{RT}$ forming a maximum total balancing power D(c) as the sum of all maximum balancing powers $D_i(t)$ of the balancing nodes $K_{Aus_i}$ booked for the sources $Q_i$ and for each balancing node $K_{Aus_i}$ determining a quotient $g_i(t)$ from the maximum balancing power $D_i(t)$ of the respective balancing node $K_{Aus_i}$ and the maximum total balancing power D(t), WW) determining real-time balancing packets for transmission on all booked balancing paths that include the balancing nodes $K_{Aus_i}$ and the source $Q_i$, wherein in the associated real-time balancing data packets the nominal power $p_{nomAusRT}(x,t)$ for at least one location x of each edge of the respective balancing path is a function of the product of the deviation ρ(t) determined in step UU) with the quotient $g_i(t)$ but only up to a maximum of the value of the maximum compensation power $D_i(t)$, and the remainder $R_i(t)$ is constantly set equal to zero, wherein if the product $g_i(t)\cdot\rho(t)$ is negative, this product $g_i(t)\cdot\rho(t)$ is increased by the amount determined by a real time prediction for a location x of the edge of the balancing path via which edge the supply node $K_{Q_i}$ is connected to the balancing node $K_{Aus_i}$ to compensate for losses incurred during transmission from the balancing node to the corresponding source, XX) transmitting the real-time balancing data packets to the control instances associated with the nodes on the balancing graphs, YY) transmitting the real-time balancing packets by at any point time t within the transmission period T for at least one location x on each edge of the balancing graph setting the physical power $p_\varphi(x,t)$ to be equal to the nominal power $p_{nomAusRT}(x,t)$ of the real-time compensation packets for the location x, and ZZ) at any point in time t within the transmission period T setting the physical power $p_\varphi(x,t)$ for at least one location x of each edge of the transport path, so that the physical power $p_\varphi(x,t)$ is equal to the nominal power $p_{nomRT}(x,t)$ of the real-time energy data packets for the location x and the physical power $p_\varphi(x,t)$ is an element of the power class of the energy packet to be transmitted.

13. A system for directional transmission of energy in a form of at least one energy packet with a transmission network and a data and computer network,
  wherein the transmission network comprises
    at least two nodes, one of which is a supply node $K_Q$ and one of which is a demand node $K_S$,
    at least one edge, wherein each edge connects exactly two nodes,
    at least one power controller, wherein the at least one power controller is arranged and located such that, by means of the at least one power controller for at least one location x on each edge, a physical power $p_\varphi(x,t)$ actually flowing via the respective edge is settable,
    a plurality of sources Q, wherein each of the sources Q is connected to a supply node via a supply edge $K_Q$, and
    a plurality of loads S, wherein each of the loads S is connected to a demand node $K_S$ via a demand edge,
  wherein the data and computer network comprises
    at least one computer node and
    at least one control instance executed on the at least one computer node, wherein the data and computer network is configured and operatively connected to the at least one power controller such that, during operation of the system, the physical power $p_\varphi(x,t)$ is controllable by the at least one power controller for at least one location x on each edge by the control instance,
  wherein the at least one control instance of the at least one computer node is configured such that, during operation of the system, the control instance executes a method comprising the steps of:
  A) forming a data packet, wherein the data packet is biuniquely assigned to exactly one energy packet, wherein the data packet defines the respective energy packet and wherein the data packet describes
    i) a transmission period T of the energy packet with a duration DT and an execution time $t_0$, which marks the beginning of the transmission period T,
    ii) a predetermined transport path of a transport graph of the transmission network for the directed transmission of the energy packet, which transport path connects at least one of the plurality of sources Q with exactly one of the plurality of loads S, wherein the exactly one of the plurality of sources Q is connected via exactly one supply edge to a supply node $K_Q$ of the previously determined transport path and the exactly one load S is connected via a demand edge of the predetermined transport path to the demand node $K_S$, and
    iii) an equivalence class $\{p_{nom}(t),R(t),T\}$ of the energy packet,
      wherein the equivalence class $\{p_{nom}(t),R(t),T\}$ is given by
        a nominal power prom (t) of the energy packet as a function of time, wherein the nominal power $p_{nom}(t)$ is determined beforehand by at least one prediction, and a remainder R(t) as a function of time and as a function of a prediction uncertainty of the at least one prediction,
        wherein for each point in time t within the transmission period T of the energy packet there is a μ(t), with $-1\leq\rho(t)<1$ or with $-1<\mu(t)\leq 1$ or with $-1\leq\mu(t)\leq 1$ so that the physical power $p_\varphi(x,t)$ during the transmission of the energy packet at any point in time t and at at least one location x on each edge of the transport path is fixed as the sum of the nominal power $p_{nom}(t)$ and the product of u(t) and the remainder R(t),
      wherein the equivalence class is defined by an equivalence relation, according to which equivalence relation, for each point in time t of the transmission period T, a first physical power $p'_\varphi(\hat{x},t)$ at any location $\hat{x}$ of an edge of the transport path and a second physical power $p_\varphi(x,t)$ at any location x of an edge of the transport path are equivalent only if there is a predetermined remainder R(t) greater than or equal to zero and less than or equal to a limit value $R_{max}$ and a μ(t), with $-1\leq\mu(t)<1$ or with $-1<\mu(t)\leq 1$ or with $-1\leq\mu(t)\leq 1$ so that the first physical power $p'_\varphi(\hat{x},t)$ is equal to the sum of the second physical power $p_\varphi(x,t)$ and the product of μ(t) and the remainder R(t),
  B) prior to the execution time $t_0$ transmitting the data packet to all control instances of the data and computer network to which the power controllers are connected for controlling the physical power, so that all data necessary for transmitting an energy packet are coherent on the control instances, and C) beginning with the execution time $t_0$ transmitting the energy packet biuniquely assigned to the data packet, wherein for all points in time t within the transmission period T of the energy packet, the physical power $p_\varphi(x,t)$ flowing on the transport path between the supply node Kg and the demand node K's is set at at least one location x of each edge of the transport path in such a way that the physical power fed into the demand nodes $K_S$ is an element of the equivalence class $\{p_{nom}(t), R(t), T\}$ described by the data packet.

14. A method for directional transmission of energy in a form of at least one energy packet from a plurality of sources Q via at least two nodes, one of which is a supply node $K_Q$ connected via a supply edge to one of the plurality of sources Q and one of which is a demand node $K_S$ connected via a demand edge to a load S, and via a plurality of edges to a plurality of loads S in a transmission network, the transmission network being controllable by means of a data and computer network in such a way that for at least one location x on each of the plurality of edges an actually flowing physical power $p_\varphi(x,t)$ is controllable by a control instance of the data and computer network, which method comprises the steps of:

A) forming a data packet for each energy packet, wherein the data packet is biuniquely assigned to exactly one energy packet, wherein the data packet defines the respective energy packet, and wherein the data packet describes i. a transmission period T of the energy packet with a duration DT and an execution time $t_0$, which execution time $t_0$ identifies a start of the transmission period T, ii. a predetermined transport path of a transport graph of the transmission network for the directed transmission of the energy packet, which transport path connects at least one of the plurality of sources Q with exactly one of the plurality of loads, wherein the exactly one of the plurality of sources Q is connected to a supply node $K_Q$ of the predetermined transport path via exactly one supply edge and the exactly one load S is connected to the demand node $K_S$ via a demand edge of the predetermined transport path, iii. an equivalence class $\{p_{nom}(t), R(t), T\}$ of the energy packet, wherein the equivalence class is given by a nominal power $p_{nom}(t)$ of the energy packet as a function of time, wherein the nominal power $p_{nom}(t)$ is determined beforehand by at least one prediction, and a remainder R(t) as a function of time and as a function of a prediction uncertainty of the at least one prediction, and iv. a predetermined compensation path of the transport graph of the electrical transmission network connecting a predetermined compensation node $K_{SAS}$ node to the demand node via a plurality of edges, wherein the compensation node $K_{SAS}$ at any point in time t of the transmission period T of the energy packet either can receive a physical power up to a predetermined maximum compensation power C(t), wherein the predetermined maximum compensation power C(t) as a function of the remainder R(t), or can deliver a physical power up to the maximum compensation power €(t), optionally increased by a loss drop determined by a prediction, via the compensation path, wherein for each point in time t within the transmission period T of the energy packet there is a $\mu(t)$, with $-1 \leq \mu(t) < 1$ or with $-1 < \mu(t) \leq 1$ or with $-1 \leq \mu(t) \leq 1$, such that the physical power $p_\varphi(x,t)$ during the transmission of the energy packet at each point in time t and at at least one location x on each edge of the transport path is fixed as the sum of the nominal power $p_{nom}(t)$ and the product of $\mu(t)$ and the remainder R(t), wherein the equivalence class is defined by an equivalence relation, according to which equivalence relation, for any point in time t of the transmission period T, a first physical power $p'_\varphi(\hat{x},t)$ at any location $\hat{x}$ of an edge of the transport path and a second physical power $p_\varphi(x,t)$ at any location x of an edge of the transport path are equivalent only if there is a predetermined remainder R(t) greater than or equal to zero and less than or equal to a limit value $R_{max}$ and a $\mu(t)$, with $-1 \leq \mu(t) < 1$ or with $-1 < \mu(t) \leq 1$ or with $-1 \leq \mu(t) \leq 1$, such that the first physical power $p'_\varphi(\hat{x},t)$ is equal to the sum of the second physical power $p_\varphi(x,t)$ and the product of $\mu(t)$ and the remainder R(t), B) prior to the execution time $t_0$ transmitting the data packet to all control instances of at least all nodes or all edges on the transport path, C) beginning with the execution time to transmitting the energy packet biuniquely assigned to the data packet, wherein for all points in time t within the transmission period T of the energy packet, the physical power $p_\varphi(x,t)$ flowing on the transport path between the supply node $K_Q$ and the demand node $K_S$ is set at at least one location x of each edge of the transport path in such a way that the physical power fed into the demand nodes $K_S$ is an element of the equivalence class $\{p_{nom}(t), R(t), T\}$ described by the data packet, wherein, in step C), the physical power flowing between the compensation node $K_{SAS}$ and at least the demand node $K_S$ and is controlled for at least one location x on the plurality of edges of the compensation path such that the physical power at the at least one location x is at any point in time t within the transmission period T an element of an equivalence class $\{p_{nom}(t)=0, R(t)=C(t), T\}$ with a nominal power $p_{nom}(t)$ of zero and a remainder having the value of the previously determined maximum compensation power C(t) and such that at at least one location x of the demand edge the physical power $p_\varphi(x,t)$ flowing through the demand edge between the demand node $K_S$ and the load S connected to this demand node is equal to the nominal power $p_{nom}(t)$ of the energy packet plus a compensation power $\delta'(t)$ as a function of the prediction, the method for directional transmission of energy for an arbitrary prediction period $T_{prog}$ with a prediction start $t_{0prog}$ and a prediction duration $DT_{prog}$ further comprising the steps of, at a prediction point in time $t^0$, which is prior to the prediction start $t_{0prog}$, D) generating of a supply prediction for a supply power $p_{progEin}(t)$ to be supplied at any point in time t in the prediction period $T_{prog}$ from the respective source, wherein the supply prediction has a supply prediction uncertainty, and E) generating a demand prediction for a power demand $p_{progBed}(t)$ predicted to be required by the respective load at any point in time t in the prediction period $T_{prog}$,
wherein the demand prediction has a demand prediction uncertainty,
wherein the temporal course of the nominal power $p_{nom}(t)$ of the energy packet is determined at least from the supply prediction and the demand prediction, and
wherein the temporal course of the remainder R(t) is a function of at least the supply prediction uncertainty and the demand prediction uncertainty.

* * * * *

UNITED STATES PATENT AND TRADEMARK OFFICE
CERTIFICATE OF CORRECTION

PATENT NO. : 12,074,439 B2
APPLICATION NO. : 17/539961
DATED : August 27, 2024
INVENTOR(S) : Bernd Reifenhäuser It is certified that error appears in the above-identified patent and that said Letters Patent is hereby corrected as shown below:

In the Claims

Claim 1, C): Line 4 "period 7" should read --period $T$--

Claim 1, C): Line 6 "node Kg" should read --node $K_s$--

Claim 3: Line 3 "$t_{Gprog}$" should read --$t_{0prog}$--

Claim 11, OO): Line 1 "node $K_{Qt}$" should read --node $K_{Q_i}$--

Claim 11, QQ): Line 6 "quotient $y_i(t)$" should read --quotient $y_i(t)$--

Claim 12, UU): Line 3 "load $" should read --load $S$--

Claim 12, VV): Line 3 "power D(c)" should read --power $D(t)$--

Claim 13, A) iii): Line 5 "power prom (t)" should read --power $p_{nom}(t)$--

Claim 13, iii): Line 13 "with $-1 \leq p(t) < 1$" should read --with $-1 \leq \mu(t) < 1$--

Claim 13, iii): Line 19 "product of u(t)" should read --product of $\mu(t)$--

Claim 13, C): Line 6 "node Kg" should read --node $K_Q$--

Claim 13, C): Line 6 "node K's" should read --node $K_S$--

Claim 14, A), iv.: Line 12 "power €(t)" should read --power $C(t)$--

Signed and Sealed this
Twenty-ninth Day of April, 2025

Coke Morgan Stewart
*Acting Director of the United States Patent and Trademark Office*

CERTIFICATE OF CORRECTION (continued)
U.S. Pat. No. 12,074,439 B2

Claim 14, A), iv.: Line 27 "location &" should read --location $\hat{x}$--

Claim 14, C): Line 1 "time to" should read --time $t_0$--